United States Patent
Thompson et al.

(10) Patent No.: US 9,279,406 B2
(45) Date of Patent: Mar. 8, 2016

(54) SYSTEM AND METHOD FOR ANALYZING CARBON BUILD UP IN AN ENGINE

(71) Applicant: ILLINOIS TOOL WORKS INC., Glenview, IL (US)

(72) Inventors: Bernie C. Thompson, Tijeras, NM (US); Neal R. Pederson, Los Alamos, NM (US)

(73) Assignee: Illinois Tool Works, Inc., Glenview, IL (US)

( * ) Notice: Subject to any disclaimer, the term of this patent is extended or adjusted under 35 U.S.C. 154(b) by 274 days.

(21) Appl. No.: 13/837,581

(22) Filed: Mar. 15, 2013

(65) Prior Publication Data
US 2014/0182548 A1  Jul. 3, 2014

Related U.S. Application Data

(60) Provisional application No. 61/712,003, filed on Oct. 10, 2012, provisional application No. 61/663,341, filed on Jun. 22, 2012.

(51) Int. Cl.
*G01M 11/06* (2006.01)
*G01M 15/00* (2006.01)
*F02P 5/04* (2006.01)
(Continued)

(52) U.S. Cl.
CPC ................ *F02P 5/04* (2013.01); *G01M 15/106* (2013.01); *G01M 15/11* (2013.01); *G01M 15/10* (2013.01)

(58) Field of Classification Search
CPC ..... G01M 15/00; G01M 15/08; G01M 15/09; G01M 15/11; G01M 15/12; G01M 15/106; G01M 15/04; G01M 15/10; F02P 5/04

USPC ............ 73/114.31, 114.06, 114.33, 116, 115, 73/114.69, 114.76; 123/406.19; 701/29.1, 701/101, 111, 102, 30.5
See application file for complete search history.

(56) References Cited

U.S. PATENT DOCUMENTS 367,391 A    8/1887  Gruber
1,161,875 A  11/1915 Morrow
(Continued)

FOREIGN PATENT DOCUMENTS

EP    222486 A2    5/1987
EP    288056 A2    10/1988
(Continued)

*Primary Examiner* — Lindsay Low
*Assistant Examiner* — George Jin
(74) *Attorney, Agent, or Firm* — Christopher R. Carroll; The Small Patnet Law Group, LLC

(57) ABSTRACT

An induction cleaning analyzing system includes a pressure sensor, an ignition event detector, and a control module. The pressure sensor measures airflow pressures of intake air and/or exhaust from cylinders in a common airflow pathway of a vehicle. The ignition event detector determines ignition events of the cylinders. The control module obtains pressure waveforms representative of the airflow pressures and divides the pressure waveforms into waveform segments. The control module associates different subsets of the waveform segments with different ones of the cylinders using the ignition events. The control module also identifies cyclic variations in the airflow pressures flowing in the common airflow pathway and caused by at least one of the cylinders by examining the waveform segments associated with the at least one of the cylinders.

17 Claims, 38 Drawing Sheets

(51) Int. Cl.
*G01M 15/10* (2006.01)
*G01M 15/11* (2006.01)

(56) References Cited

U.S. PATENT DOCUMENTS

| | | |
|---|---|---|
| 1,300,208 A | 4/1919 | Winkley |
| 1,637,867 A | 8/1927 | Liles |
| 2,427,370 A | 9/1947 | Schweitzer |
| 2,721,890 A | 10/1955 | Malick |
| 2,766,441 A | 10/1956 | Whittle, Jr. |
| 3,224,171 A | 12/1965 | Bowman |
| 3,415,114 A | 12/1968 | Crampton et al. |
| 3,427,630 A | 2/1969 | Imes |
| 3,752,131 A | 8/1973 | Tsumura et al. |
| 3,777,559 A | 12/1973 | Rennick et al. |
| 3,793,583 A * | 2/1974 | Glomski et al. ............... 324/402 |
| 3,924,457 A | 12/1975 | Oshima et al. |
| 3,939,711 A | 2/1976 | Hanaoka |
| 3,965,677 A | 6/1976 | Goto et al. |
| 3,972,239 A | 8/1976 | Puster et al. |
| 3,978,719 A | 9/1976 | Hadden et al. |
| 3,983,754 A | 10/1976 | Deguchi et al. |
| 3,999,383 A | 12/1976 | Hanaoka |
| 4,022,146 A | 5/1977 | Sadler |
| 4,040,294 A | 8/1977 | Matsuda et al. |
| 4,083,234 A | 4/1978 | Aono et al. |
| 4,094,191 A | 6/1978 | Goetsch et al. |
| 4,128,998 A | 12/1978 | Hattori et al. |
| 4,153,013 A | 5/1979 | Bianchi et al. |
| 4,161,162 A | 7/1979 | Latsch et al. |
| 4,189,940 A | 2/1980 | Hulls et al. |
| 4,195,531 A | 4/1980 | Okamura |
| 4,232,643 A | 11/1980 | Leshner et al. |
| 4,243,248 A | 1/1981 | Scholz et al. |
| 4,266,421 A | 5/1981 | McDougal |
| 4,277,830 A | 7/1981 | Reid et al. |
| 4,278,971 A | 7/1981 | Yasui et al. |
| 4,291,383 A | 9/1981 | Tedeschi et al. |
| 4,292,841 A | 10/1981 | Wesley |
| 4,302,814 A | 11/1981 | Full et al. |
| 4,314,534 A | 2/1982 | Nakajima et al. |
| 4,329,732 A | 5/1982 | Kavli et al. |
| 4,343,278 A | 8/1982 | Asano |
| 4,344,400 A | 8/1982 | Asano |
| 4,356,551 A | 10/1982 | Iwase et al. |
| 4,357,918 A | 11/1982 | Asano |
| 4,364,266 A | 12/1982 | Williams |
| 4,366,793 A | 1/1983 | Coles |
| 4,372,269 A | 2/1983 | Coles |
| 4,388,668 A | 6/1983 | Bell et al. |
| 4,393,837 A | 7/1983 | Sugihara et al. |
| 4,398,426 A | 8/1983 | Park et al. |
| 4,401,079 A | 8/1983 | Aoki et al. |
| 4,417,467 A | 11/1983 | Higgs et al. |
| 4,424,709 A | 1/1984 | Meier, Jr. et al. |
| 4,430,980 A | 2/1984 | Pidgeon |
| 4,433,667 A | 2/1984 | Ripper |
| 4,453,379 A | 6/1984 | Kawamura et al. |
| 4,475,506 A | 10/1984 | Riordan |
| 4,483,294 A | 11/1984 | Sawamoto |
| 4,491,010 A | 1/1985 | Brandt et al. |
| 4,492,079 A | 1/1985 | Takagi et al. |
| 4,519,366 A | 5/1985 | May |
| 4,531,499 A | 7/1985 | Eckert et al. |
| 4,543,934 A | 10/1985 | Morita et al. |
| 4,549,513 A | 10/1985 | Douaud et al. |
| 4,556,030 A | 12/1985 | Aono |
| 4,557,236 A | 12/1985 | Showalter |
| 4,567,755 A | 2/1986 | Ootsuka et al. |
| 4,602,507 A | 7/1986 | Hayes |
| 4,617,607 A | 10/1986 | Park et al. |
| 4,633,707 A | 1/1987 | Haddox |
| 4,645,233 A | 2/1987 | Bruse et al. |
| 4,665,689 A | 5/1987 | Rognon |
| 4,683,854 A | 8/1987 | Goulet |
| 4,683,856 A | 8/1987 | Matsuura et al. |
| 4,694,408 A | 9/1987 | Zaleski |
| 4,700,563 A | 10/1987 | Iwata et al. |
| 4,707,796 A | 11/1987 | Calabro et al. |
| 4,753,200 A | 6/1988 | Kawamura et al. |
| 4,757,463 A | 7/1988 | Ballou et al. |
| 4,776,312 A | 10/1988 | Yoshioka et al. |
| 4,781,059 A | 11/1988 | Suzuki et al. |
| 4,788,854 A | 12/1988 | Javaherian |
| 4,821,194 A | 4/1989 | Kawamura |
| 4,825,836 A | 5/1989 | Hirose |
| 4,831,820 A | 5/1989 | Lassanske |
| 4,843,870 A | 7/1989 | Citron et al. |
| 4,851,705 A | 7/1989 | Musser et al. |
| 4,885,934 A | 12/1989 | Freeman |
| 4,887,574 A | 12/1989 | Kuroiwa et al. |
| 4,887,575 A | 12/1989 | Takahashi |
| 4,892,075 A | 1/1990 | Iriyama et al. |
| 4,901,699 A | 2/1990 | Miwa et al. |
| 4,903,665 A | 2/1990 | Washino et al. |
| 4,905,649 A | 3/1990 | Washino et al. |
| 4,926,330 A | 5/1990 | Abe et al. |
| 4,928,255 A | 5/1990 | Brennecke et al. |
| 4,932,379 A | 6/1990 | Tang et al. |
| 4,960,087 A | 10/1990 | Junginger et al. |
| 4,962,741 A | 10/1990 | Cook et al. |
| 4,971,010 A | 11/1990 | Iwata |
| 4,980,573 A | 12/1990 | White et al. |
| 4,984,546 A | 1/1991 | Shimomura et al. |
| 4,985,835 A | 1/1991 | Sterler et al. |
| 4,995,365 A | 2/1991 | Denz et al. |
| 4,996,874 A | 3/1991 | Colomer et al. |
| 5,018,069 A | 5/1991 | Pettigrew |
| 5,044,195 A | 9/1991 | James et al. |
| 5,052,214 A | 10/1991 | Dils |
| 5,058,552 A | 10/1991 | Shimomura et al. |
| 5,067,463 A | 11/1991 | Remboski et al. |
| 5,076,098 A | 12/1991 | Miwa |
| 5,109,695 A | 5/1992 | James et al. |
| 5,109,825 A | 5/1992 | Joos et al. |
| 5,116,259 A | 5/1992 | Demizu et al. |
| 5,118,134 A | 6/1992 | Mattes et al. |
| 5,127,262 A | 7/1992 | Demizu et al. |
| 5,138,163 A | 8/1992 | Butler et al. |
| 5,156,126 A | 10/1992 | Ohkubo et al. |
| 5,164,901 A | 11/1992 | Blackburn et al. |
| 5,168,854 A | 12/1992 | Hashimoto et al. |
| 5,174,267 A | 12/1992 | DeBiasi |
| 5,193,513 A | 3/1993 | Marko et al. |
| 5,199,408 A | 4/1993 | Wataya |
| 5,200,899 A | 4/1993 | Ribbens et al. |
| 5,201,293 A | 4/1993 | Langner et al. |
| 5,202,831 A | 4/1993 | Blackburn et al. |
| 5,214,958 A | 6/1993 | Inada et al. |
| 5,228,287 A | 7/1993 | Kuronishi et al. |
| 5,231,869 A | 8/1993 | Klenk et al. |
| 5,263,453 A | 11/1993 | Wakahara et al. |
| 5,276,625 A | 1/1994 | Nakaniwa |
| 5,278,760 A | 1/1994 | Ribbens et al. |
| 5,287,834 A * | 2/1994 | Flynn ........................ 123/198 A |
| 5,297,047 A | 3/1994 | Matsuno |
| 5,305,635 A | 4/1994 | James et al. |
| 5,309,756 A | 5/1994 | Osawa et al. |
| 5,331,560 A | 7/1994 | Tamura |
| 5,351,528 A | 10/1994 | Fukui et al. |
| 5,361,628 A | 11/1994 | Marko et al. |
| 5,369,989 A | 12/1994 | Gates et al. |
| 5,377,547 A | 1/1995 | Kusakabe et al. |
| 5,386,723 A | 2/1995 | Wier |
| 5,402,683 A | 4/1995 | Kosugi et al. |
| 5,421,196 A | 6/1995 | Angermaier et al. |
| 5,557,933 A | 9/1996 | Numata et al. |
| 5,576,963 A | 11/1996 | Ribbens et al. |
| 5,638,278 A | 6/1997 | Nishimura et al. |
| 5,652,380 A | 7/1997 | Machida |
| 5,719,330 A | 2/1998 | Carr et al. |
| 5,758,307 A | 5/1998 | Haefner et al. |
| 5,767,766 A | 6/1998 | Kwun |
| 5,775,298 A | 7/1998 | Haller |

(56) References Cited

U.S. PATENT DOCUMENTS

| | | | |
|---|---|---|---|
| 5,809,437 A | 9/1998 | Breed | |
| 5,832,404 A | 11/1998 | Amano | |
| 5,844,769 A | 12/1998 | Maier | |
| 5,847,282 A | 12/1998 | Keller | |
| 5,848,372 A * | 12/1998 | Ito et al. | 701/111 |
| 5,915,272 A | 6/1999 | Foley et al. | |
| 5,920,008 A | 7/1999 | Kishimoto et al. | |
| 5,924,398 A | 7/1999 | Choi | |
| 5,955,942 A | 9/1999 | Slifkin et al. | |
| 5,978,728 A | 11/1999 | Fontana et al. | |
| 5,979,407 A | 11/1999 | Wang et al. | |
| 6,006,154 A | 12/1999 | Wang | |
| 6,006,157 A | 12/1999 | Dai et al. | |
| 6,012,426 A | 1/2000 | Blommer | |
| 6,026,639 A | 2/2000 | Kumar | |
| 6,028,537 A | 2/2000 | Suman et al. | |
| 6,032,648 A | 3/2000 | Mayer et al. | |
| 6,038,495 A | 3/2000 | Schiffmann | |
| 6,070,469 A | 6/2000 | Taniguchi et al. | |
| 6,118,282 A | 9/2000 | Grieger | |
| 6,148,808 A | 11/2000 | Kainz | |
| 6,176,137 B1 | 1/2001 | Sasaki et al. | |
| 6,186,009 B1 | 2/2001 | Miyano et al. | |
| 6,216,664 B1 | 4/2001 | Bochum et al. | |
| 6,243,641 B1 * | 6/2001 | Andrews | G01M 15/08 123/436 |
| 6,276,319 B2 | 8/2001 | Walter et al. | |
| 6,314,952 B1 | 11/2001 | Turin et al. | |
| 6,330,510 B1 | 12/2001 | Takaku et al. | |
| 6,347,519 B1 | 2/2002 | Kreso | |
| 6,371,092 B1 | 4/2002 | Guglielmo et al. | |
| 6,382,014 B1 | 5/2002 | Breton | |
| 6,388,444 B1 | 5/2002 | Hahn et al. | |
| 6,449,535 B1 | 9/2002 | Obradovich et al. | |
| 6,456,928 B1 | 9/2002 | Johnson | |
| 6,460,400 B1 | 10/2002 | Ichikawa | |
| 6,467,472 B1 | 10/2002 | Strauss | |
| 6,470,732 B1 | 10/2002 | Breton | |
| 6,484,080 B2 | 11/2002 | Breed | |
| 6,484,589 B1 | 11/2002 | Brock | |
| 6,516,781 B2 | 2/2003 | Weisman | |
| 6,529,808 B1 | 3/2003 | Diem | |
| 6,546,812 B2 | 4/2003 | Lewis | |
| 6,553,305 B2 | 4/2003 | Dixon et al. | |
| 6,560,526 B1 | 5/2003 | Matekunas et al. | |
| 6,584,853 B2 | 7/2003 | Park et al. | |
| 6,588,210 B2 | 7/2003 | Kreso | |
| 6,591,184 B2 | 7/2003 | Yonezawa et al. | |
| 6,604,033 B1 | 8/2003 | Banet et al. | |
| 6,609,051 B2 | 8/2003 | Fiechter et al. | |
| 6,609,416 B2 | 8/2003 | Brock | |
| 6,651,490 B1 | 11/2003 | Ceccarani et al. | |
| 6,684,151 B1 | 1/2004 | Ring | |
| 6,691,023 B2 | 2/2004 | Fujino et al. | |
| 6,708,092 B1 | 3/2004 | Starks et al. | |
| 6,711,944 B2 | 3/2004 | Maruta et al. | |
| 6,733,036 B2 | 5/2004 | Breed et al. | |
| 6,735,506 B2 | 5/2004 | Breed et al. | |
| 6,738,697 B2 | 5/2004 | Breed | |
| 6,738,706 B2 | 5/2004 | Cullen et al. | |
| 6,775,602 B2 | 8/2004 | Gordon et al. | |
| 6,776,032 B2 | 8/2004 | Matsui et al. | |
| 6,791,456 B2 | 9/2004 | Nakayama et al. | |
| 6,823,244 B2 | 11/2004 | Breed | |
| 6,845,307 B2 | 1/2005 | Rother | |
| 6,850,824 B2 | 2/2005 | Breed | |
| 6,892,694 B2 | 5/2005 | Uchiyama et al. | |
| 6,935,103 B2 | 8/2005 | Binder et al. | |
| 6,935,313 B2 | 8/2005 | Jacobson | |
| 6,945,229 B1 | 9/2005 | Zhu et al. | |
| 6,947,817 B2 | 9/2005 | Diem | |
| 6,947,831 B2 | 9/2005 | van Nieuwstadt | |
| 6,968,268 B2 | 11/2005 | Yamada et al. | |
| 6,975,936 B2 | 12/2005 | Akuzawa et al. | |
| 6,999,866 B2 | 2/2006 | Noda | |
| 7,012,512 B2 | 3/2006 | St. Denis | |
| 7,021,128 B2 | 4/2006 | Rauchfuss et al. | |
| 7,027,909 B2 | 4/2006 | deBotton et al. | |
| 7,031,828 B1 * | 4/2006 | Thompson et al. | 701/114 |
| 7,050,897 B2 | 5/2006 | Breed et al. | |
| 7,062,955 B2 | 6/2006 | Kashiwase et al. | |
| 7,072,760 B2 | 7/2006 | Rossignol | |
| 7,073,375 B2 | 7/2006 | Parker et al. | |
| 7,096,726 B2 | 8/2006 | Brock | |
| 7,103,460 B1 | 9/2006 | Breed | |
| 7,107,819 B2 | 9/2006 | Okazaki et al. | |
| 7,110,878 B2 | 9/2006 | Nakamura et al. | |
| 7,113,861 B2 | 9/2006 | Jacobson | |
| 7,120,533 B2 | 10/2006 | Cesario et al. | |
| 7,142,975 B2 | 11/2006 | Wang et al. | |
| 7,143,651 B2 | 12/2006 | Sasaki et al. | |
| 7,155,965 B2 | 1/2007 | Kim | |
| 7,210,456 B2 | 5/2007 | Moriya et al. | |
| 7,212,912 B2 | 5/2007 | Okubo et al. | |
| 7,231,291 B2 | 6/2007 | Dollmeyer et al. | |
| 7,251,990 B2 | 8/2007 | Taglialatela-Scafati et al. | |
| 7,257,482 B2 | 8/2007 | Yasui | |
| 7,263,428 B2 | 8/2007 | Kobayashi et al. | |
| 7,278,303 B2 | 10/2007 | Piewek et al. | |
| 7,280,906 B2 | 10/2007 | Schneider et al. | |
| 7,286,927 B2 | 10/2007 | DeCarlo et al. | |
| 7,377,154 B2 | 5/2008 | Berger et al. | |
| 7,389,680 B2 | 6/2008 | Kassner | |
| 7,406,879 B2 | 8/2008 | Adams et al. | |
| 7,415,347 B2 | 8/2008 | Naber et al. | |
| 7,438,049 B2 | 10/2008 | Caretta et al. | |
| 7,454,954 B2 | 11/2008 | Taglialatela et al. | |
| 7,536,902 B2 | 5/2009 | Tsukamoto et al. | |
| 7,546,762 B2 | 6/2009 | Zhang | |
| 7,568,383 B2 | 8/2009 | Colvin et al. | |
| 7,643,916 B2 | 1/2010 | Underdal et al. | |
| 7,650,210 B2 | 1/2010 | Breed | |
| 7,654,133 B2 | 2/2010 | Hoshi et al. | |
| 7,676,323 B2 | 3/2010 | Kearney | |
| 7,694,554 B1 | 4/2010 | Thompson | |
| 7,726,209 B2 | 6/2010 | Ruotoistenmaki | |
| 7,751,955 B2 | 7/2010 | Chinnadurai et al. | |
| 7,761,223 B2 | 7/2010 | Wang et al. | |
| 7,769,523 B2 | 8/2010 | Matsushima et al. | |
| 7,788,020 B2 | 8/2010 | Wolf et al. | |
| 7,788,981 B2 | 9/2010 | Schmid et al. | |
| 7,801,671 B1 * | 9/2010 | Pederson | G01M 15/11 701/111 |
| 7,805,986 B2 | 10/2010 | Colvin et al. | |
| 7,899,608 B1 * | 3/2011 | Pederson | G01M 15/11 701/111 |
| 7,925,399 B2 | 4/2011 | Comeau et al. | |
| 7,930,093 B2 | 4/2011 | Bauer et al. | |
| 7,937,208 B2 | 5/2011 | Piper | |
| 7,953,530 B1 | 5/2011 | Pederson et al. | |
| 7,962,271 B1 | 6/2011 | Thompson et al. | |
| 7,962,272 B2 | 6/2011 | Cesario et al. | |
| 8,019,501 B2 | 9/2011 | Breed | |
| 8,020,434 B1 | 9/2011 | Thompson | |
| 8,135,508 B1 | 3/2012 | Thompson et al. | |
| 8,146,409 B2 | 4/2012 | Catanese et al. | |
| 8,166,805 B1 | 5/2012 | Thompson | |
| 8,170,777 B2 | 5/2012 | Fernitz et al. | |
| 8,190,352 B2 | 5/2012 | Brandt et al. | |
| 8,214,176 B2 | 7/2012 | Iwazaki et al. | |
| 8,223,151 B2 | 7/2012 | Rule et al. | |
| 8,229,624 B2 | 7/2012 | Breed | |
| 8,239,093 B1 | 8/2012 | Thompson et al. | |
| 8,260,531 B2 | 9/2012 | Yasuda | |
| 8,260,576 B2 | 9/2012 | Iwazaki et al. | |
| 8,297,114 B2 | 10/2012 | Ramond et al. | |
| 2002/0007237 A1 | 1/2002 | Phung et al. | |
| 2002/0014113 A1 | 2/2002 | Takaku et al. | |
| 2002/0157482 A1 | 10/2002 | Silvis et al. | |
| 2002/0189369 A1 | 12/2002 | Lewis | |
| 2002/0193925 A1 | 12/2002 | Funkhouser et al. | |
| 2003/0060953 A1 | 3/2003 | Chen | |
| 2003/0101974 A1 | 6/2003 | Wienand et al. | |
| 2003/0176959 A1 | 9/2003 | Breed | |

(56) References Cited

U.S. PATENT DOCUMENTS

| | | |
|---|---|---|
| 2003/0216853 A1 | 11/2003 | Jacobson |
| 2004/0015278 A1 | 1/2004 | Gordon et al. |
| 2004/0089061 A1 | 5/2004 | Matsunaga et al. |
| 2004/0107762 A1 | 6/2004 | Silvis et al. |
| 2004/0172177 A1 | 9/2004 | Nagai et al. |
| 2004/0215379 A1 | 10/2004 | Pangerl et al. |
| 2004/0220716 A1* | 11/2004 | Yokohata .............. G05B 17/02 701/102 |
| 2005/0027403 A1 | 2/2005 | Nagai et al. |
| 2005/0061054 A1 | 3/2005 | Silvis et al. |
| 2005/0159923 A1 | 7/2005 | Huang |
| 2005/0182537 A1 | 8/2005 | Tefft et al. |
| 2005/0193804 A1 | 9/2005 | Kokubo |
| 2005/0273218 A1 | 12/2005 | Breed et al. |
| 2006/0010356 A1 | 1/2006 | Snyder et al. |
| 2006/0027650 A1 | 2/2006 | Andreasen et al. |
| 2006/0030980 A1 | 2/2006 | Denis |
| 2006/0030981 A1 | 2/2006 | Robb et al. |
| 2006/0030993 A1 | 2/2006 | Goodell et al. |
| 2006/0101311 A1 | 5/2006 | Lipscomb et al. |
| 2006/0142906 A1 | 6/2006 | Brozovich et al. |
| 2006/0212194 A1 | 9/2006 | Breed |
| 2006/0217228 A1 | 9/2006 | Devita et al. |
| 2006/0282200 A1 | 12/2006 | Thiel et al. |
| 2007/0005202 A1 | 1/2007 | Breed |
| 2007/0078571 A1 | 4/2007 | Heffington |
| 2007/0100520 A1 | 5/2007 | Shah et al. |
| 2007/0107708 A1 | 5/2007 | Uchiyama et al. |
| 2007/0108749 A1 | 5/2007 | Weidner et al. |
| 2007/0129878 A1 | 6/2007 | Pepper |
| 2007/0168089 A1 | 7/2007 | Goldbeck et al. |
| 2007/0272032 A1 | 11/2007 | Adams et al. |
| 2008/0004764 A1 | 1/2008 | Chinnadurai et al. |
| 2008/0040005 A1 | 2/2008 | Breed |
| 2008/0046149 A1 | 2/2008 | Breed |
| 2008/0082221 A1 | 4/2008 | Nagy |
| 2008/0147265 A1 | 6/2008 | Breed |
| 2008/0147271 A1 | 6/2008 | Breed |
| 2008/0148826 A1 | 6/2008 | Raichle et al. |
| 2008/0161989 A1 | 7/2008 | Breed |
| 2008/0284575 A1 | 11/2008 | Breed |
| 2008/0319599 A1 | 12/2008 | Ptak et al. |
| 2009/0133482 A1 | 5/2009 | Iwata et al. |
| 2009/0182484 A1 | 7/2009 | Loeffler et al. |
| 2009/0182485 A1 | 7/2009 | Loeffler et al. |
| 2009/0234562 A1 | 9/2009 | Wolf et al. |
| 2009/0287389 A1 | 11/2009 | Bauer et al. |
| 2010/0030455 A1 | 2/2010 | Akimoto |
| 2010/0057290 A1 | 3/2010 | Brillhart et al. |
| 2010/0063677 A1 | 3/2010 | Fuhrman et al. |
| 2010/0204876 A1 | 8/2010 | Comeau et al. |
| 2010/0206042 A1 | 8/2010 | Johns et al. |
| 2010/0250289 A1* | 9/2010 | Weaver .............. 705/4 |
| 2010/0286893 A1 | 11/2010 | Huang et al. |
| 2010/0300069 A1 | 12/2010 | Herrmann et al. |
| 2011/0087419 A1 | 4/2011 | Buslepp et al. |
| 2011/0137509 A1* | 6/2011 | Sarac ................ F02D 13/02 701/31.4 |
| 2011/0246044 A1 | 10/2011 | Buslepp et al. |
| 2011/0286831 A1 | 11/2011 | Yerramalla et al. |
| 2011/0302999 A1 | 12/2011 | Porten et al. |

FOREIGN PATENT DOCUMENTS

| | | |
|---|---|---|
| EP | 438429 B1 | 7/1991 |
| EP | 618436 B1 | 10/1994 |
| EP | 662608 A2 | 7/1995 |
| EP | 757240 A2 | 2/1997 |
| EP | 897061 A2 | 2/1999 |
| EP | 907016 A2 | 4/1999 |
| EP | 922947 A1 | 6/1999 |
| EP | 999438 A2 | 5/2000 |
| EP | 1056999 B1 | 12/2000 |
| EP | 662608 B1 | 2/2001 |
| EP | 757240 B1 | 2/2002 |
| EP | 897061 B1 | 4/2003 |
| EP | 763194 B1 | 1/2005 |
| EP | 1586881 B1 | 10/2005 |
| EP | 1662244 B1 | 5/2006 |
| EP | 907016 B1 | 6/2006 |
| EP | 1705357 A1 | 9/2006 |
| EP | 1754866 A1 | 2/2007 |
| EP | 2050520 A2 | 4/2009 |
| EP | 2108109 B1 | 10/2009 |
| EP | 2108935 A1 | 10/2009 |
| EP | 2269058 A1 | 1/2011 |
| FR | 2681425 A1 | 3/1993 |
| FR | 2757632 A1 | 6/1998 |
| FR | 2857701 A1 | 1/2005 |
| FR | 2895024 A1 | 6/2007 |
| GB | 2301898 A | 12/1996 |
| GB | 2349952 A | 11/2000 |
| GB | 2349952 B | 2/2003 |
| GB | 2388925 A | 11/2003 |
| GB | 2388925 B | 7/2005 |
| JP | 43021752 | 9/1968 |
| JP | 56147530 A | 11/1981 |
| JP | 60166739 A | 8/1985 |
| JP | 63017432 A | 1/1988 |
| JP | 64015937 A | 1/1989 |
| JP | 64015937 U | 1/1989 |
| JP | 1182150 A | 7/1989 |
| JP | 1229741 A | 9/1989 |
| JP | 4046843 A | 2/1992 |
| JP | 4081557 A | 3/1992 |
| JP | 48001557 A | 3/1992 |
| JP | 4321752 A | 11/1992 |
| JP | 4325755 A | 11/1992 |
| JP | 43025755 A | 11/1992 |
| JP | 6317215 A | 11/1994 |
| JP | 7233754 A | 9/1995 |
| JP | 11082150 A | 3/1999 |
| JP | 4072448 A | 11/2003 |
| JP | 40072448 A | 11/2003 |
| JP | 2011127547 A | 6/2011 |
| RU | 2162213 C1 | 1/2001 |
| WO | WO9004093 A1 | 4/1990 |
| WO | WO0246591 A1 | 6/2002 |
| WO | WO2005103466 A3 | 11/2005 |

* cited by examiner

Note that T(s) is actually Freq (Hz) if FFT    www.AutomotiveTestSolutions.com

| Cycle #1, Cylinder #: | 1 | 2 | 3 | 4 | 5 | 6 | |
|---|---|---|---|---|---|---|---|
| Locust Length/s | 336.26 | 358.69 | 210.44 | 444.59 | 208.11 | 217.84 | |
| Dim. Change/s | 169.492 | 67.797 | 305.085 | 67.797 | 305.085 | 629.139 | |
| Dim. Change/Loc. Len. | 0.504 | 0.189 | 1.450 | 0.152 | 1.466 | 2.888 | 6.649 |
| Bump% (<=5Cyl) | 0.0 | 0.0 | 0.0 | 0.0 | 0.0 | 0.0 | |
| % From Bottom | 27.42 | 37.63 | 33.87 | 31.72 | 32.80 | 32.26 | |
| Cycle #2, Cylinder #: | 1 | 2 | 3 | 4 | 5 | 6 | |
| Locust Length/s | 424.26 | 331.94 | 133.58 | 266.45 | 230.37 | 166.54 | |
| Dim. Change/s | 406.780 | 474.576 | 169.492 | 101.595 | 406.780 | 375.000 | |
| Dim. Change/Loc. Len. | 0.959 | 1.430 | 1.269 | 0.382 | 1.766 | 2.252 | 8.056 |
| Bump% (<=5Cyl) | 0.0 | 0.0 | 0.0 | 0.0 | 0.0 | 0.0 | |
| % From Bottom | 28.50 | 31.18 | 39.25 | 24.73 | 34.95 | 34.95 | |
| Cycle #3, Cylinder #: | 1 | 2 | 3 | 4 | 5 | 6 | |
| Locust Length/s | 323.16 | 252.92 | 233.09 | 170.93 | 214.13 | 184.99 | |
| Dim. Change/s | 101.695 | 406.780 | 237.288 | 305.085 | 271.186 | 101.695 | |
| Dim. Change/Loc. Len. | 0.315 | 1.608 | 1.018 | 1.785 | 1.266 | 0.550 | 6.542 |
| Bump% (<=5Cyl) | 0.0 | 0.0 | 0.0 | 0.0 | 0.0 | 0.0 | |
| % From Bottom | 25.27 | 31.18 | 34.95 | 31.72 | 32.26 | 39.79 | |
| Cycle #4, Cylinder #: | 1 | 2 | 3 | 4 | 5 | 6 | |
| Locust Length/s | 213.48 | 239.35 | 293.37 | 269.18 | 372.40 | 397.46 | |
| Dim. Change/s | 305.085 | 169.492 | 169.492 | 101.595 | 135.593 | 106.762 | |
| Dim. Change/Loc. Len. | 1.429 | 0.708 | 0.578 | 0.378 | 0.364 | 0.269 | 3.725 |
| Bump% (<=5Cyl) | 0.0 | 0.0 | 0.0 | 0.0 | 0.0 | 0.0 | |
| % From Bottom | 25.81 | 23.12 | 41.40 | 31.72 | 26.88 | 18.28 | |
| Cycle #5, Cylinder #: | 1 | 2 | 3 | 4 | 5 | 6 | |
| Locust Length/s | 524.80 | 444.34 | 471.39 | 257.67 | 277.67 | 264.46 | |
| Dim. Change/s | 135.593 | 338.983 | 67.797 | 474.576 | 203.390 | 98.039 | |
| Dim. Change/Loc. Len. | 0.258 | 0.763 | 0.144 | 1.842 | 0.732 | 0.371 | 4.110 |
| Bump% (<=5Cyl) | 0.0 | 0.0 | 0.0 | 0.0 | 0.0 | 0.0 | |
| % From Bottom | 25.27 | 22.58 | 22.58 | 30.11 | 29.03 | 26.34 | |
| Cycle #6, Cylinder #: | 1 | 2 | 3 | 4 | 5 | 6 | |
| Locust Length/s | 386.72 | 369.35 | 429.20 | 370.67 | 391.65 | 295.73 | |
| Dim. Change/s | 169.492 | 338.983 | 271.186 | 101.695 | 169.492 | 173.410 | |
| Dim. Change/Loc. Len. | 0.438 | 0.918 | 0.632 | 0.274 | 0.433 | 0.586 | 3.281 |
| Bump% (<=5Cyl) | 0.0 | 0.0 | 0.0 | 0.0 | 0.0 | 0.0 | |
| % From Bottom | 28.49 | 29.03 | 19.89 | 33.87 | 26.34 | 33.87 | |
| Cycle #7, Cylinder #: | 1 | 2 | 3 | 4 | 5 | 6 | |
| Locust Length/s | 389.85 | 342.66 | 184.69 | 242.02 | 165.90 | 222.61 | |
| Dim. Change/s | 67.797 | 135.593 | 169.492 | 203.390 | 169.492 | 346.821 | |
| Dim. Change/Loc. Len. | 0.174 | 0.396 | 0.918 | 0.840 | 1.022 | 1.558 | 4.907 |
| Bump% (<=5Cyl) | 0.0 | 0.0 | 0.0 | 0.0 | 0.0 | 0.0 | |
| % From Bottom | 24.19 | 27.42 | 27.42 | 29.03 | 40.32 | 25.27 | |
| Cycle #8, Cylinder #: | 1 | 2 | 3 | 4 | 5 | 6 | |
| Locust Length/s | 421.02 | 300.07 | 395.18 | 460.63 | 273.49 | 207.05 | |
| Dim. Change/s | 169.492 | 169.492 | 169.492 | 305.085 | 237.288 | 552.147 | |
| Dim. Change/Loc. Len. | 0.403 | 0.565 | 0.429 | 0.662 | 0.868 | 2.667 | 5.593 |
| Bump% (<=5Cyl) | 0.0 | 0.0 | 0.0 | 0.0 | 0.0 | 0.0 | |
| % From Bottom | 21.51 | 29.57 | 9.68 | 7.53 | 33.33 | 25.81 | |

FIG. 14A

| Cycle #9, Cylinder #: | 1 | 2 | 3 | 4 | 5 | 6 | |
|---|---|---|---|---|---|---|---|
| Locust Length/s | 231.56 | 211.27 | 265.84 | 301.57 | 433.82 | 238.41 | |
| Dirn. Change/s | 406.780 | 542.373 | 576.271 | 101.695 | 67.797 | 123.457 | |
| Dirn. Change/Loc. Len. | 1.757 | 2.567 | 2.168 | 0.337 | 0.156 | 0.518 | 7.503 |
| Bump% (<=5Cyl) | 0.0 | 0.0 | 0.0 | 0.0 | 0.0 | 0.0 | |
| % From Bottom | 23.12 | 27.42 | 23.66 | 17.74 | 33.87 | 38.17 | |
| Cycle #10, Cylinder #: | 1 | 2 | 3 | 4 | 5 | 6 | |
| Locust Length/s | 243.18 | 341.57 | 321.74 | 417.27 | 329.69 | 324.48 | |
| Dirn. Change/s | 372.881 | 271.186 | 203.390 | 67.797 | 67.797 | 210.843 | |
| Dirn. Change/Loc. Len. | 1.533 | 0.794 | 0.632 | 0.162 | 0.206 | 0.650 | 3.977 |
| Bump% (<=5Cyl) | 0.0 | 0.0 | 0.0 | 0.0 | 0.0 | 0.0 | |
| % From Bottom | 33.87 | 16.67 | 25.27 | 16.13 | 30.11 | 35.48 | |
| Cycle #11, Cylinder #: | 1 | 2 | 3 | 4 | 5 | 6 | |
| Locust Length/s | 269.48 | 295.35 | 312.92 | 253.05 | 213.97 | 320.73 | |
| Dirn. Change/s | 338.983 | 203.390 | 169.492 | 474.576 | 474.576 | 306.122 | |
| Dirn. Change/Loc. Len. | 1.258 | 0.689 | 0.542 | 1.875 | 2.218 | 0.954 | 7.536 |
| Bump% (<=5Cyl) | 0.0 | 0.0 | 0.0 | 0.0 | 0.0 | 0.0 | |
| % From Bottom | 24.19 | 32.26 | 27.96 | 26.34 | 33.87 | 34.95 | |

FIG. 14B

| 14A |
|---|
| 14B |

```
MisFireMinimumMisses=6
MisFireMultiplier=3.5
MinBumpPercent=2.0
BumpMap=4 .0000 : 0, 5.5000 : 2, 6.0000 : 3, 7.0000 : 4, 10.0000 : 5, 25.000 : 9
HighMapThreshold=19.0
HighMap=19. 0 : 0, 24.0 : 3, 30.0 :4, 38.0 : 7, 40.0 : 9
3CylMap=0.0001 : 0, 0.0010 : 3, 0.0020 : 4, 0.2000 : 5, 0.9000 : 9
4CylMap=0.0001 : 0, 0.0010 : 3, 0.0020 : 4, 0.2000 : 5, 0.9000 : 9
5CylMap=0.0002 : 0, 0.0010 : 3, 0.0020 : 4, 0.2000 : 5, 0.9000 : 9
6CylMap=0.0020 : 0, 0.0200 : 3, 0.0300 : 4, 0.0400 : 5, 0.5000: 7, 5.0000: 9
8CylMap=0.0040 : 0, 0.0200 : 3, 0.0300 : 4, 0.0400 : 5, 0.5000: 7, 5.0000: 9
Bottom8adThreshold=5
BottomMap=0.0 : 0, 10. 0: 2, 13. 0 : 3, 16. 0 : 4, 20.0 : 5, 25. 0 : 6, 30. 0 : 9
*BottomMap=0.0 : 0, 10. 0: 2, 13. 0 : 4, 16. 0 : 6, 20.0 : 7, 25. 0 : 8, 30. 0 : 9
```

Note that T(s) is actually Freq (Hz) if FFT    www.AutomotiveTestSolutions.com

Note that T(s) is actually Freq (Hz) if FFT    www.AutomotiveTestSolutions.com

Note that T(s) is actually Freq (Hz) if FFT    www.AutomotiveTestSolutions.com

Note that T(s) is actually Freq (Hz) if FFT    www.AutomotiveTestSolutions.com

SYSTEM AND METHOD FOR ANALYZING CARBON BUILD UP IN AN ENGINE

CROSS-REFERENCE TO RELATED APPLICATIONS

This application claims priority to U.S. Provisional Application No. 61/663,341, filed on 22 Jun. 2012, and entitled "Induction Cleaning Analyzer," and also claims priority to U.S. Provisional Application No. 61/712,003, filed on 10 Oct. 2012, and entitled "Carbon Build Up Analyzer," the entire disclosures of which are incorporated by reference.

TECHNICAL FIELD

This inventive subject matter described herein generally relates to internal combustion engines and the carbon compound build up that occurs within such engines over time. More particularly, the inventive subject matter relates to automotive test equipment and methods of detecting cylinder combustion efficiencies, including lower efficiencies that may be caused by carbon build up in the internal combustion engine.

BACKGROUND

The internal combustion engine has powered the world for over a century. This basic engine design puts the cylinder under a compression load, thus heating the air charge contained within cylinder. The internal combustion engine can be of two different designs, compression ignition or spark ignition. In the compression ignition engine, the fuel is directly injected into the combustion chamber where the heated air charge due to the compression has enough thermal energy to ignite the fuel. In the spark ignition engine, the fuel is delivered into the intake manifold or directly injected into the combustion chamber, the compression heats the air charge, but the thermal energy from the compression is not enough to ignite the fuel. The spark that is generated from a transformer is used to ionize the spark plug electrodes creates plasma that has enough thermal energy to ignite the fuel.

Both of the above described engine designs are thermal engines that are powered by fuel stocks that are hydrocarbon based. These hydrocarbon based fuels contain hydrogen atoms and carbon atoms that are arranged in chains. When these high energy chains are put under enough load, the chains will break apart and, in the presence of oxygen, will recombine with the oxygen forming a low energy molecule. When the high energy chain is converted to a low energy molecule, energy in the form of heat is created. This thermal energy heats the working fluid (e.g., nitrogen), which expands and pushes the piston down to produce torque on the crankshaft. When these hydrocarbon chains are ignited and burned, carbon compounds are produced. For the most part, these carbon compounds are pushed out of the exhaust under pressure to the atmosphere. Those carbon compounds that are not pushed out the exhaust go by the piston rings becoming crankcase blow by or go into the intake manifold (also referred to as the "air induction system" or "induction system") when the intake valve opens. The carbon compounds that go into the crankcase are pulled into the intake manifold through the Positive Crankcase Ventilation ("PCV") system. Additionally, the PCV system allows some of the lubrication oil compounds to enter into the air induction system.

In either case, carbon compounds end up entering into the induction system of the running engine. One molecule after another molecule, the carbon compounds attach to the surfaces in the internal combustion engine, including the air induction system. Over time these carbon compounds build up on the surfaces of the engine. When the carbon layers become large enough to disrupt the air charge moving through the intake track into the cylinder, the combustion efficiency of the cylinders are lowered which, in turn, lowers the cylinder pressure. Since the fuel releases thermal energy that heats the nitrogen within the cylinder, variations in the air/fuel charge changes the pressure within the cylinder. These lowered cylinder pressures or lower combustion efficiencies lower the torque at the crankshaft thus lowering the engine's performance.

Different engine configurations, fuel stocks, engine loads, engine running times, and engine running temperatures change the rate that the carbon compounds build up within engines. This indicates that these variables change the time intervals that an engine will need between induction cleaning What is needed is apparatus for and a method in which the carbon compounds accumulation within an engine can be accurately judged.

In U.S. Pat. Nos. 7,801,671 and 7,899,608 to Pederson, a method of identifying one or more misfires occurring in an internal combustion engine is disclosed. The apparatus and methods disclosed in the Pederson et al. patents can be used to determine combustion efficiency. Such equipment and methodology, however, is for a trained technician. For instance, it requires someone of relatively significant skill to find and connect a monitoring device to the ignition coil and interpret acquired data to determine the carbon compound build up within the engine.

BRIEF SUMMARY

In an embodiment, the inventive subject matter relates to apparatus and a method of identifying cyclic cylinder pressure variations, which correlate with combustion efficiencies, occurring in an internal combustion engine. The method can include running an engine, placing a trigger antenna on the engine, measuring pressure pulses from an exhaust of the engine and/or an air induction system of the engine, generating a waveform from the measured pressure pulses, dividing the waveform into segments based on signals from the trigger antenna (e.g., one waveform for each cylinder of the engine, where each segment represents a pressure pulse), associating each waveform segment with a cylinder count (e.g., the number of cylinders the engine being tested has), and comparing a plurality of individual cylinder waveform segments produced from the same cylinder to each other to identify differences over a specified time.

The method also can include providing an algorithm that identifies cyclic pressure variations, converting, with an algorithm, the cyclic pressure variations into a scale that indicates different degrees of cyclic pressure variations (e.g., good, fair, bad, and very bad), indicating if the induction system needs to be cleaned by turning on an alert indicator, identifying a total lack of combustion or a misfire and turning on a misfire alert indicator, identifying if the tail pipe sensor (or air induction sensor) is properly positioned in the exhaust (or intake manifold) or not and, if the sensor is not properly positioned in the exhaust (or air intake) stream activating an alert indicator and suspending the test, and identifying if the trigger antenna is on top of the engine or not and, if the antenna is not on top of the engine, activating an alert indicator and suspending the test. The method further includes identifying the engine that is being tested (e.g., by the use of a drop down menu or using the vehicle identification number) to determine whether or not such engine needs the base algorithm to be modified or not.

Modifying the base algorithm with a multiplier can ensure accurate test results across various or all years, makes, and models of engines.

In an embodiment, an induction cleaning analyzing system includes a pressure sensor, an ignition event detector, and a control module. The pressure sensor is configured to measure airflow pressures flowing in a common airflow pathway of a vehicle into which at least one of exhausts from plural cylinders in an engine flow or intake air is drawn by the cylinders. The ignition event detector is configured to determine ignition events of the respective cylinders. The control module is configured to obtain pressure waveforms representative of the airflow pressures in the common airflow pathway as measured by the pressure sensor and to divide the pressure waveforms into waveform segments. The control module also is configured to associate different subsets of the waveform segments with different ones of the cylinders using the ignition events determined by the ignition event detector. The control module also is configured to identify cyclic variations in the airflow pressures flowing in the common airflow pathway and caused by at least one of the cylinders by examining the waveform segments associated with the at least one of the cylinders.

In an embodiment, a method (e.g., for analyzing carbon build up in an engine) includes measuring airflow pressures flowing in a common airflow pathway of a vehicle into which at least one of exhausts from plural cylinders in an engine flow or intake air is drawn by the cylinders using a pressure sensor that is at least partially disposed in the common airflow pathway, determining when ignition events of the respective cylinders occur, dividing pressure waveforms representative of the airflow pressures into waveform segments, associating different subsets of the waveform segments with different ones of the cylinders using the ignition events determined by the ignition event detector, and identifying cyclic variations in the airflow pressures flowing in the common airflow pathway and caused by at least one of the cylinders by examining the waveform segments associated with the at least one of the cylinders.

In an embodiment, a system (e.g., for analyzing airflow through cylinders of an engine) includes a pressure sensor, an ignition event detector, and a control module. The pressure sensor is configured to measure at least one of intake air pressures or exhaust pressures of plural cylinders flowing through a common air passageway associated with an engine. The ignition event detector is configured to sense ignition signals representative of combustion cycles of the cylinders. The control module is configured to separate the at least one of intake air pressures or exhaust pressures into waveform segments and to associate different subsets of the waveform segments with different ones of the cylinders. The control module is configured to identify variations in the at least one of intake air pressures or exhaust pressures caused by at least one of the cylinders by identifying cyclic variations in the waveform segments in the subset of the waveform segments that are associated with the at least one of the cylinders.

BRIEF DESCRIPTION OF THE DRAWINGS

Reference is now made briefly to the accompanying drawings, in which:

FIGS. 14A and 14B are a screen shot illustrating a cylinder count chart;

DETAILED DESCRIPTION

Figure 1:
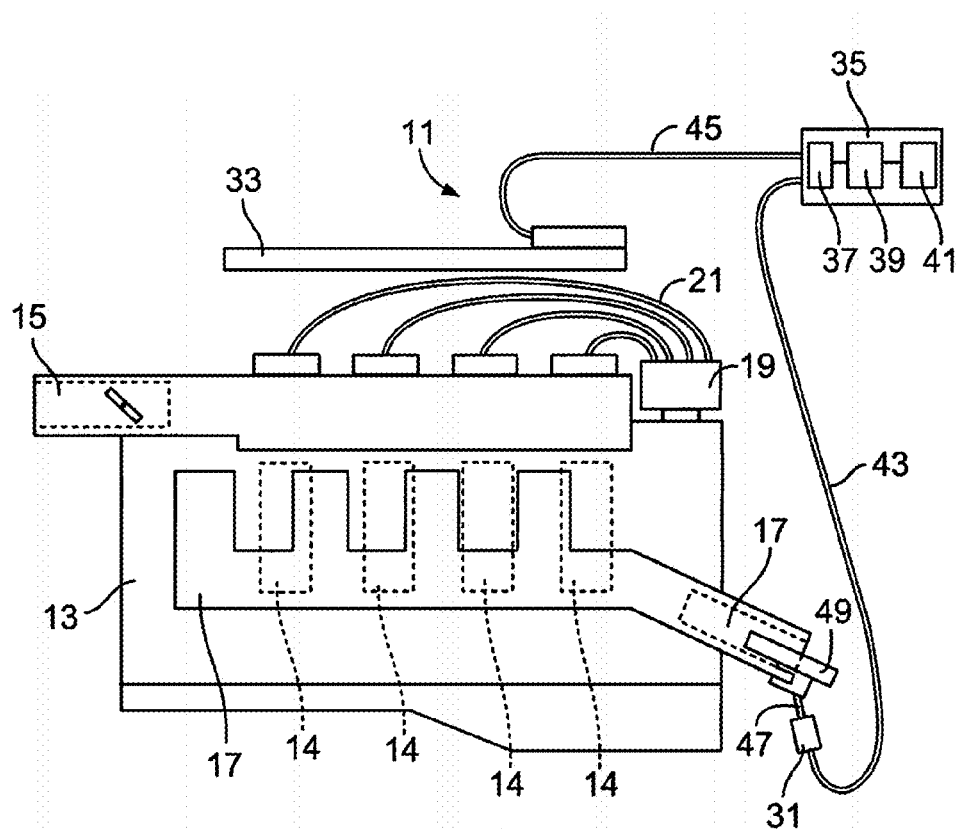
FIG. 1 is a schematic illustration of an engine having spark plug wires and using a tail pipe venturi.
Figure 2:
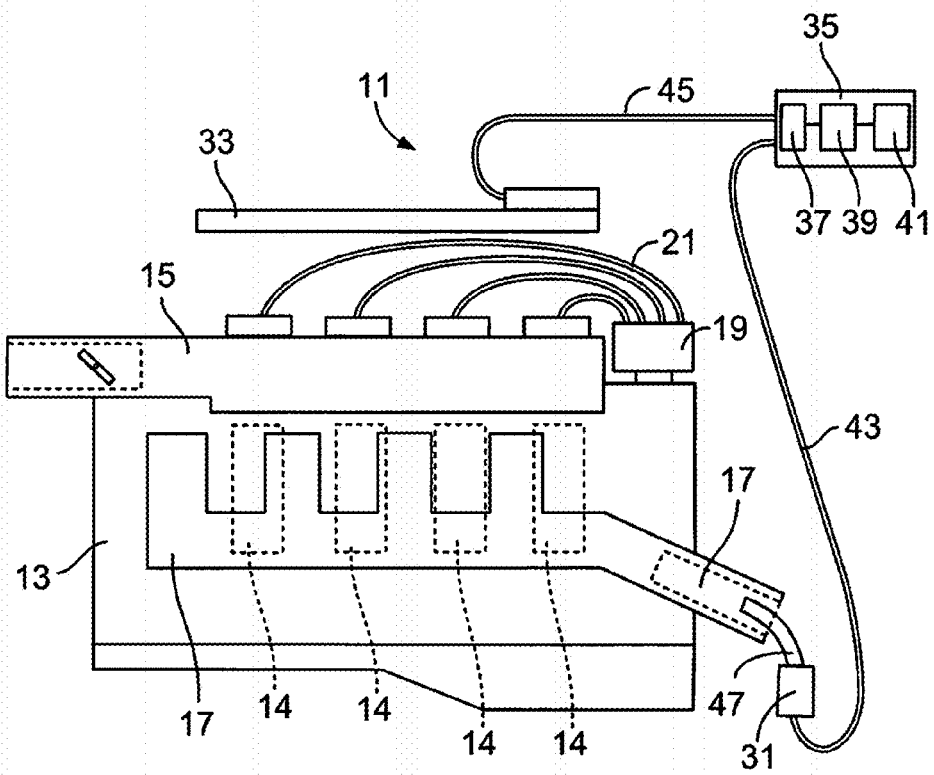
FIG. 2 is a schematic illustration of an engine also having spark plug wires in association with just a tail pipe sensor.
Figure 3:
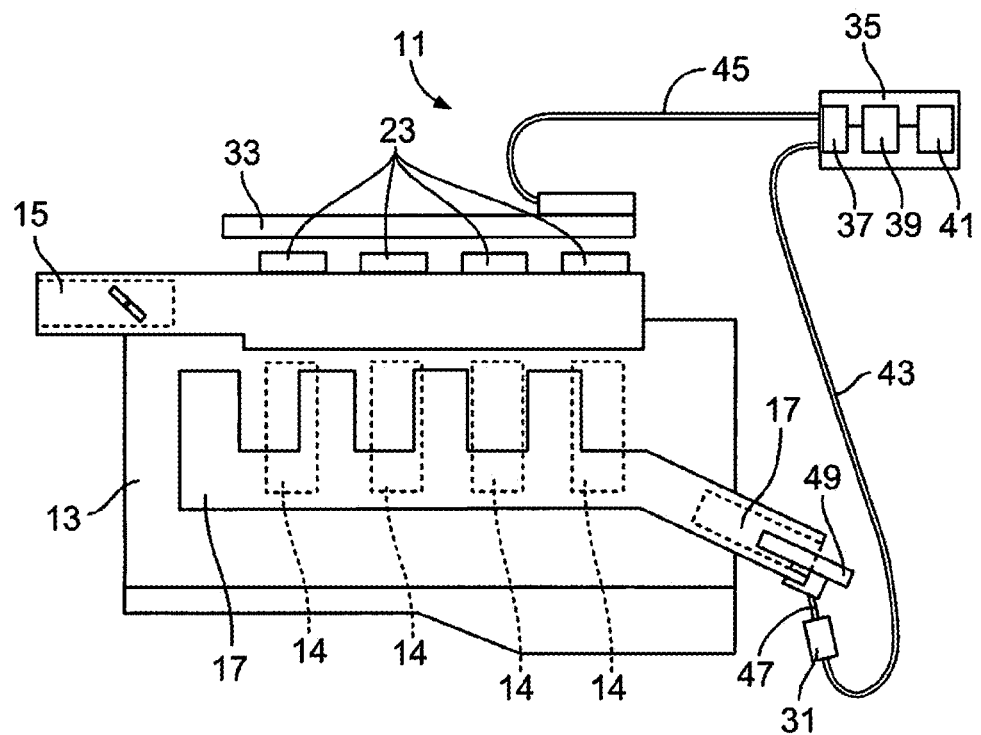
FIG. 3 is a schematic illustration of an engine having Coil On Plug (COP) ignition type in association with a tail pipe venturi.
Figure 4:
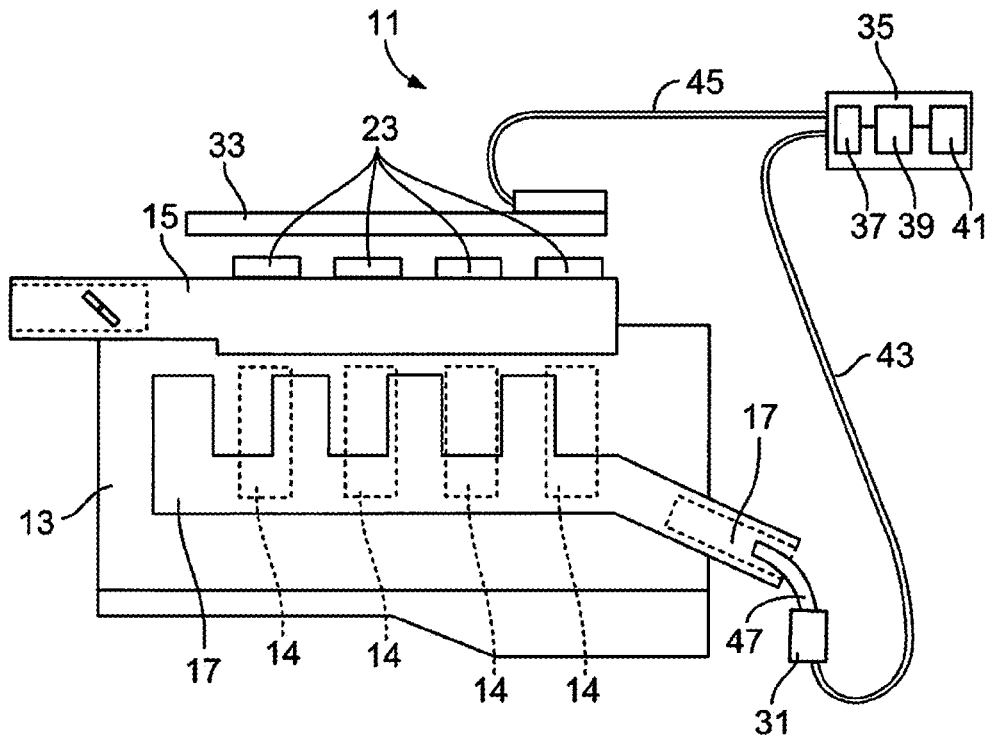
FIG. 4 is another schematic illustration of an engine having Coil On Plug (COP) ignition type in association with a tail pipe sensor.
Figure 5:
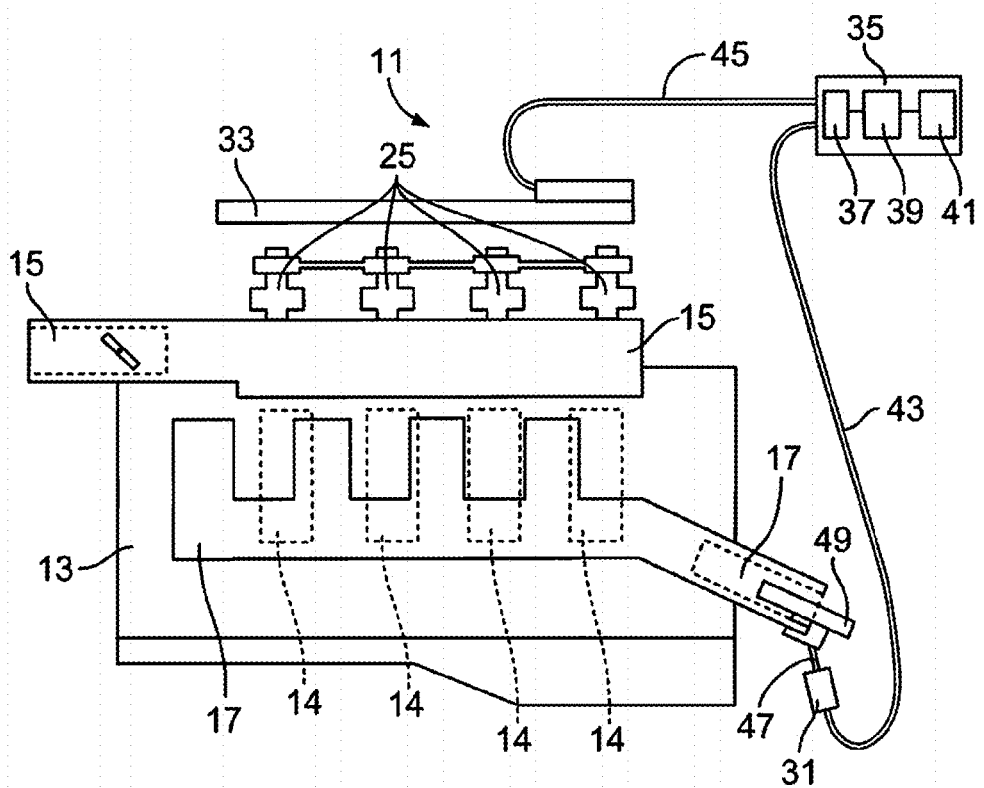
FIG. 5 is a schematic illustration of an engine having compression type ignition system in association with a tail pipe venturi.
Figure 6:
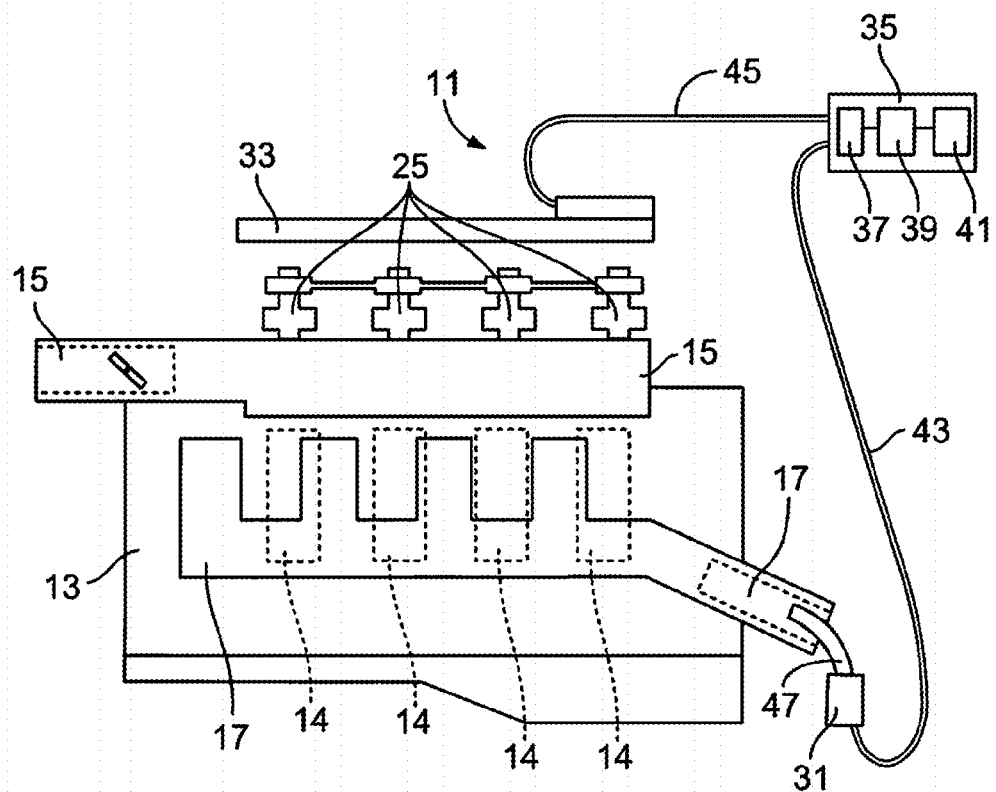
FIG. 6 is another schematic illustration of an engine with compression type ignition in association with a tail pipe sensor.
Figure 7:
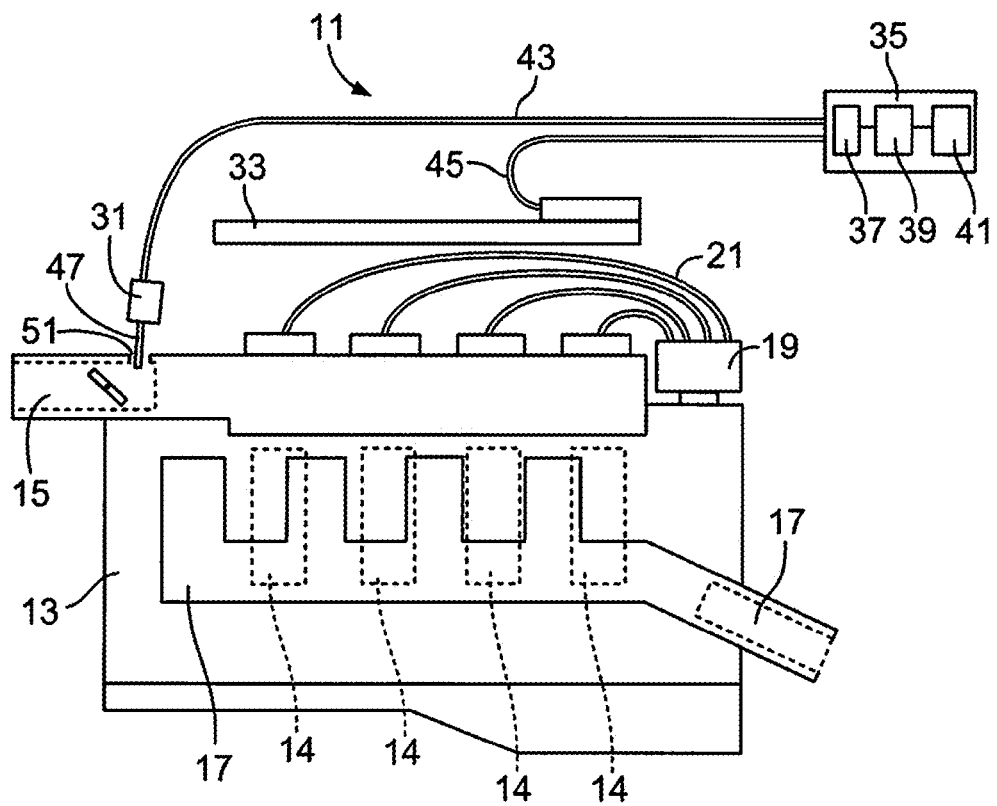
FIG. 7 is a schematic illustration of an engine having spark plug wires, wherein the pressure sensor is positioned in intake manifold instead of the exhaust.

FIGS. 1-6 illustrate the induction cleaning analyzer instrumentation 11 of the inventive subject matter in combination with an internal combustion engine 13. The instrumentation 11 also may be referred to as an induction cleaning analyzer system. With reference to FIGS. 1 and 2, engine 13 includes cylinders 14, an intake manifold 15, an exhaust manifold 17, an ignition coil 19, and spark plug wires 21. With reference to FIGS. 3 and 4, instead of ignition coil 19 and spark plug wires 21, engine 13 includes COPs 23. With reference to FIGS. 5 and 6, instead of ignition coil 19 and spark plug wires or COPs 23, engine 13 (in this case a compression ignition engine) has fuel injectors 25. In FIG. 7, engine 13 is the same as that illustrated in FIGS. 1 and 2. Similarly, in FIG. 8, engine is the same as in FIGS. 3 and 4.

Instrumentation 11 includes pressure sensor 31, antenna 33 and control module 35. The antenna 33 may represent or be referred to as an ignition event detector. Module 35 includes A/D converter 37, microprocessor 39 and computer screen 41. Preferably screen 41 is a touch screen. If not, a key pad (not shown) and a mouse (also not show) would have to be provided. As is also apparent from FIGS. 1-6, pressure sensor 31 and antenna 33 are connected to A/D converter 37 via, respectively, cables 43 and 45. In all 6 of these embodiments, pressure sensor 31 is connected to exhaust manifold 17 via tube 47. In the case of FIGS. 2, 4 and 6 tube 47 is inserted directly in the exhaust. In the case of FIGS. 1, 3 and 5 a tail pipe venturi 49 is included. Venturi 49 is of the type disclosed in U.S. Pat. No. 7,694,554 to Thompson, the disclosure of which is incorporated by reference. For convenience of illustration, tube 47 and venturi 49 are shown inserted directly into manifold 17. However, in actual testing they will be inserted in the tail pipe (not shown) of engine 13's exhaust system.

Figure 8:
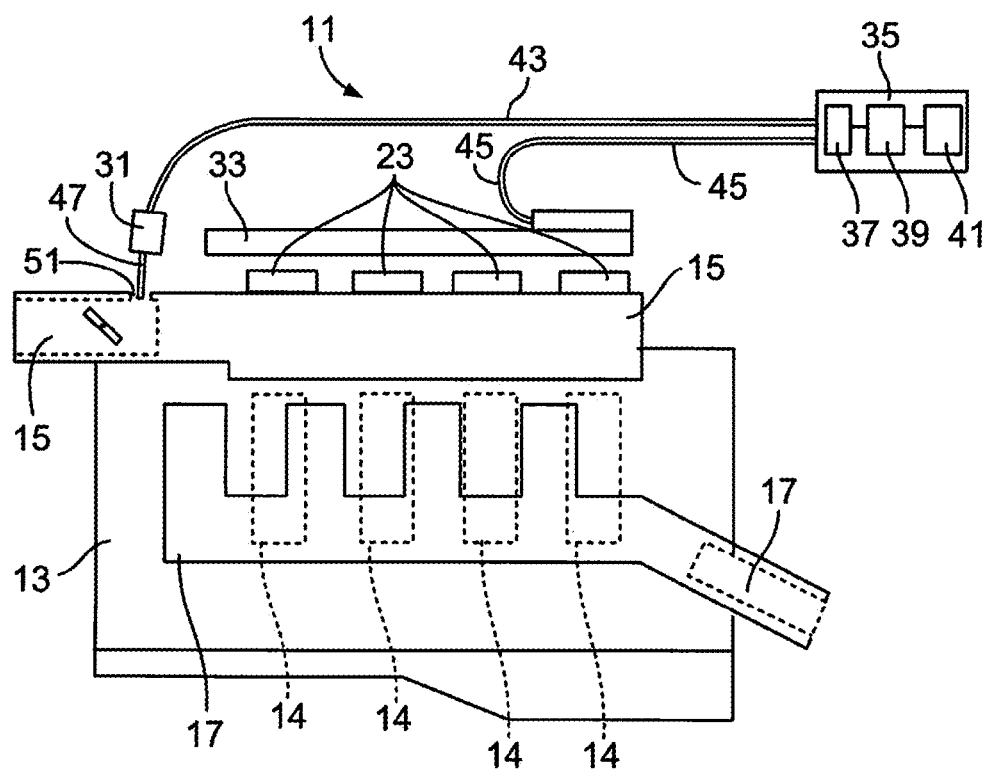
FIG. 8 is a schematic illustration of an engine having Coil On Plug (COP) ignition type, and in association with an intake pressure sensor.

The instrumentation illustrated in FIGS. 7 and 8 is the same as above namely, pressure sensor 31, antenna 33 and control module 35. The only difference is that in these two embodiments pressure sensor 31 is inserted in an opening (not shown) in intake manifold 15.

In operation, air is moved through intake manifold 15 into the cylinders 14 of engine 13. There, in the case of the embodiments of FIGS. 1 and 2, the air/fuel charge is ignited by spark from coil 19. The air/fuel charge is burned in each cylinder during the power stroke and exhausted during the exhaust stroke into exhaust manifold 17. However, as discussed in the Background, some of the carbon compounds produced during the power stroke go by the piston rings becoming crankcase blow by or go into the intake manifold when the intake valve opens. The pressure pulses produced by the exhaust gases in manifold 17 are measured by pressure sensor 31 which is connected to the manifold by hose 47, as illustrated in FIGS. 2, 4 and 6. In the case of the embodiments illustrated in FIGS. 1, 3 and 5, hose 47 is connected to a tail pipe venturi 49.

Pressure sensor 31 measures the exhaust pressure pulses and sends exhaust pressure voltage readings to A/D convertor 37 via cable 43. A/D convertor 37 converts the analog signals from pressure sensor 31 to digital signals and sends a pressure wave form to microprocessor 39. In the case of the embodiments of FIGS. 1-6, this will be a tail pipe pressure waveform. In the case of the embodiments of FIGS. 7-8, discussed below, this will be an induction pressure waveform.

With reference to FIGS. 1 and 2, ignition coil 19 sends ignition signals (one for each cylinder) through spark plug wires 21. These signals are picked up by antenna 33, which is simply placed on top of engine 13, and sent to A/D converter 37 where they are converted to digital signals and then sent to microprocessor 39. In the case of a diesel engine, such as schematically illustrated in FIGS. 5 and 6, antenna 33 picks up the electric fuel injector turn on pulse for each cylinder.

Figure 12:
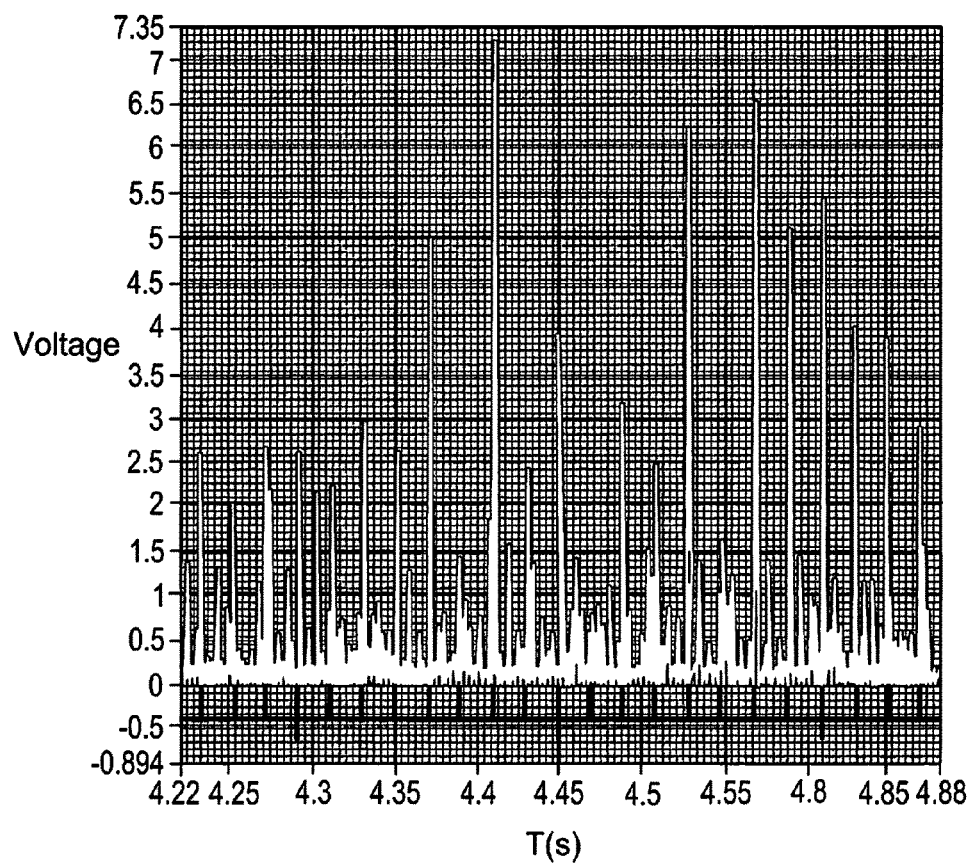
FIG. 12 is a screen shot of a trigger antenna pickup signal from an engine which provides an ignition discharge signal for each cylinder.
Figure 13:
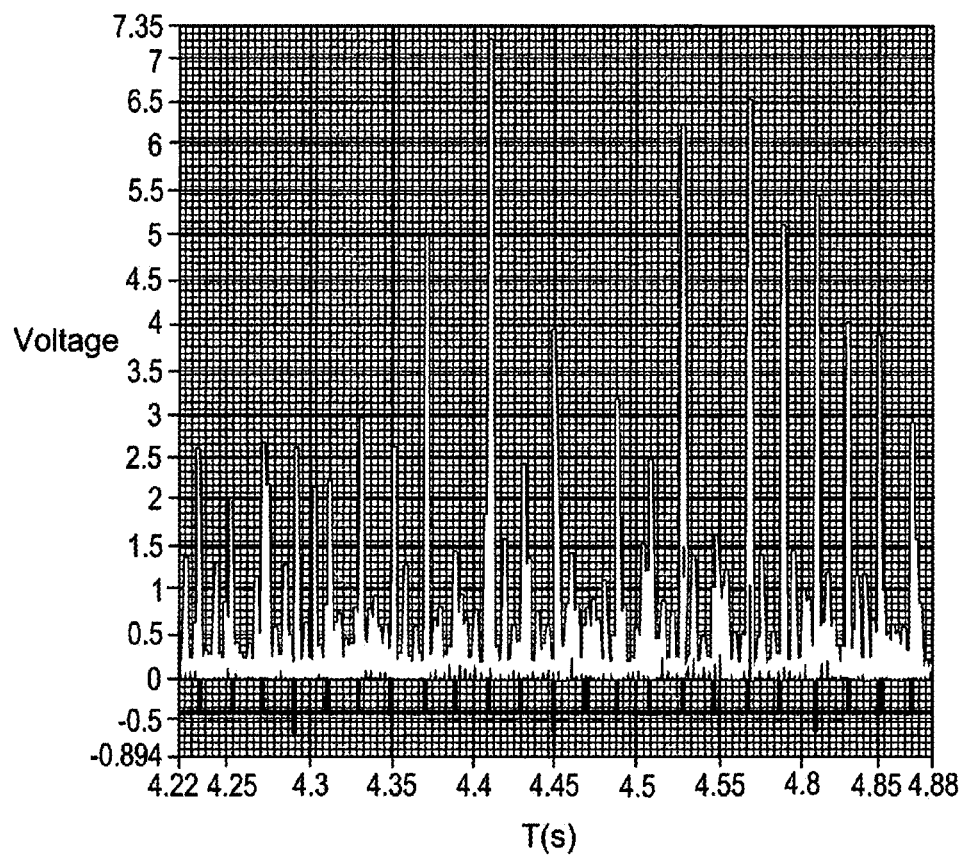
FIG. 13 is a screen shot of a trigger antenna pickup signal from an engine which provides a fuel injector discharge signal for each cylinder.

The above described ignition signals are used to divide the tail pipe pressure waveform into segments. (As discussed with reference to the embodiment of FIGS. 7-8, where the pressure sensor is inserted in intake manifold 15, the pressure waveform will be from the intake manifold.) In FIG. 12 is a shot of screen 41 showing the antenna signal from a spark ignition; in FIG. 13 the screen shot is of an antenna signal from a diesel. In both examples the antenna signal may be presented in one color (e.g., red), to which is added by a microprocessor generated mark, one for each cylinder of the engine being tested, in another color (e.g., green).

Figure 10:
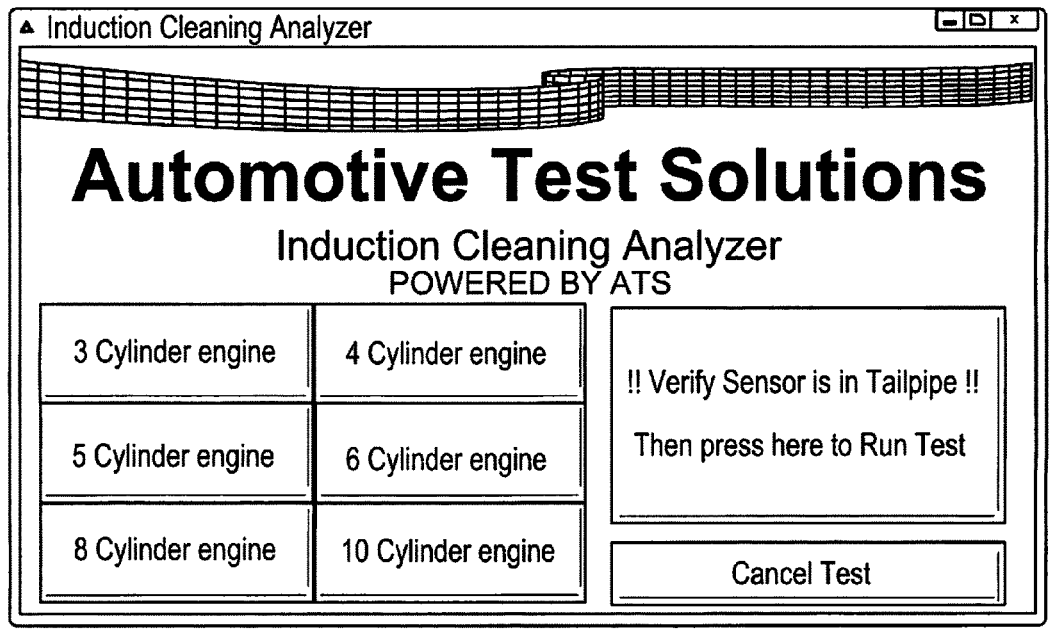
FIG. 10 is a screen shot of the cylinder number pick screen.
Figure 11:
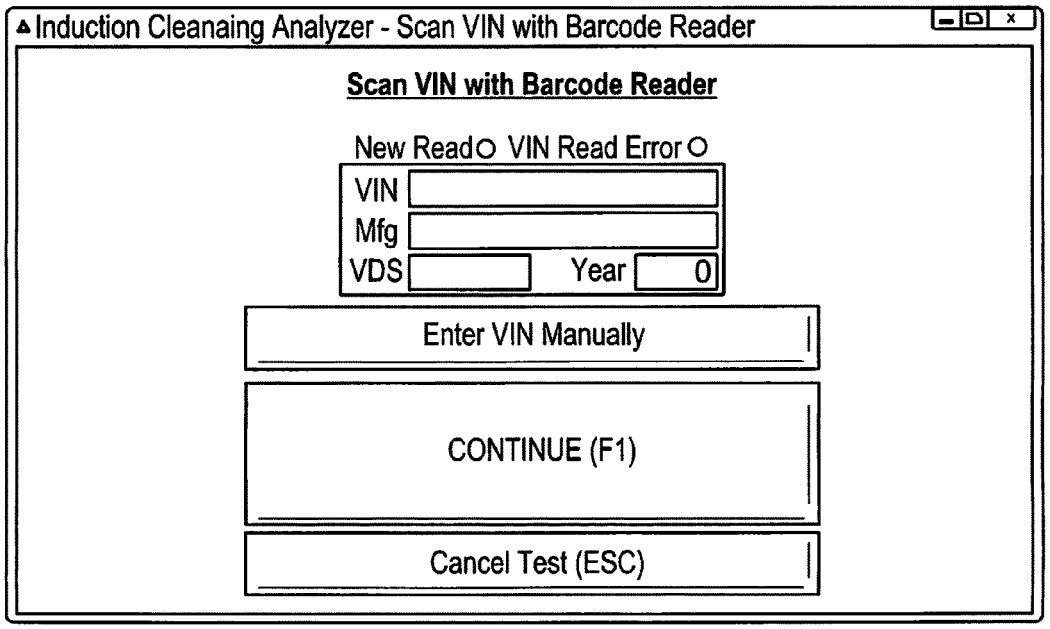
FIG. 11 is another screen shot, namely the vehicle identification screen.

The cylinders contained within the test engine are selected at the beginning of the induction cleaning analyzer test, as indicated by the touch screen shown in FIG. 10. Alternately, the vehicle identification number can also be used for the engine type and cylinder count from another drop down menu, or the vehicle identification number can be scanned with a bar code reader, or manually entered, all as shown in FIG. 11. With the number of cylinders known, with a routine included in the microprocessor's trigger antenna algorithm will install divisions on the pressure waveform that the antenna may not have picked up due to, for instance, inaccurate placement of the antenna, weak signal, or where some coils are shielded. This routine works by finding the peak voltages picked during ignition events and makes sure they occur during expected intervals according to the number of cylinders and typical idle RPM of the engine being tested. This assures evenly placed ignition event marks for accurate exhaust (or intake in the case of the embodiments of FIGS. 7 and 8) segment lengths, one for each cylinder of the engine being tested.

After the exhaust segments of the waveform are accurately marked, one of the marks is selected as the point at which the microprocessor starts a count. As it is not important that cylinder #1 of the engine correspond to cylinder count #1, the waveform segments may or may not align to the firing order of the engine. The count will start at count #1 (which could be any cylinder of the engine) and count up to the number of cylinders in the engine being tested. The next count then begins again, and then the next count and so on, for a specified time (e.g., 5 seconds per data collection, repeated 6 times, for a total of 30 seconds). If any one of the 5 second blocks has moved high or low, the other 5 second blocks would average the end result. After the data from the exhaust pressure segments (with each segment representing a cylinder) is collected over the specified period of time, the algorithm then arranges all of the same cylinder exhaust pressure segments data in columns so they can be compared to each other as illustrated in FIGS. 14A and 14B. In other words, all or several of the cylinder pressure pulses with a count of #1 (or #2, or #3, or #4, etc.) are compared with each other. Stated another way, all of the cylinder exhaust pressure segments produced from cylinder count #1 are only compared against other cylinder count #1 segments, all of the cylinder exhaust pressure segments produced from cylinder count #2 are compared against other cylinder count #2 segments, and so on until the number of cylinders segments corresponding to the number of cylinders of the test engine being tested has have been compared.

In the 4 stroke internal combustion engine, the cyclic variations are generated from the 4 strokes of the engine. The first stroke is the induction stroke in which air is moved into the cylinder by creating a low pressure area in the cylinder as the piston moves away from the cylinder head. (In supercharged or turbocharged engines the air pressure is forced in the cylinder by a higher pressure.) The second stroke is the compression stroke which heats the air and fuel contained within the cylinder as the piston moves toward the cylinder head. The third stroke is the power stroke which is initiated by ignition of the air/fuel charge. During the burn of the air/fuel charge pressure is built up in the combustion chamber, thus forcing the piston downward away from the cylinder head. The forth stroke is the exhaust stroke, which forces the burnt air/fuel mixture out of the cylinder into the atmosphere by creating a high pressure area in the cylinder as the piston moves toward the cylinder head. These four strokes represent one cycle of the engine. When the exhaust valve opens, the pressure from the combustion cycle is released into the exhaust. The exhaust pressure variations or differences indicate cyclic variations, or combustion efficiency variations.

All engines have some acceptable cyclic pressure variations due to production tolerances. However, as these variations increase over the life of an engine, a power loss results that is not acceptable due to a decrease in crankshaft torque production that is less than the manufactures specifications for the engine type. These differences are caused by the air charge moving down the intake and hitting carbon that has built up within the engine. When the air charge hits these carbon deposits it becomes turbulent, which turbulence creates uneven cylinder filling from cycle to cycle. This, in turn, changes the combustion pressure in a cylinder from cycle to cycle.

Figures 15, 16:
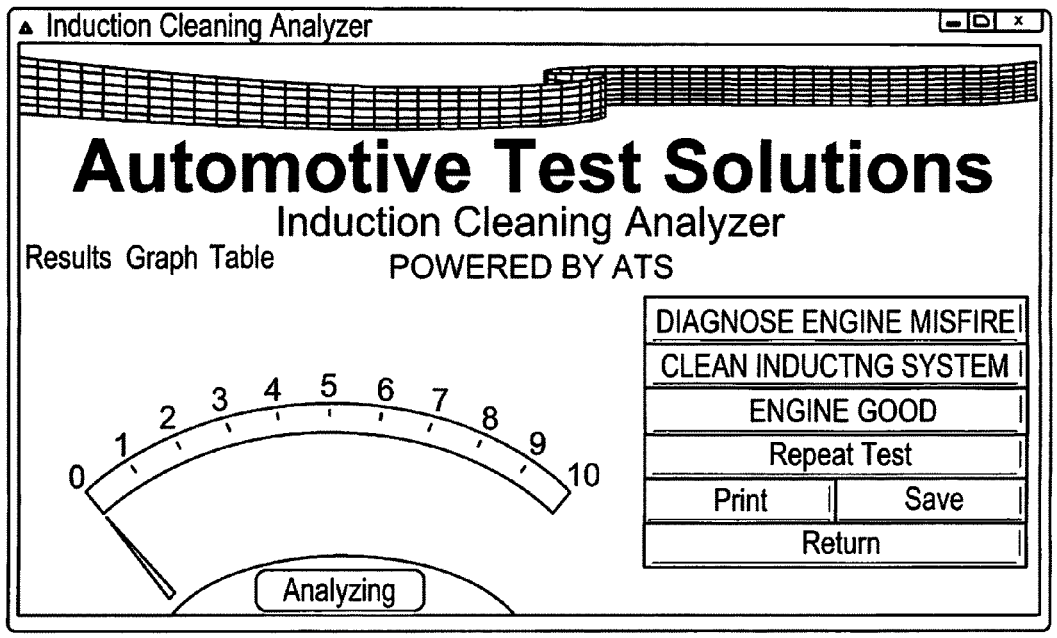
FIG. 15 illustrates an induction carbon build up scale.
FIG. 16 illustrates a threshold chart for use with algorithms disclosed herein.

The trigger antenna algorithm divides the waveform into segments, which segments are then measured and compared with separate routines that determine an averaged number, which number is then scaled. The program then checks each cylinder pressure pulse produced from the same cylinder for differences. If the same cylinder has tail pipe (or intake manifold) pressure differences that break a preprogrammed threshold, as illustrated in FIG. 16, the induction system has carbon compounds that have built up beyond an acceptable level. These tail pipe pressure differences are then used by a routine (waveform length, direction changes, min, max, % for bottom, hump % (discussed below)) that will indicate the carbon accumulation contained within the internal combustion engine. A scale is also provided that uses this algorithm to indicate the amount of carbon contained in the internal combustion engine. If chemicals are used to clean the induction system or injectors, the inventive subject matter can be used to check how well the chemicals worked to clean the internal combustion engine.

As indicated above, the algorithm takes the antenna trigger signal and divides the exhaust pressure signal into segments indicated by the ignition signal. The microprocessor then marks each of the segments with cylinder count numbers. Each segment then has a routine that analyzes the segment for overall length (locus length), overall direction changes, difference in minimum bottom percent, and 80/20 hump percent. The locus length of each cylinder count segment is measured. The locus length can represent the actual length of a waveform, such as the length along the path of the waveform. As an example shown in FIG. 41 (described below), the locus length of a waveform can be the distance that extends from the location 1210 to a peak 1224 of the waveform and from the peak 1224 to the location 1212. The locus length may be determined by counting the points (e.g., data points representative of pressures at different times) that form the waveform. These points are extrapolated with a linear line to make up the waveform. If the points are counted in a set period of time, the waveform length (e.g., the locus length (shown as 1208 in FIG. 41) can be known.

This overall segment length changes cycle to cycle when induction turbulence is present. The direction changes within the overall segment length changes cycle to cycle when induction turbulence is present as well. Once the locus length (LC) and directional changes (DC) are calculated the locus length is divided by the directional changes LC/DC. This number LC/DC is then averaged for each of the cylinder counts. The variance based off of the LC/DC is also calculated for the cylinders. This variance of the LC/DC is then averaged for each of the cylinder counts. The algorithm then takes the Average LC/DC and multiplies it by the Average Variance LC/DC. This number is then used to scale the carbon buildup on carbon buildup scale FIG. 15 which is displayed on screen 41. The carbon buildup scale reads from 10 good (color=green), 8-6 fair (color=yellow), 6-4 bad (color=orange), 4-0 very bad (color=red). This scale could also be accomplished with visual lamps, or audible alerts. The cylinder count segments are checked for maximum (max) and minimum (min) pressure levels. These pressure levels are then averaged and the bottoms or the minimums are compared. If the average of these bottom pressure readings have changes that breaks a % threshold, the induction system has carbon build up. These bottom % thresholds are then scaled on carbon build up scale FIG. 15. The cylinder count segments are also checked for maximum and minimum pressure levels. These pressure levels are then scaled for 80% and 20% of the min max of the exhaust pressure segments. Within the 80% to 20% falling pressure region, the first rising and falling pressure or hump is measured. If the hump percentage breaks a threshold the induction system has carbon build up. These hump % thresholds are then scaled on carbon build up scale FIG. 15. Of these three algorithms; DC/LC Avg*Var; Bump % Average; % From Bottom Average; the one algorithm that has the greatest number is scaled on carbon build up scale FIG. 15. In the preferred embodiment of the induction analyzer the algorithm for Bump % Average; % From Bottom Average are only used on 3-4-5 cylinder engines. The chart in FIG. 16 is used to set the thresholds for the above algorithms.

Additionally, as indicated above, the intake manifold pressure can be used to determine the carbon compound build up with in the engine. The induction cleaning analyzer variation is shown in FIGS. 7 and 8. The trigger antenna 33 is used to pickup ignition coil discharges from coil 19; which will set divisions that will mark the intake pulse waveform into segments that will be counted to a cylinder count number. The intake manifold pressure is read with pressure sensor 31 which converts intake manifold pressures measured in intake manifold 15 to an electrical signal. This signal is sent to A/D converter 37 through cable 43. A/D converter 37 sends data from trigger antenna and intake pressure data to microprocessor 39. This intake manifold pressure waveform is then divided by the ignition discharge algorithm making even segments that represent cylinders. Once the cylinder number contained within the engine being tested is complete, the engine cylinder count starts and counts the number of cylinders within the engine, then the next count begins, and then the next count and so on, this count will continue for a specified time. Now that all of the cylinders are marked over a period of time, the next step is to arrange all of the same cylinder intake pressure segments data in columns so they can be compared to each other. In other words, all of the cylinder pressure pulses with a count of #1, or #2, or #3, or #4 etc. are compared. This comparison is only done for the exact same cylinder. So all of the cylinder intake pressure segments produced from cylinder count #1 are compared against other cylinder count #1 segments, all of the cylinder intake pressure segments produced from cylinder count #2 are compared against other cylinder count #2 segments, and so on until the number of cylinders that the test engine has have been obtained. The program then checks each cylinder intake pressure pulse produced from the same cylinder for differences. These differences are caused by the air charge moving down the intake and hitting carbon that has built up within the engine. When the air charge hits these carbon deposits the air goes turbulent. The turbulent air within the air charge creates uneven cylinder filling cycle to cycle. The microprocessor uses an algorithm to calculate the carbon build up based on the intake pressure changes. The algorithm that is used for the intake pressure waveform is DC/LC Maximum, DC/LC Minimum, DC/LC Max-Min, DC/LC Average, DC/LC Std Dev, DC/LC Variance, DC/LC Avg*Var, LC Average, these are the same algorithms used for the exhaust pressure method. This measures the locust length and direction changes within the intake pressure waveform segments. This is then converted to a scale that indicates the carbon build up within the engine 13 and is then displayed on screen 41. Additionally in either method tail pipe or intake, the ignition antenna pickup could be replaced with a connection to a coil. This coil connection could be a coil primary signal, coil secondary signal, or a coil command signal. This trigger could also be a signal from a fuel injector from a compression ignition engine. With a signal that is now directly linked to a specific cylinder, the cylinder(s) can be identified to the actual cylinder that created each of the pressure waveforms.

Figure 17:
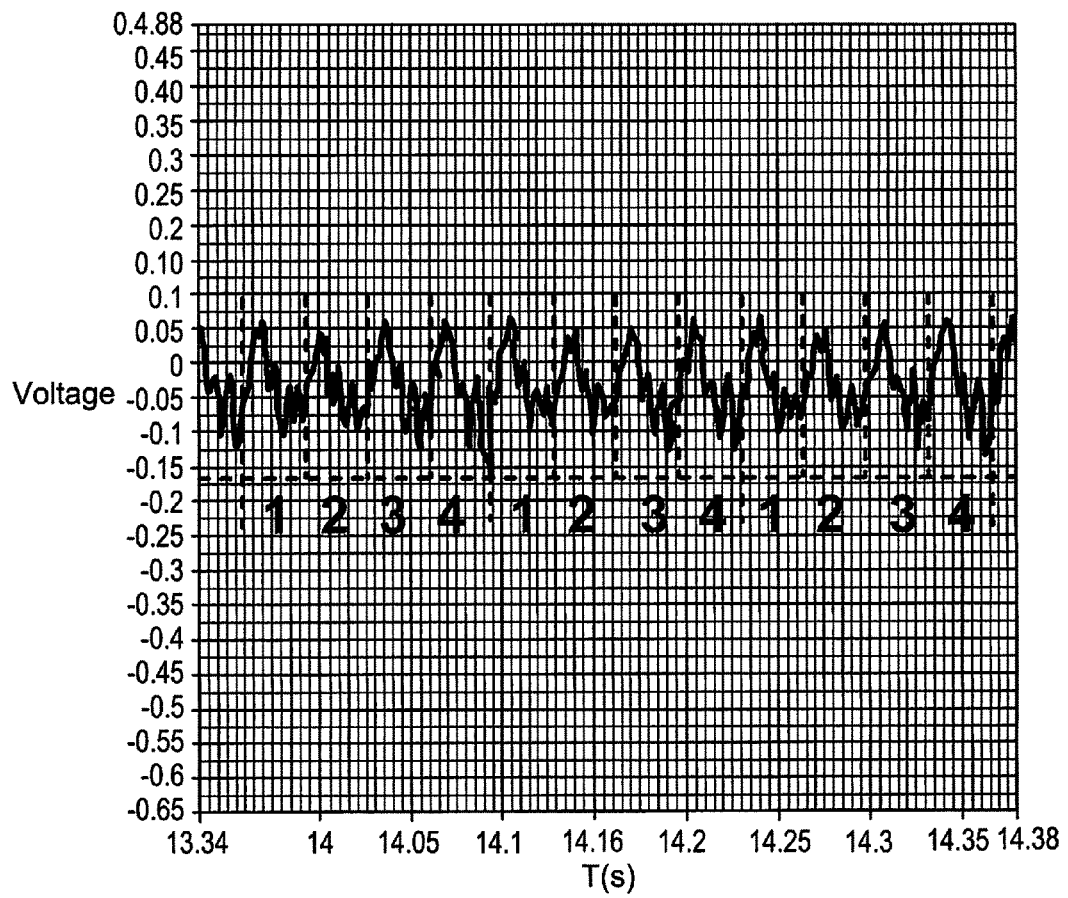
FIG. 17 illustrates use of an embodiment of the inventive subject matter on a 2000 Toyota RAV 4 2.0 L 4 cylinder before cleaning induction system, exhaust pressure waveform.
Figure 18:
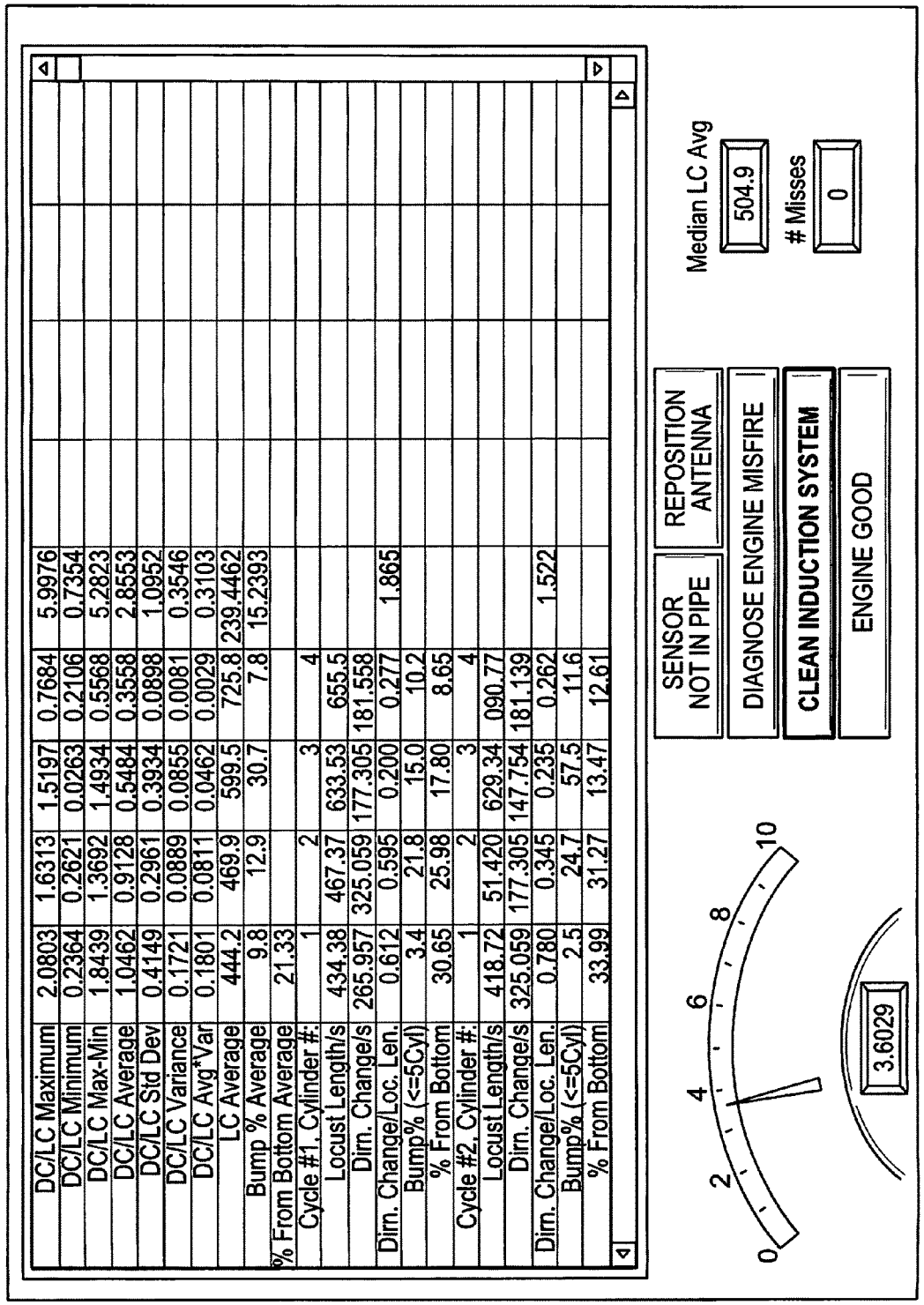
FIG. 18 illustrates use of an embodiment of the inventive subject matter on a 2000 Toyota RAV 4 2.0 L 4 cylinder before cleaning induction system, cylinder count data chart.
Figure 19:
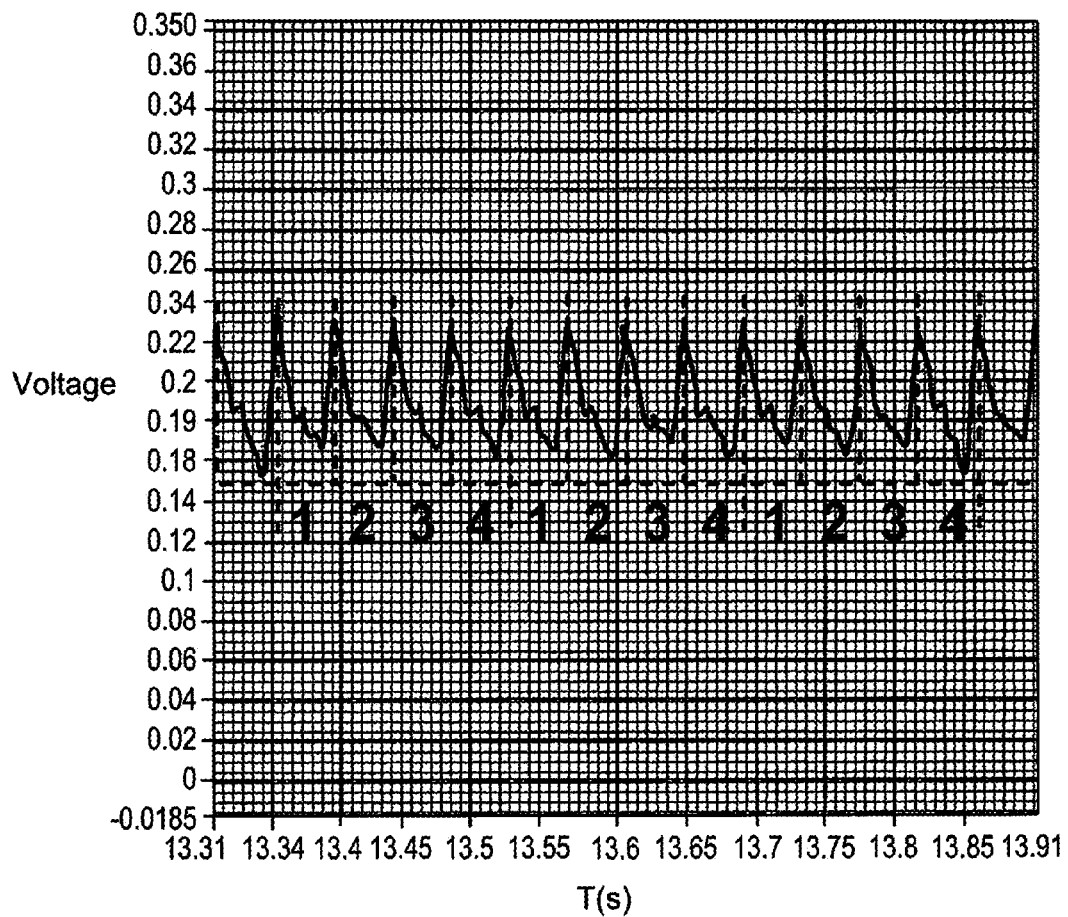
FIG. 19 illustrates use of an embodiment of the inventive subject matter on a 2000 Toyota RAV 4 2.0 L 4 cylinder after cleaning induction system, exhaust pressure waveform.
Figure 20:
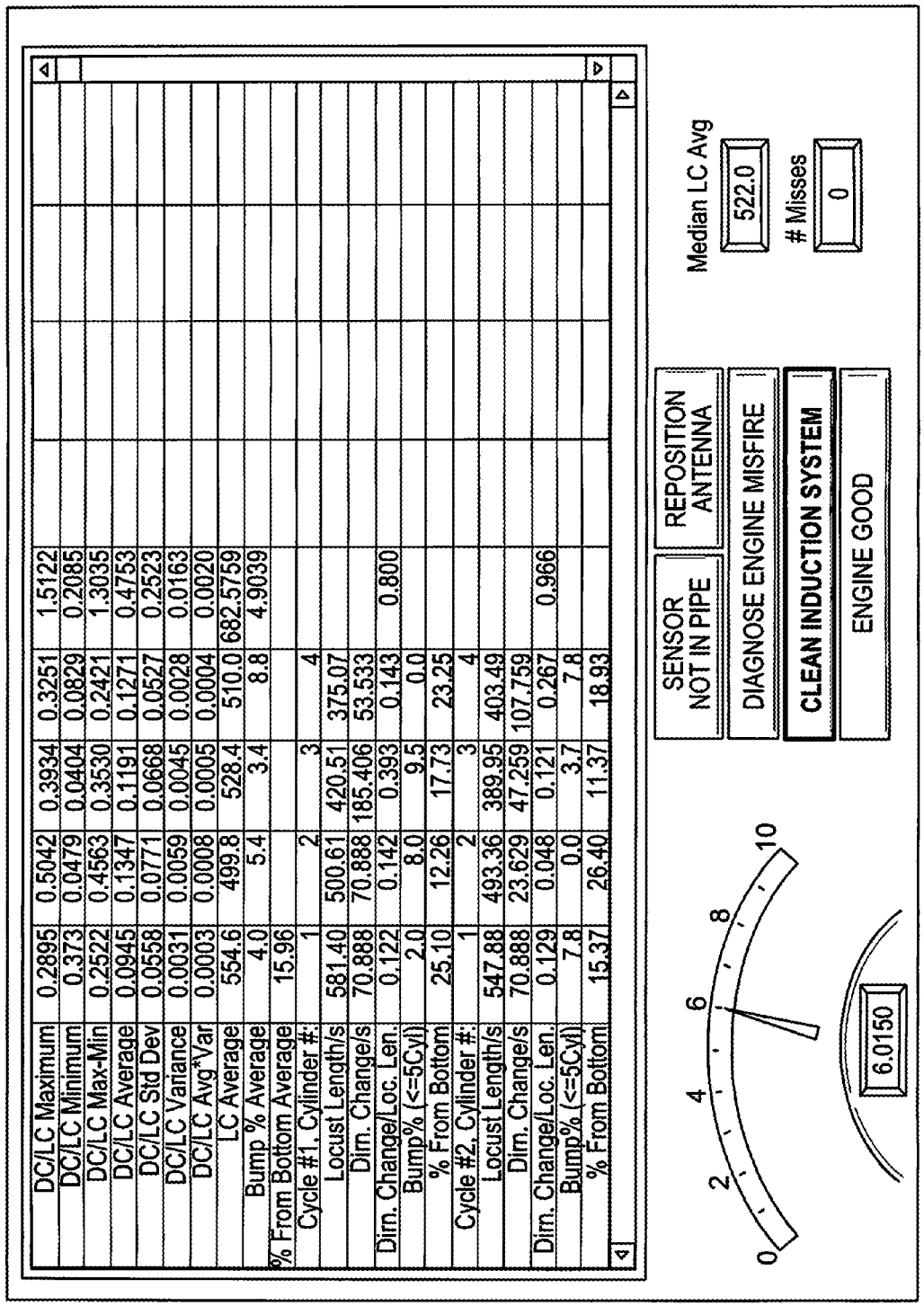
FIG. 20 illustrates use of an embodiment of the inventive subject matter on a 2000 Toyota RAV 4 2.0 L 4 cylinder after cleaning induction system, cylinder count data chart.
Figure 21:
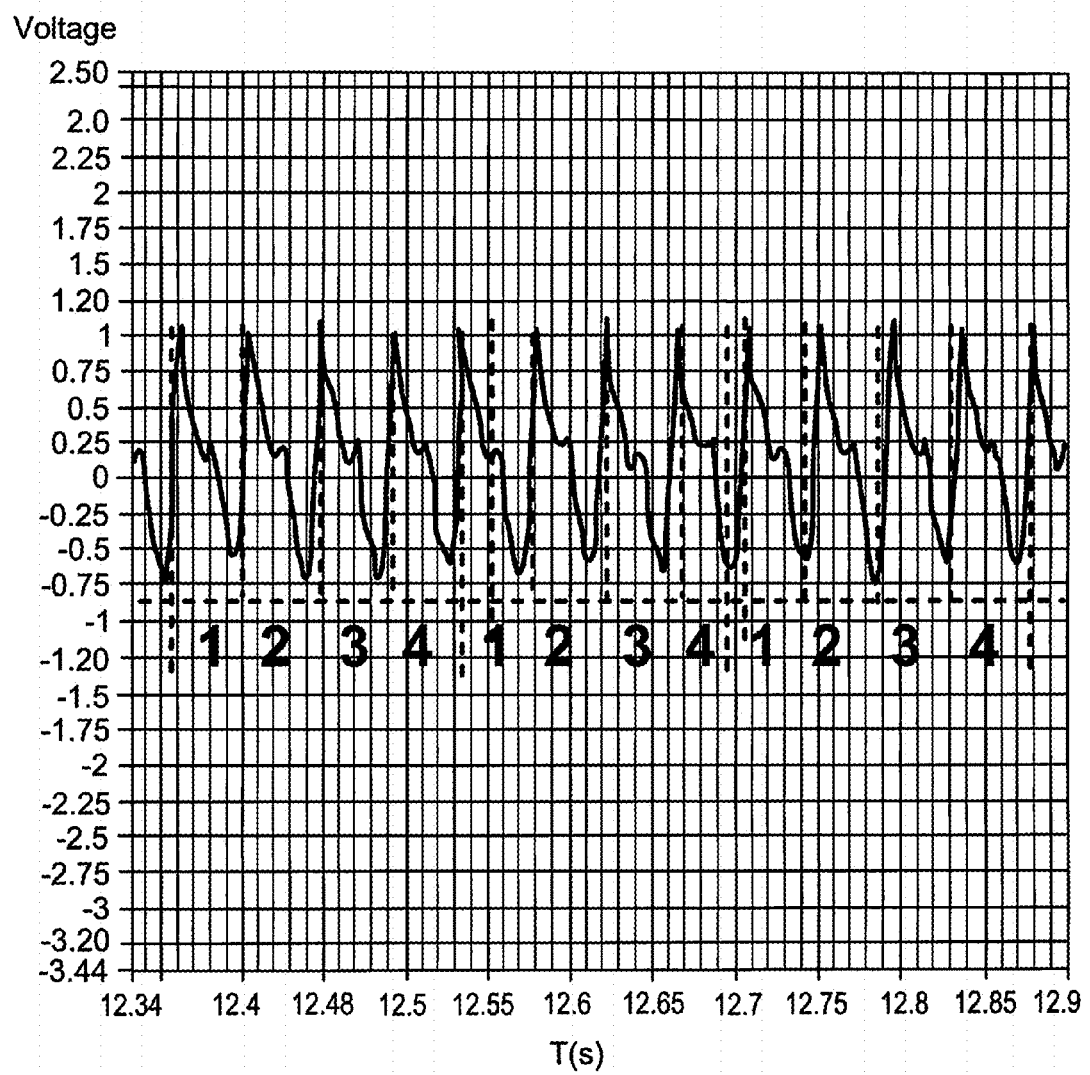
FIG. 21 illustrates use of an embodiment of the inventive subject matter on a 2000 Toyota RAV 4 2.0 L 4 cylinder after cleaning and driven 500 miles, exhaust pressure waveform.
Figure 22:
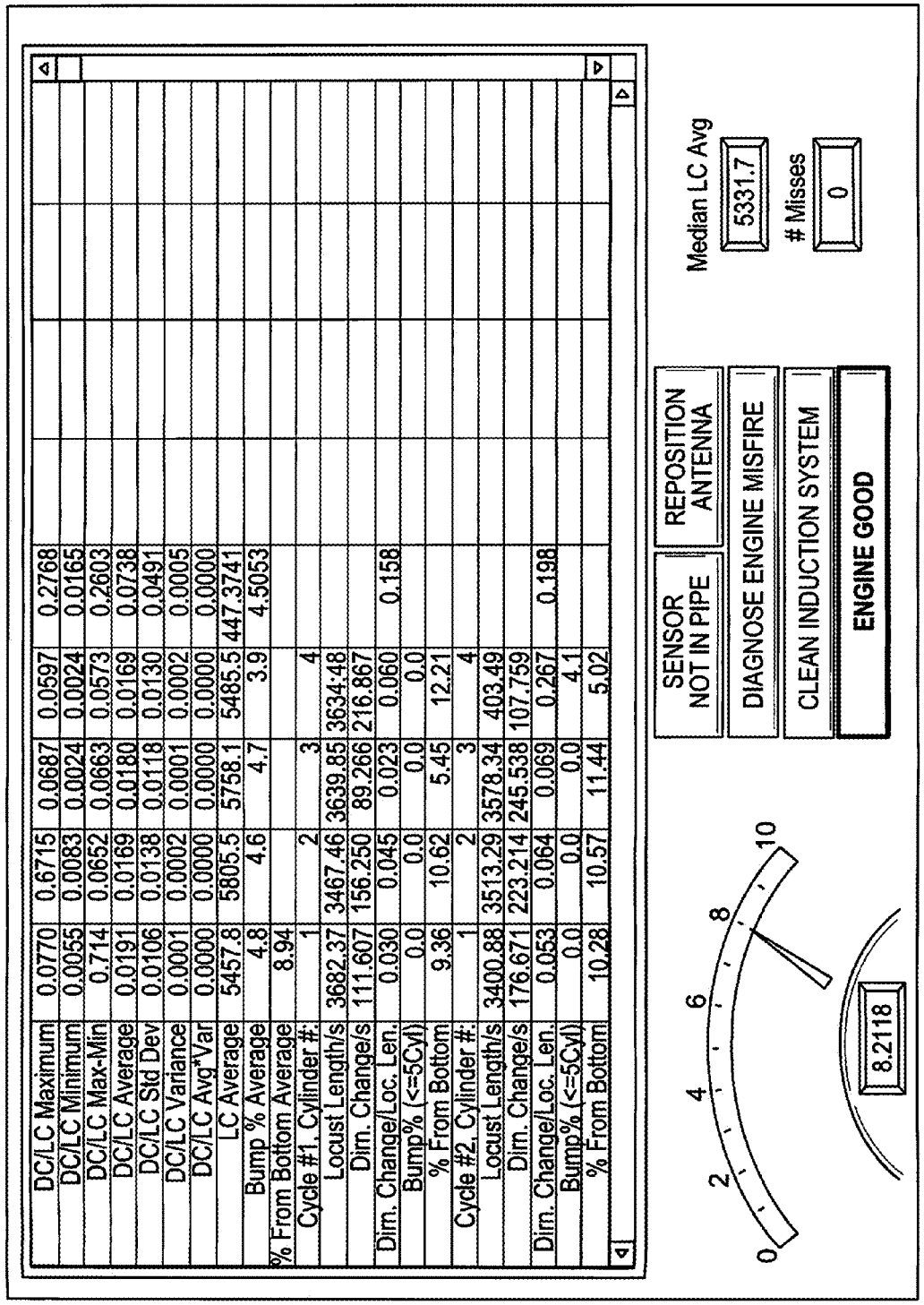
FIG. 22 illustrates use of an embodiment of the inventive subject matter on a 2000 Toyota RAV 4 2.0 L 4 cylinder after cleaning and driven 500 miles, cylinder count data chart.
Figure 23:
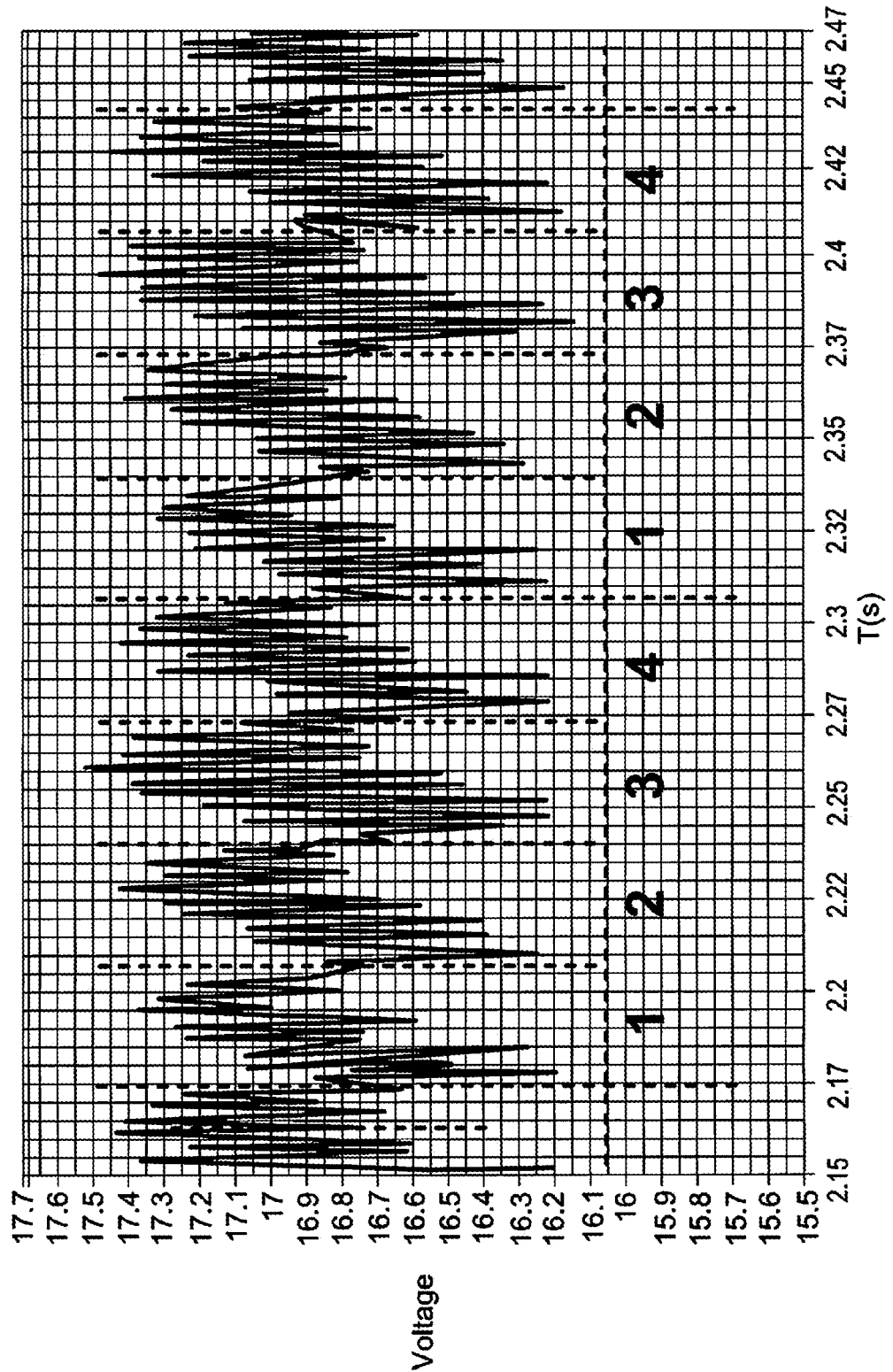
FIG. 23 illustrates use of an embodiment of the inventive subject matter on a 2000 Toyota RAV 4 2.0 L 4 cylinder before cleaning induction system, intake pressure waveform.
Figure 24:
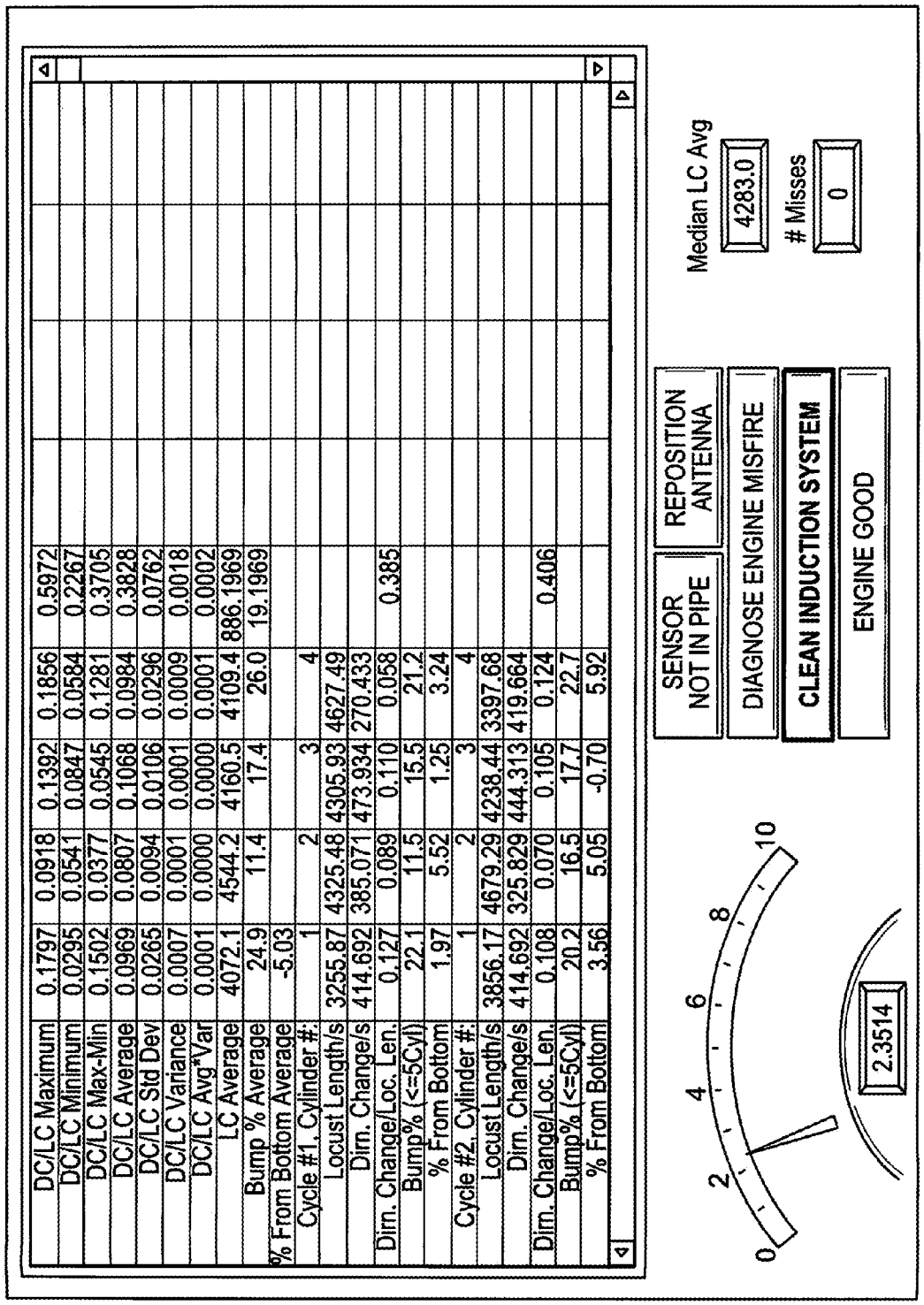
FIG. 24 illustrates use of an embodiment of the inventive subject matter on a 2000 Toyota RAV 4 2.0 L 4 cylinder before cleaning induction system, cylinder count data chart.
Figure 25:
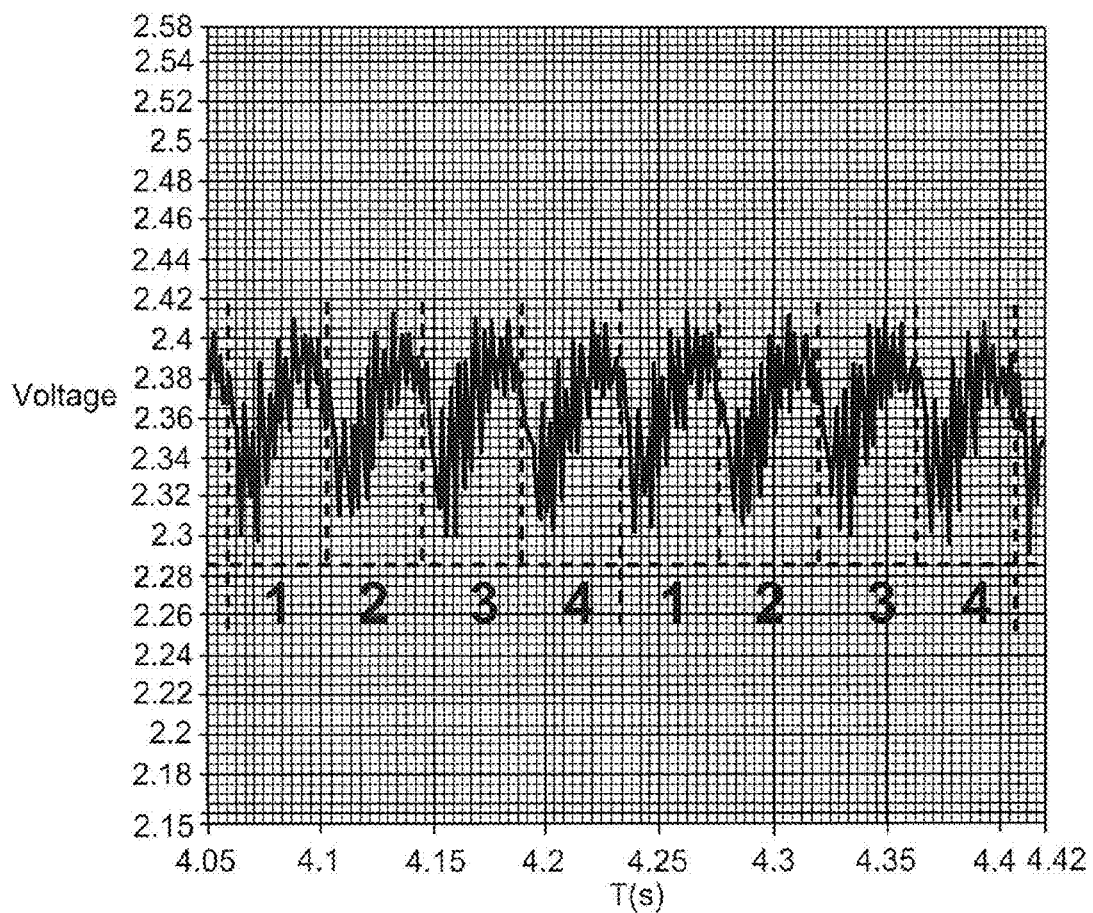
FIG. 25 illustrates use of an embodiment of the inventive subject matter on a 2000 Toyota RAV 4 2.0 L 4 cylinder after cleaning induction system, intake pressure waveform.
Figure 26:
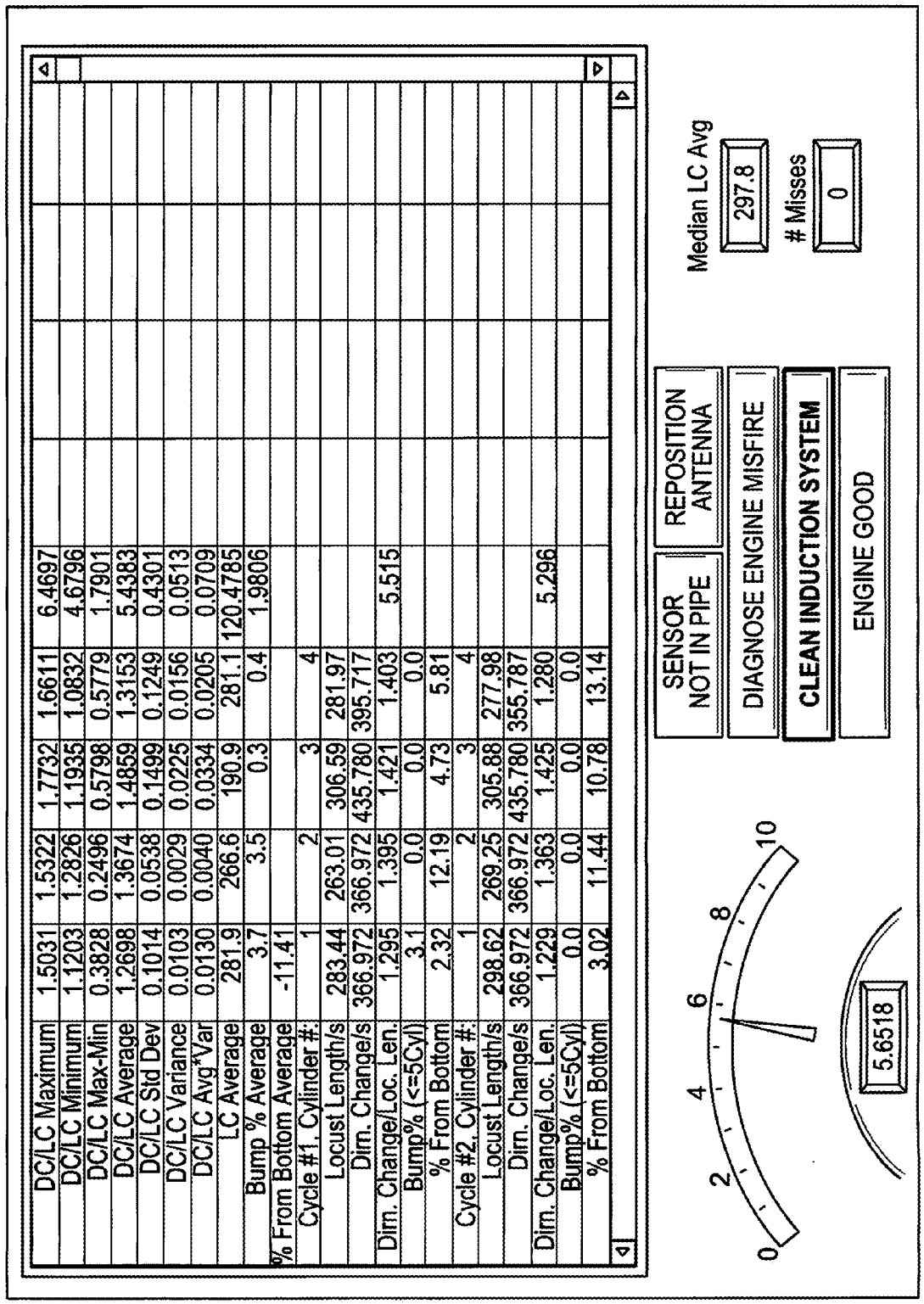
FIG. 26 illustrates use of an embodiment of the inventive subject matter on a 2000 Toyota RAV 4 2.0 L 4 cylinder after cleaning induction system, cylinder count data chart.

In FIG. 17 the exhaust pressure waveform from a 4 cylinder 2000 Toyota RAV 4 with a 2.0 Liter engine is shown before cleaning the induction system. This is the exhaust pressure waveform that has been marked by the microprocessor using the ignition antenna. When each of the cylinders are compared to their other count numbers (#1 to #1, #2 to #2, #3 to #3, #4 to #4) you can see differences between them. In FIG. 18 these differences are put into a digital format that shows the cylinders listed in there cylinder count columns. These cylinder data is analyzed and compared, then scaled on the carbon buildup scale shown at the bottom. The carbon buildup scale indicates a 3.60 which is a large amount of carbon buildup in the induction system. The Toyota 2.0 L engine was then cleaned with induction cleaning chemicals. In FIG. 19 the exhaust pressure waveform that has been marked by the microprocessor using the ignition antenna is shown after the induction cleaning. When each of the cylinders are compared to their other count numbers (#1 to #1, #2 to #2, #3 to #3, #4 to #4) you can see differences between them. In FIG. 20 these differences are put into a digital format that shows the cylinders listed in there cylinder count columns. This cylinder data gets analyzed and compared, then scaled on the carbon buildup scale shown at the bottom. The carbon buildup scale indicates a 6.01 which is half the amount of carbon buildup in the induction system. The Toyota RAV 4 then had cleaning chemicals added to the fuel tank and was driven for 200 miles. In FIG. 21 the exhaust pressure waveform that has been marked by the microprocessor using the ignition antenna is shown, after cleaning chemicals had been added to the fuel tank and driven for 200 miles. When each of the cylinders are compared to their other count numbers (#1 to #1, #2 to #2, #3 to #3, #4 to #4) you can see very small differences between them. In FIG. 22 these differences are put into a digital format that shows the cylinders listed in there cylinder count columns. This cylinder data gets analyzed and compared, then scaled on the carbon buildup scale shown at the bottom. The carbon buildup scale indicates an 8.21 which indicates the induction system is clean. When FIG. 17 (before cleaning) is compared with FIG. 21 (after cleaning) it is clear from the exhaust pressure waveforms that there is a large change that occurred between them. In FIG. 17 when the engine had high carbon buildup (high turbulent air flow) the directional changes and variations are great, however once the induction system has been cleaned (low turbulent air flow) in FIG. 21 the direction changes and variations are minimal. In FIG. 23 this same Toyota RAV4 has been tested using the intake method. In FIG. 23 this is the intake pressure wave form before cleaning. In FIG. 24 this is the data from the intake pressure waveform before cleaning. The intake carbon buildup scale indicates a 2.35 which compares with the exhaust method of a 3.68, both indicate a large amount of carbon build up. In FIG. 25 this is the intake pressure waveform after cleaning. In FIG. 26 this is the intake pressure data after cleaning. The intake carbon buildup scale indicates a 5.65 which compares with the exhaust method at 6.01 this indicates a large amount of carbon buildup in the induction system. The same algorithm is used in the exhaust method and the intake method. As one can see the results are very close. This shows that either the exhaust method or the intake method can be used to find the carbon compound build up in the internal combustion engine.

Figure 27:
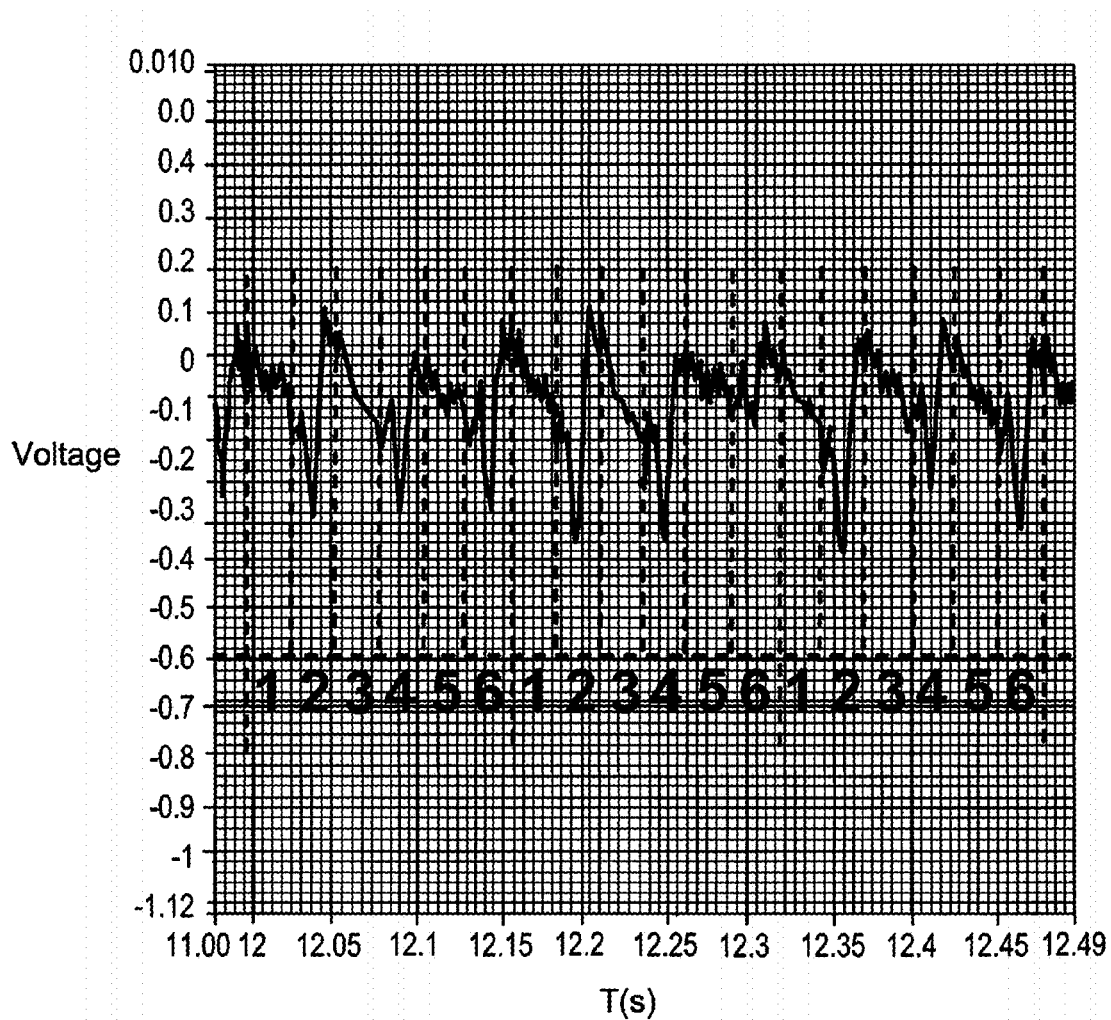
FIG. 27 illustrates use of an embodiment of the inventive subject matter on a 6 cylinder 2001 Nissan Xterra with a 3.3 Liter engine is shown before cleaning the induction system, exhaust pressure waveform.
Figure 28:
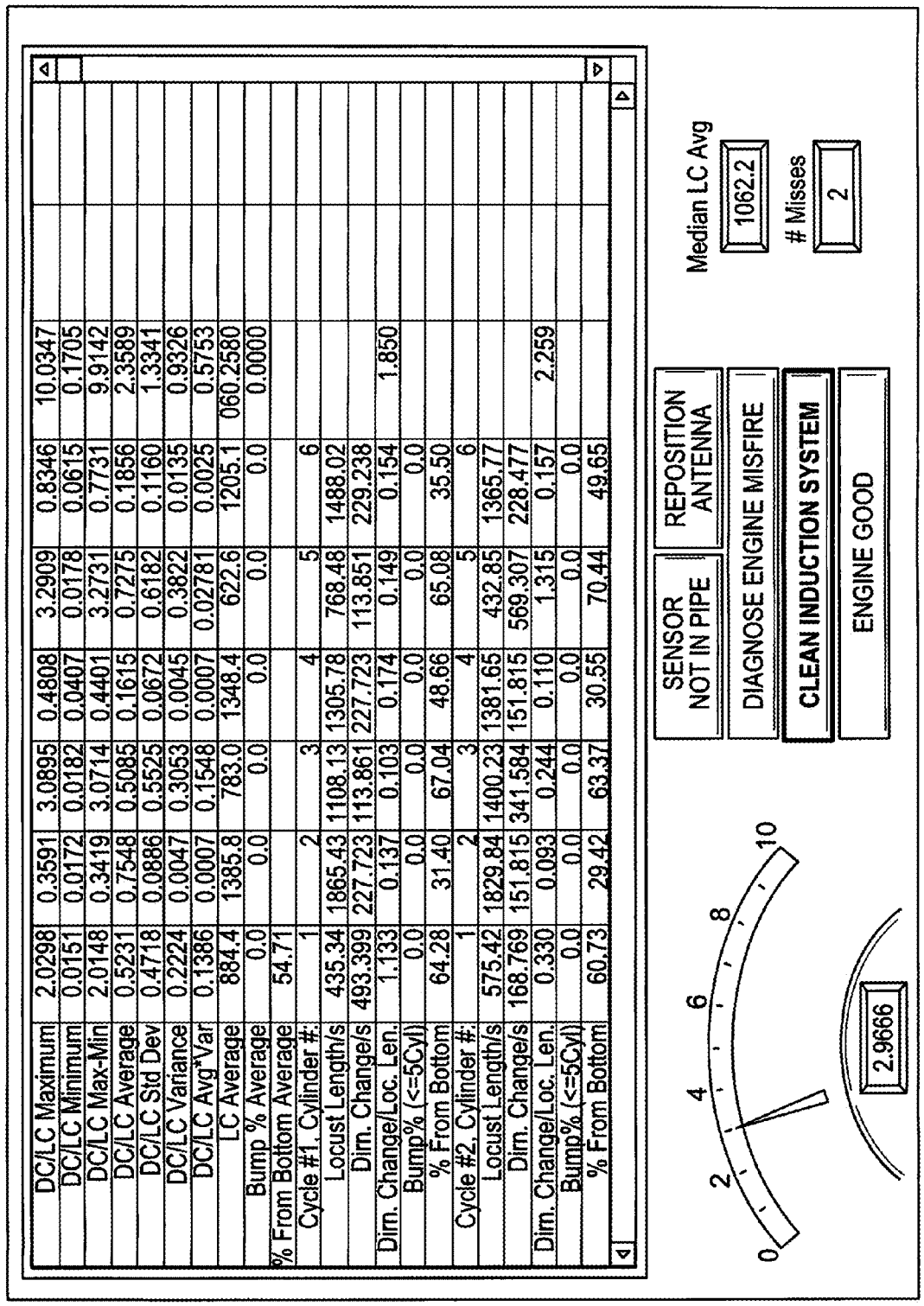
FIG. 28 illustrates use of an embodiment of the inventive subject matter on a 6 cylinder 2001 Nissan Xterra with a 3.3 Liter engine is shown before cleaning the induction system, cylinder count data chart.
Figure 29:
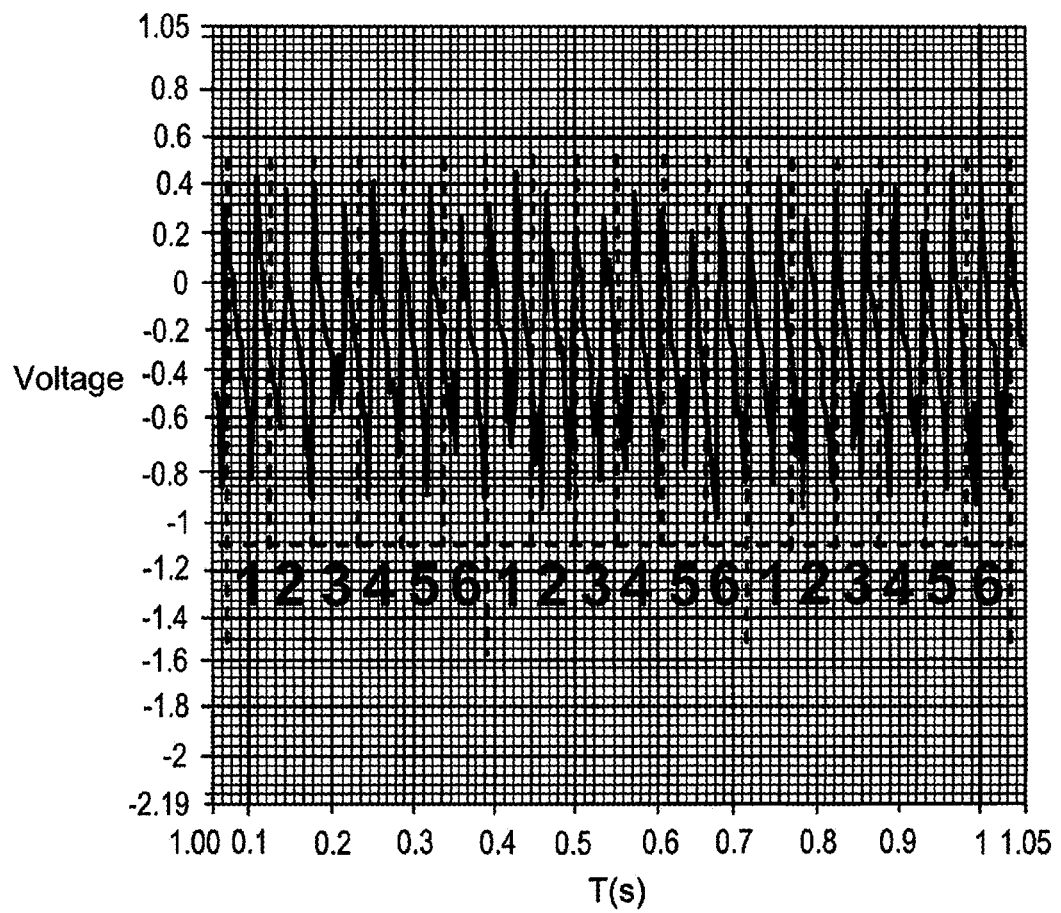
FIG. 29 illustrates use of an embodiment of the inventive subject matter on a 6 cylinder 2001 Nissan Xterra with a 3.3 Liter engine is shown after cleaning the induction system, exhaust pressure waveform.
Figure 30:
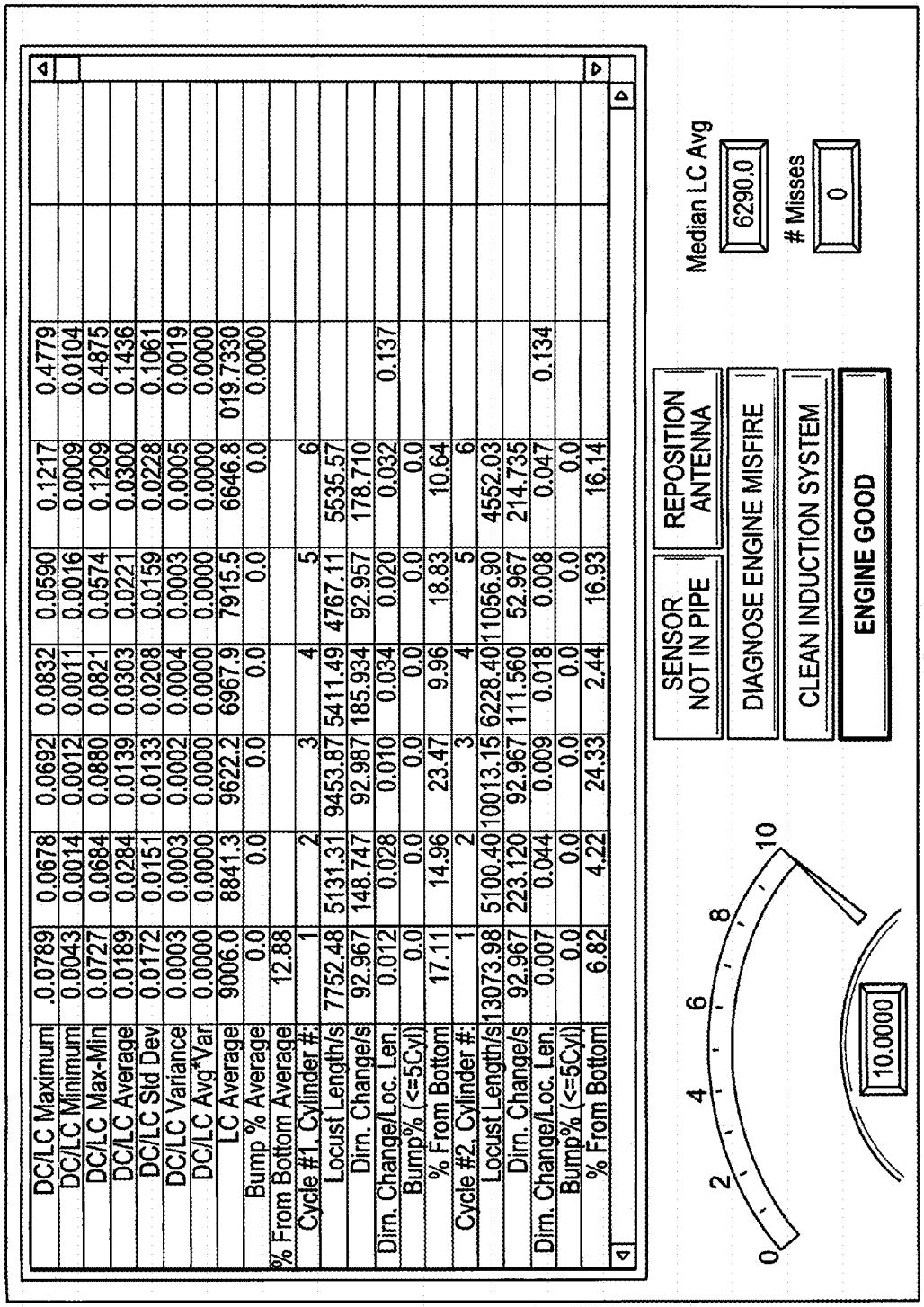
FIG. 30 illustrates use of an embodiment of the inventive subject matter on a 6 cylinder 2001 Nissan Xterra with a 3.3 Liter engine is shown after cleaning the induction system, cylinder count data chart.

In FIG. 27 a 6 cylinder 2001 Nissan Xterra with a 3.3 Liter engine is show before cleaning the induction system. This is the exhaust pressure waveform that has been marked by the microprocessor using the ignition antenna. When each of the cylinders are compared to their other count numbers (#1 to #1, #2 to #2, #3 to #3, #4 to #4, #5 to #5, #6 to #6) you can see differences between them. In FIG. 28 these differences are put into a digital format that shows the cylinders listed in there cylinder count columns. This cylinder data gets analyzed and compared, then scaled on the carbon buildup scale shown at the bottom. The carbon buildup scale indicates a 2.96 which is a large amount of carbon buildup in the induction system. The Nissan 3.3 L engine was then cleaned with induction cleaning chemicals. In FIG. 29 the exhaust pressure waveform that has been marked by the microprocessor using the ignition antenna shown after the induction cleaning. When each of the cylinders are compared to their other count numbers (#1 to #1, #2 to #2, #3 to #3, #4 to #4) you can see very small differences between them. In FIG. 30 these differences are put into a digital format that shows the cylinders listed in there cylinder count columns. This cylinder data gets analyzed and compared, then scaled on the carbon buildup scale shown at the bottom. The carbon buildup scale indicates a 10.0 which is very low carbon in the induction system. When FIG. 27 (before cleaning) is compared with FIG. 29 (after cleaning) it is clear from the exhaust pressure waveforms that there is a large change that has occurred between them. In FIG. 27 when the engine had high carbon buildup (high turbulent air flow) the directional changes and variations are great, however once the induction system has been cleaned (low turbulent air flow) in FIG. 29 the direction changes and variations are minimal.

Figure 31:
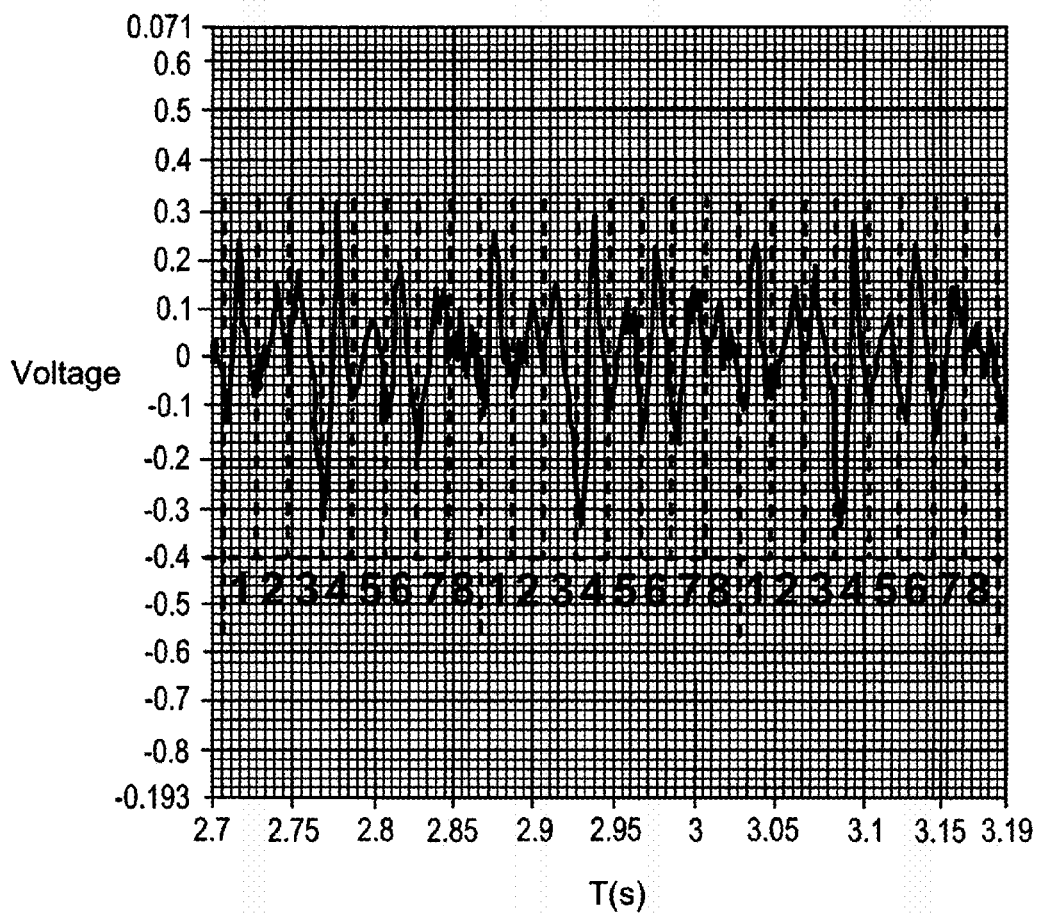
FIG. 31 illustrates use of an embodiment of the inventive subject matter on an 8 cylinder 2007 ford f150 with a 4.6 Liter engine before cleaning the induction system, exhaust pressure waveform.
Figure 32:
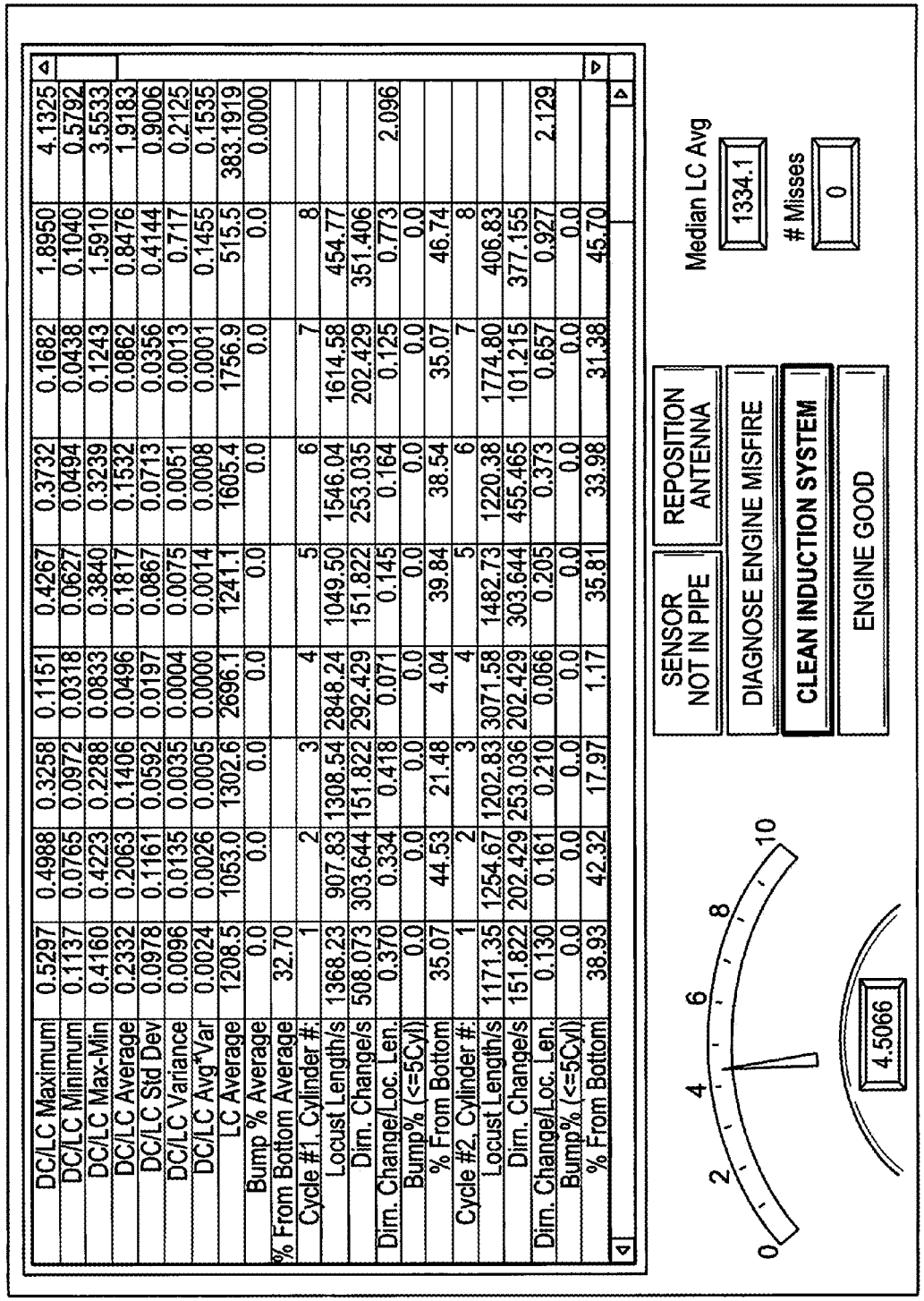
FIG. 32 illustrates use of an embodiment of the inventive subject matter on an 8 cylinder 2007 ford f150 with a 4.6 Liter engine before cleaning the induction system, cylinder count data chart.
Figure 33:
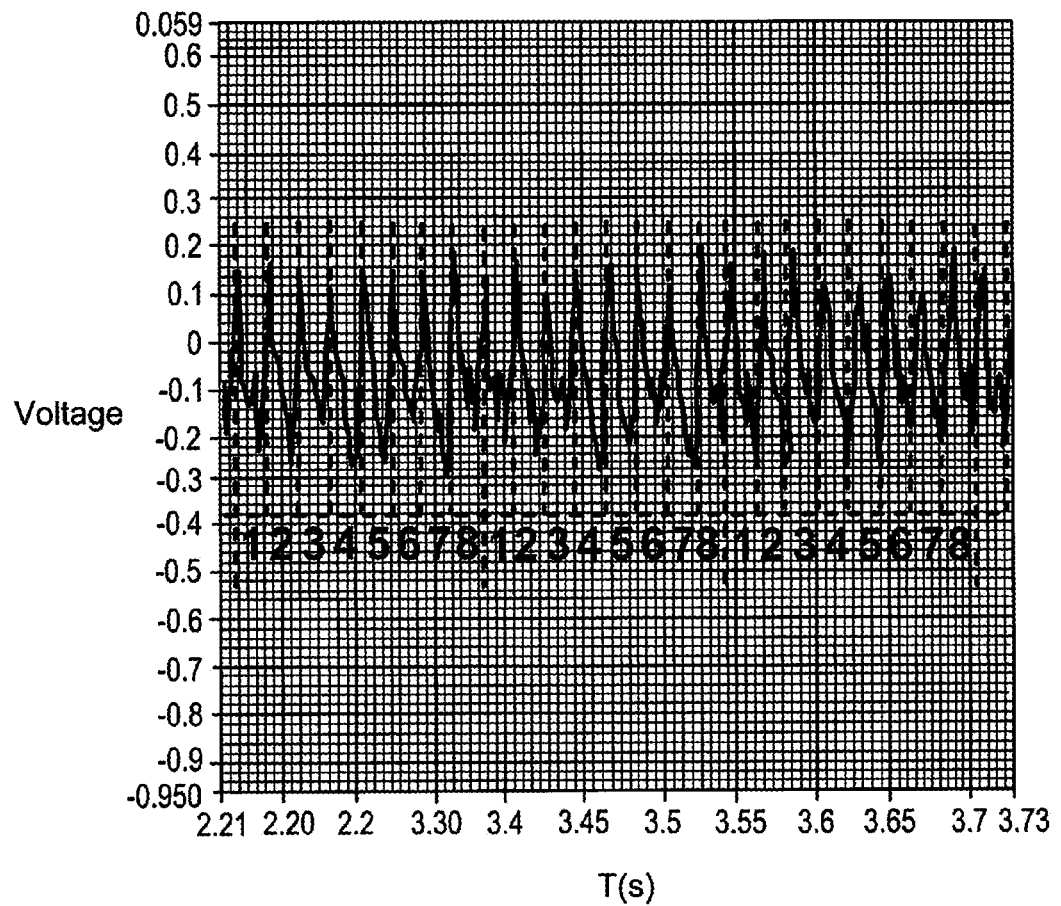
FIG. 33 illustrates use of an embodiment of the inventive subject matter on an 8 cylinder 2007 ford f150 with a 4.6 Liter engine after cleaning the induction system, exhaust pressure waveform.
Figure 34:
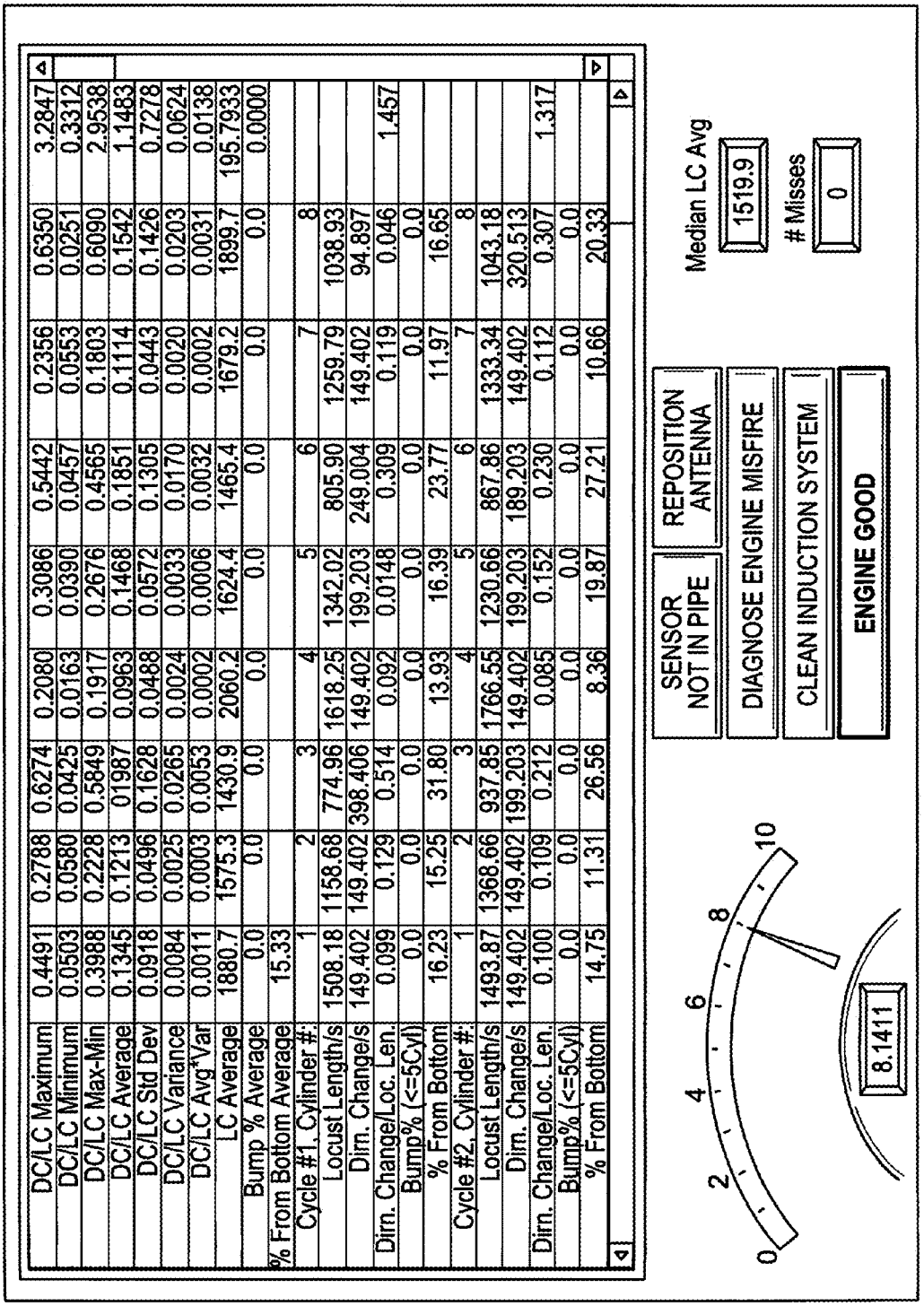
FIG. 34 illustrates use of an embodiment of the inventive subject matter on an 8 cylinder 2007 ford f150 with a 4.6 Liter engine after cleaning the induction system, cylinder count data chart.

In FIG. 31 an 8 cylinder 2007 ford f150 with a 4.6 Liter engine shows the pressure waveform before cleaning the induction system. This is the exhaust pressure waveform that has been marked by the microprocessor using the ignition antenna. When each of the cylinders are compared to their other count numbers (#1 to #1, #2 to #2, #3 to #3, #4 to #4, #5 to #5, #6 to #6, #7 to #7, #8 to #8) you can see differences between them. In FIG. 32 these differences are put into a digital format that shows the cylinders listed in there cylinder count columns. This cylinder data gets analyzed and compared, then scaled on the carbon buildup scale shown at the bottom. The carbon buildup scale indicates a 4.50 which is a large amount of carbon buildup in the induction system. The Ford 4.6 L engine was then cleaned with induction cleaning chemicals. In FIG. 33 the exhaust pressure waveform that has been marked by the microprocessor using the ignition antenna shown after the induction cleaning. When each of the cylinders are compared to their other count numbers (#1 to #1, #2 to #2, #3 to #3, #4 to #4, #5 to #5, #6 to #6, #7 to #7, #8 to #8) you can see very small differences between them. In FIG. 34 these differences are put into a digital format that shows the cylinders listed in there cylinder count columns. These cylinder data are analyzed and compared, then scaled on the carbon buildup scale shown at the bottom. The carbon buildup scale indicates an 8.14 which is very low carbon in the induction system. When FIG. 31 (before cleaning) is compared with FIG. 33 (after cleaning) it is clear from the exhaust pressure waveforms that there is a large change that has occurred between them. In FIG. 31 when the engine had high carbon buildup (high turbulent air flow) the directional changes and variations are great, however once the induction system has been cleaned (low turbulent air flow) in FIG. 33 the direction changes and variations are minimal.

Figure 35:
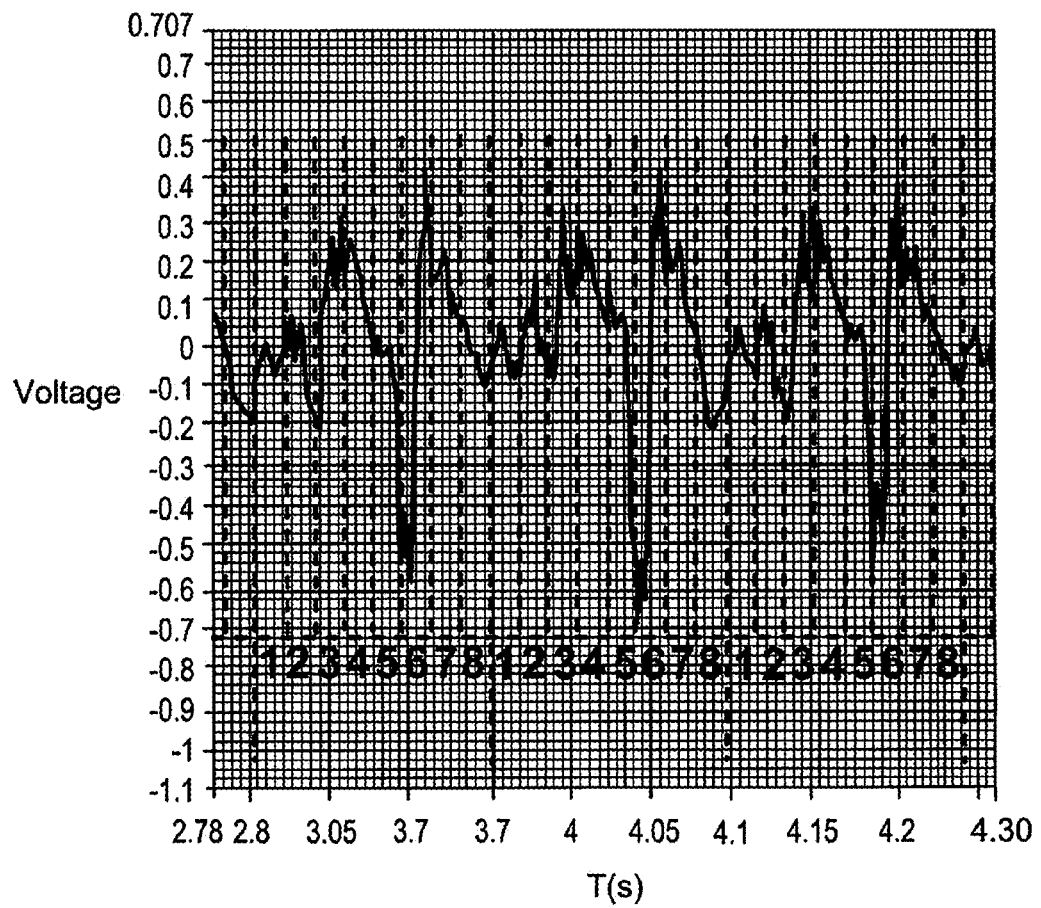
FIG. 35 illustrates use of an embodiment of the inventive subject matter on an 8 cylinder 1990 Lincoln Town car with a 5.0 Liter engine before cleaning the induction system with a misfire, exhaust pressure waveform.
Figure 36:
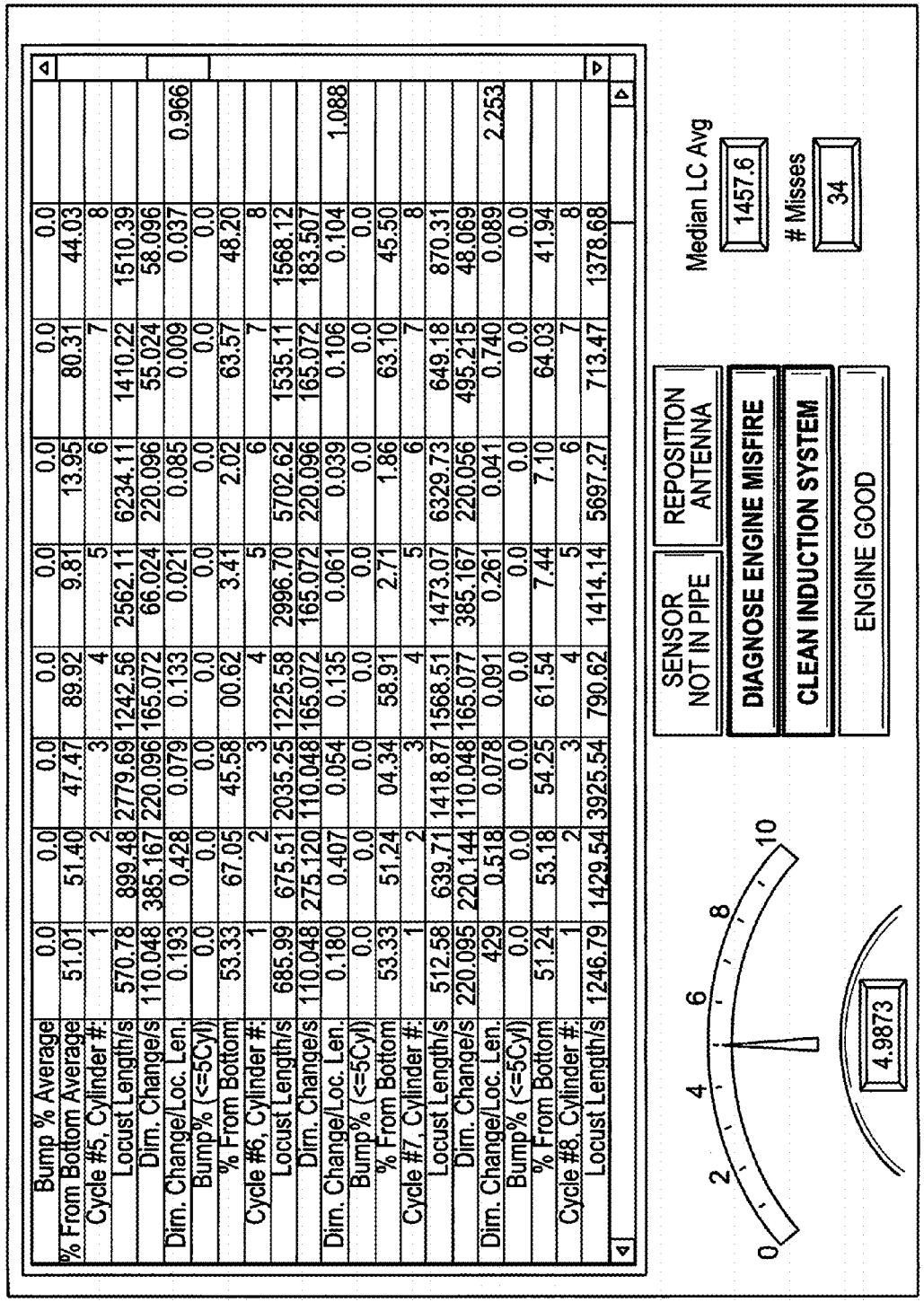
FIG. 36 illustrates use of an embodiment of the inventive subject matter on an 8 cylinder 1990 Lincoln Town car with a 5.0 Liter engine before cleaning the induction system with a misfire, cylinder count data chart.

In FIG. 35 an 8 cylinder 1990 Lincoln Town car with a 5.0 Liter engine is show before cleaning the induction system. This is the exhaust pressure waveform that has been marked by the microprocessor using the ignition antenna. When each of the cylinders are compared to their other count numbers (#1 to #1, #2 to #2, #3 to #3, #4 to #4, #5 to #5, #6 to #6, #7 to #7, #8 to #8) you can see differences between them. In cylinder count #5 and #6 there is a large drop in exhaust pressure. This long LC and small DC indicate that the engine is misfiring. In FIG. 36 these differences are put into a digital format that shows the cylinders listed in there cylinder count columns. This cylinder data gets analyzed and compared, then scaled on the carbon buildup scale shown at the bottom. The carbon buildup scale indicates a 4.98 which is a large amount of carbon buildup in the induction system. However this engine has an engine misfire. With a misfire the problem is most likely not going to be repaired with an induction cleaning. Induction cleaning for the most part is preventive maintenance, not repair. It will be imperative to alert the service personal that the engine is misfiring before the induction system cleaning is started. At the right bottom of the screen a misfire alert lamp is turned on to alert service personal. The misfire identification is accomplished by the locust length breaking a threshold, when the engine misfires, the length of the exhaust segment is very long with very few direction changes; under these conditions a misfire is counted. If the number of misfires in a set time period breaks a threshold the misfire indicator is turn on. A misfire is indicated if the number of total LCs (over the time period) that are larger than the Median LC×MisFireMultiplier (variable) is greater than the threshold set by the MisFireMinimumMisses (variable). In this method the misfire cannot be put to the cylinder that created it, this is due to no trigger being related to a particular engine cylinder ignition firing event.

Through the examples it is clear that the inventive subject matter can determine the carbon compound buildup contained within the internal combustion engine, and determine the correct scale for said carbon. It is also clear that the induction analyzer can determine if the internal combustion engine is misfiring. This data can be conveyed to the service personal through visual or audible alerts. It will also be important for the induction cleaning analyzer to save the before cleaning data to the VIN number of the vehicle being tested, so it can compare the after cleaning results to determine the carbon compound cleaning results.

In an embodiment of the induction cleaning analyzer instrumentation 11 shown and described herein, the instrumentation 11 may be referred to as an induction cleaning analyzing system. The system 11 may be used to identify pressure variations across combustion cycles of cylinders, which can be indicative of carbon build up in the engine 13. The system 13 can identify the pressure variations, characterize the carbon build up (e.g., quantify or otherwise present for use by an operator of the system 11), and/or recommend one or more remedial measures or actions based on the pressure variations.

As described above, the system 11 includes the pressure sensor 31, the ignition event detector 33, and the control module 35. The module 35 may include or represent one or more hardware components, such as one or more microprocessors (also referred to as processors), controllers, and the like. The screen 41 may be a touch screen. Optionally, one or more input devices, such as a key pad (not shown) and a mouse (also not show) may be provided to provide user input in addition to or in place of the screen 41. The pressure sensor 31 and detector 33 are connected to A/D converter 37 via, respectively, cables 43 and 45. Optionally, the pressure sensor 31 and/or the antenna 33 may be connected via a wireless connection and/or via one or more other connections.

As described above, ignition signals are identified by the detector 33, which may represent or include an antenna 33 placed on top of or near the engine 13. For example, the antenna may be laid onto the engine 13 or near the engine 13, without conductively coupling any portion of the antenna to the ignition coil 19, wires 21, or spark plugs in the cylinders 14. The detector 33 may detect when the different ignition signals are communicated by detecting electromagnetic interference that is generated by transmission of the ignition signals through the wires 21. Additionally or alternatively, the detector 33 may detect the ignition signals as the electromagnetic interference that is generated by the spark plugs when the different spark plugs fire.

Optionally, the detector 33 may be replaced or augmented with a connection of the system 11 to a coil of the engine 13. This coil connection could be a coil primary signal, coil secondary signal, or a coil command signal. The ignition signal also or alternatively could be detected as a signal from a fuel injector from a compression ignition engine. With such a signal that is now directly linked to a specific cylinder, the cylinder(s) can be identified to the actual cylinder that created each of the pressure waveforms.

As described above, the timing of when the various cylinders 14 combust the air/fuel charges in the cylinders 14 may be determined or approximated using the detection signal from the detector 33. As described above, the detection signal can represent this timing (e.g., as being representative of the ignition signals). The ignition signals can be used to divide the exhaust pressure waveform that is obtained using the pressure sensor 31 into segments. Additionally or alternatively, when the pressure sensor senses the pressure of the air drawn into the intake manifold 15, the pressure waveform may represent the intake pressure waveform, which may be divided into segments by the ignition signals.

Figure 9A:
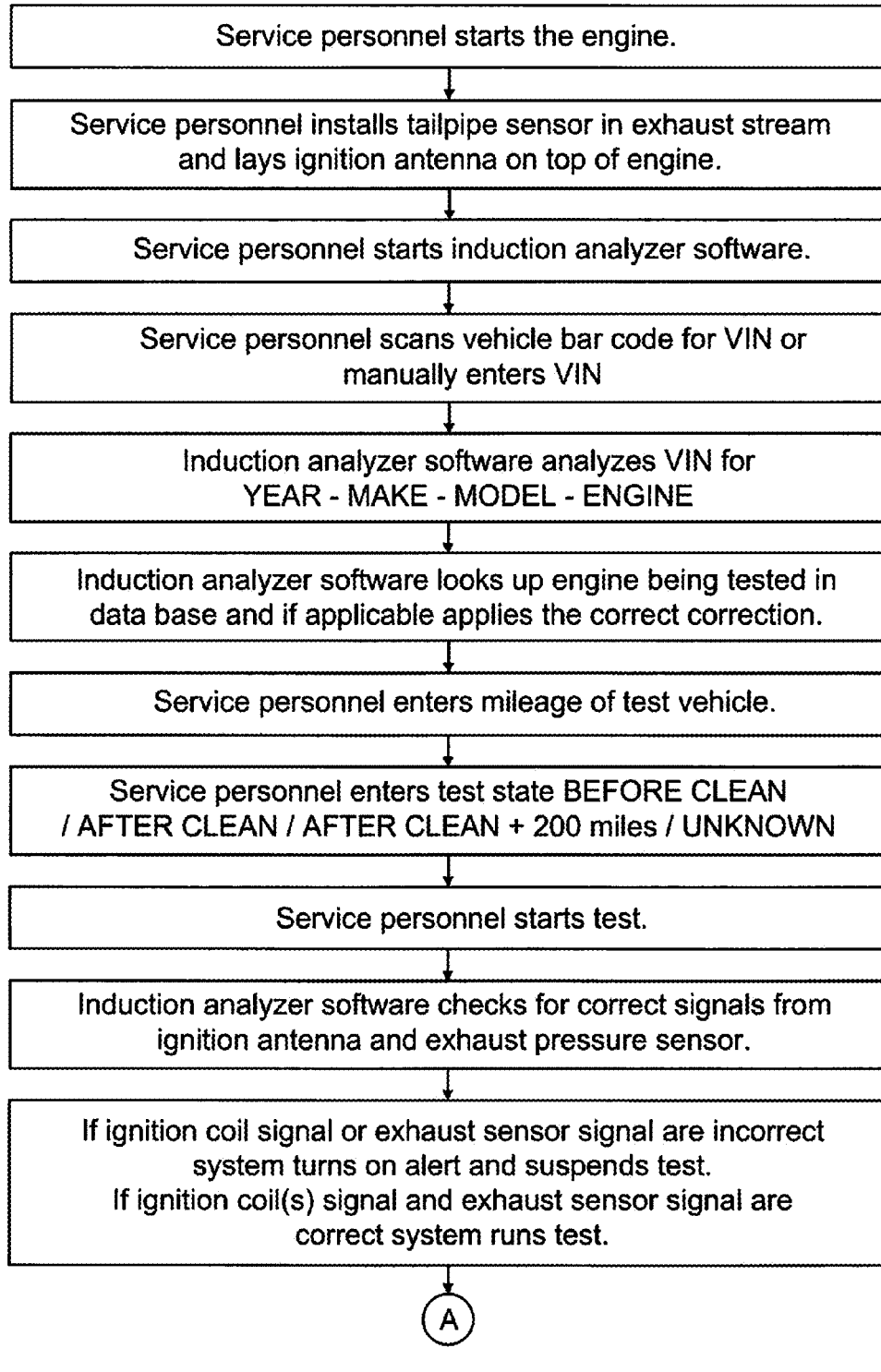
FIGS. 9A and 9B illustrate a flow chart for an operational sequence of an embodiment of the inventive subject matter.
Figure 9B:
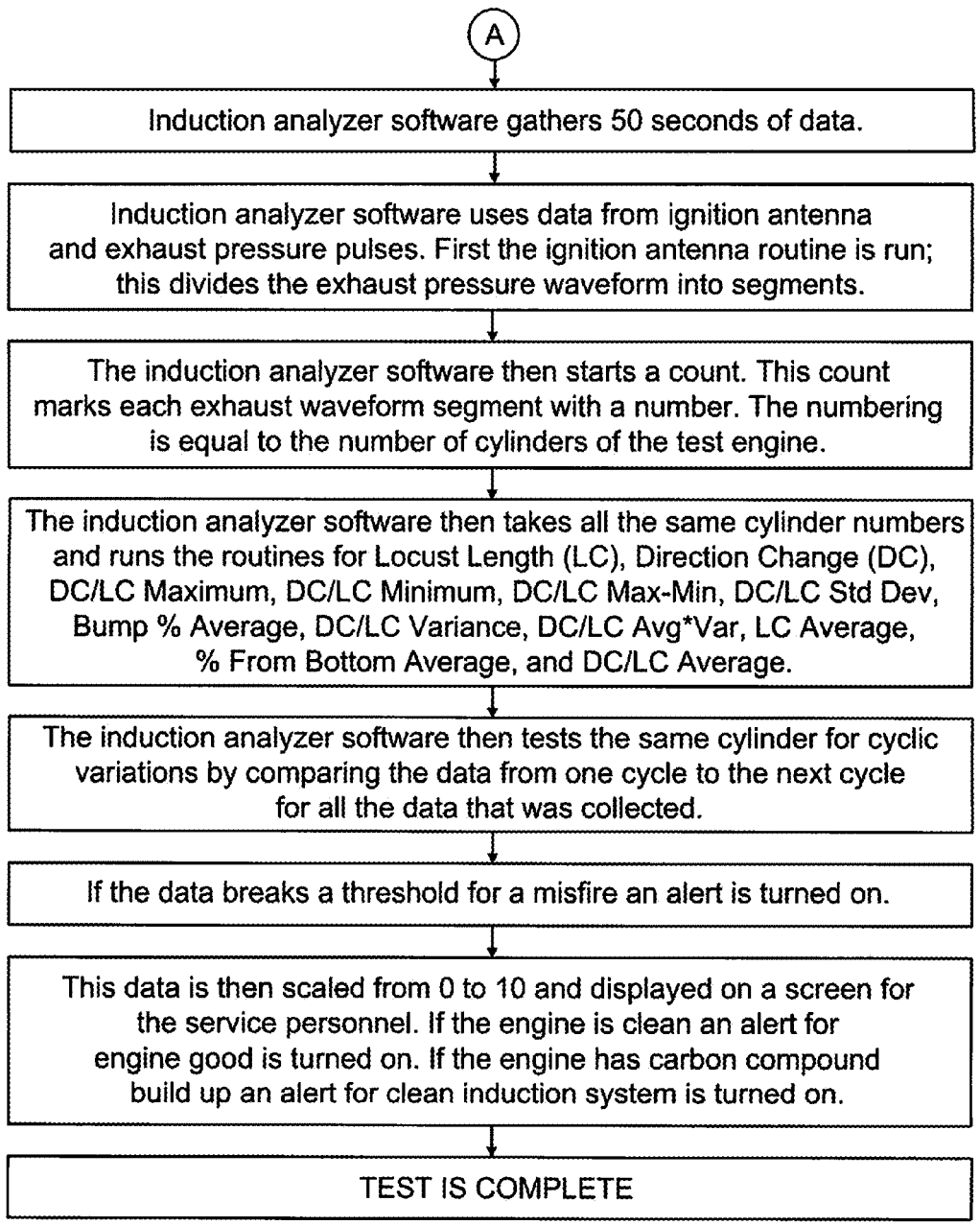
Figure 37:
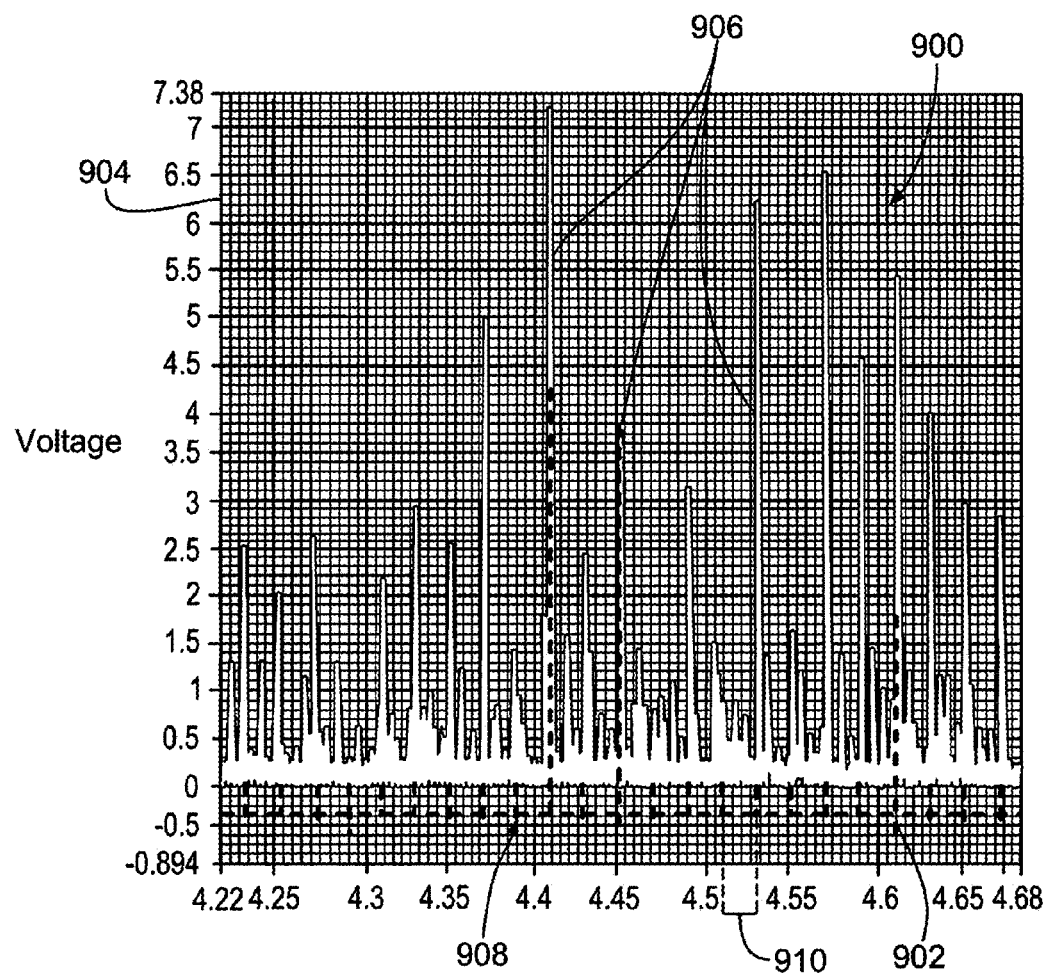
FIG. 37 illustrates an example of ignition signals.

FIG. 37 illustrates an example of ignition signals 900. These ignition signals may be similar or identical to the signals shown in FIGS. 12 and 13. The ignition signals 900 are shown alongside horizontal axes 902 representative of time and vertical axes 904 representative of magnitude (e.g., voltage) of the ignition signals 900. As shown in FIG. 9, the ignition signals 900 include several peaks 906 separated in time from each other. These peaks 906 may be used to identify when the various cylinders 14 of the engine being monitored fire (e.g., generate sparks) or are signaled to fire. For example, peaks 906 that extend above one or more thresholds and/or that are separated from each other by at least a designated, non-zero time limit. For example, a peak may be identified as a portion of an ignition signal that extends above a magnitude threshold and that occurs at least a designated time limit following a preceding peak. The peaks 906 may be identified by the control module 35.

The control module 35 may determine the number of cylinders 14 in the engine being examined based on user input. For example, using the computer screen or other input device, an operator of the system 11 may input how many cylinders 14 are in the engine. Additionally or alternatively, the user input may provide the make, model, or type of engine and/or vehicle that includes the engine, and the control module 35 may refer to a table, list, database, or other memory structure that associates the different makes, models, identification numbers, or types of engines and/or vehicles with a number of cylinders in the engine under examination. This table, list, database, or other memory structure may be stored in a memory that is internal to the control module 35 or that is external but otherwise accessible to the control module 35.

Figure 38:
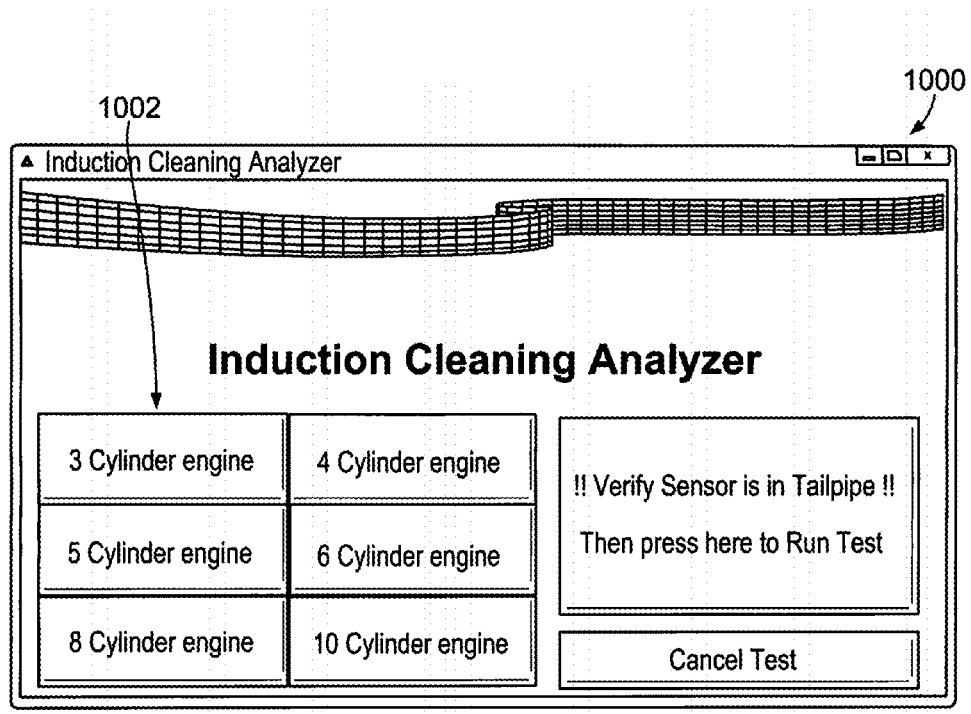
FIG. 38 illustrates one example of an input screen that may be presented to an operator of the system shown in FIG. 37 via a display device.

For example, the number of cylinders 14 in the engine under test may be selected at the beginning of an induction cleaning analyzer test that is performed using the system 11. Alternately, the vehicle identification number can also be used for the engine type and cylinder count from another drop down menu, or the vehicle identification number can be scanned with a bar code reader, or manually entered, all as shown in a user input screen shot shown in FIG. 10. FIG. 38 illustrates one example of an input screen 1000 that may be presented to an operator of the system 11 via a display device. The input screen 1000 may the same as or similar to the screenshot shown in FIG. 10. The input screen 1000 allows the operator to manually select the number of cylinders 14 in the engine 13, such as by selecting a box or other icon 1002 from several icons 1002 that represent different numbers of cylinders 14. This input may be used by the system 11 to determine which peaks in the ignition signals are associated with the same cylinders, as described below.

Figure 39:
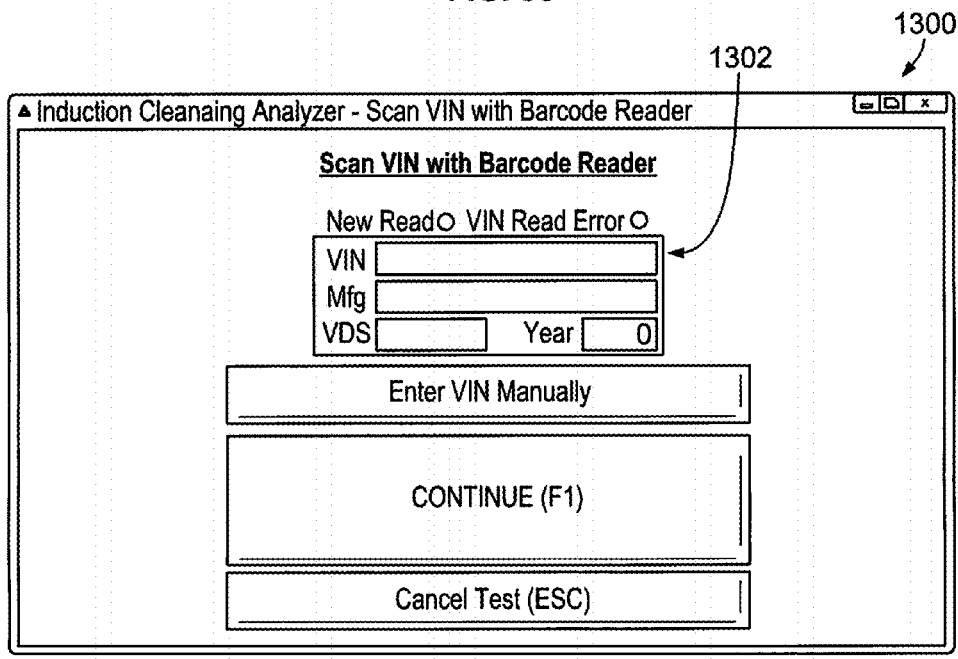
FIG. 39 illustrates another example of an input screen that may be presented to an operator of the system shown in FIG. 37 via a display device.

FIG. 39 illustrates another example of an input screen 1300 that may be presented to an operator of the system 11 via a display device. The input screen 1300 may be the same as or similar to the screen shown in FIG. 11. The input screen 1300 allows the operator to determine the number of cylinders 14 in the engine 13 for the system 11 in a more automated or user-friendly manner, such as by manually inputting the vehicle identification number (VIN) into an input section 1302 of the input screen 1300. The VIN (or a portion thereof) may be associated with a number of cylinders 14 in an engine 13 in a table, list, database, or other memory structure of the system 11 or that is otherwise accessible to the system 11. Additionally or alternatively, the system 11 may be connected to an optical scanner as an input device, such as a bar code reader. This optical scanner may be used to scan indicia printed on or near the vehicle in order to determine the VIN; or the make, model, and/or type of engine 13. The system 11 may then use the VIN and/or make, model, and/or type of engine to determine the number of cylinders 14 in the engine 13, such as from a table, list, database, or other memory structure that associates the VIN (or a portion thereof) and/or the make, model, and/or type of engine 13 with a number of cylinders 14 in the engine 13.

With the number of cylinders known, the control module 35 (e.g., the microprocessor operating based on a trigger detector algorithm) can identify ignition events 908 representative of times at which spark plugs in an internal combustion engine are firing or times at which electric fuel injector turn on pulses of a diesel engine occur. In an embodiment, the control module 35 can identify the ignition events 908 based on when the peaks 906 are identified. Optionally, the control module 35 can identify the ignition events 908 even when one or more of the peaks 906 are not detected by the detector, such as due to inaccurate placement of the detector, weakened ignition signals, where some ignition coils are shielded, and the like.

For example, in an embodiment, the control module 35 examines the ignition signals and identifies peak voltages as the peaks 906 as being representative of when the ignition events 908 of the spark plugs in an internal combustion engine or electric fuel injector turn on pulses of a diesel engine actually occur. The control module 35 may optionally examine the ignition signals and identifies peak voltages as the peaks 906 as being representative of times that are offset by the ignition events 908 by a designated time period.

The control module 35 may ensure that the ignition events 908 are identified as occurring at accurate times relative to actual operation of the engine by identifying the ignition events 908 at times that are based on when the peaks 906 occur and/or based on one or more operational parameters of the engine. These operational parameters may be obtained via user input and/or from a memory structure included in or otherwise accessible to the control module 35. The operational parameters may include a number of cylinders 14 in the engine, the typical (e.g., average, median, or designated) operating speed (e.g., revolutions per minute or RPM) of the engine under test, the actual operating speed of the engine under test, and the like.

The control module 35 can move (with respect to time) the identification of an ignition event 908 relative to detection of a peak 906 and/or identify an ignition event 908 where no peak 906 is identified to ensure that the ignition events 908 are consistent with (e.g., are correlated to) expected ignition event intervals of the engine. The expected ignition event intervals represent time periods or times at which ignition events are expected to occur according to the operational parameters of the engine. For example, different makes, models, and/or types of engines, different operating speeds of the engine, different numbers of cylinders in the engine, or the like, may be associated with different times at which the ignition events are expected or calculated to occur.

If the control module 35 does not identify a peak 906 at an expected time or within an expected time interval (e.g., based on the make, model, and/or type of engine, engine operating speed, number of cylinders, and the like), the control module 35 may determine that an ignition interval occurred at that expected time or within the expected time interval, even though no peak was detected at the time or within that time period. For example, if the control module 35 detects a previous peak 906 at a previous time and expects to detect a subsequent peak 906 at a subsequent time (based on operational parameters of the engine), but does not actually detect the subsequent peak 906, the control module 35 may still consider an ignition event occurring at the subsequent time or within a subsequent time period based on the operational parameters of the engine. This can ensure evenly and/or more accurately identified ignition events marks for accurate exhaust (or intake in the case of the embodiments of FIGS. 7 and 8) segment lengths, one for each cylinder of the engine being tested.

Temporal segments of interest 910 are identified by the control module 35 based on the ignition events that are identified by the control module 35. These segments of interest 910 can represent combustion cycles of the cylinders 14. The segments of interest 910 may be bounded (with respect to time) by sequential ignition events 908. If the intake pressure of the engine is being monitored, then the segments of interest 910 can represent intake segments of interest. If the exhaust pressure of the engine is being monitored, then the segments of interest can represent exhaust segments of interest.

The ignition events 908 and/or segments of interest 910 can represent combustion cycles of the cylinders 14. For example, the different ignition events 908 can represent the time at which the power strokes of the different cylinders 14 occurs or is directed to occur (e.g., by transmission of an ignition signal). The segments of interest 910 may represent the time period over which the four stroke combustion cycle occurs for the various cylinders 14. For example, a segment of interest 910 for a cylinder 14 may begin at the power stroke of the cylinder 14, extend across the exhaust stroke and the induction stroke, and terminate at the end or near the end of the compression stroke.

After the segments of interest 910 and/or ignition events 908 are identified, one of the ignition events 908 or segments of interest 910 is selected as a point at which the microprocessor starts a cylinder count. In an embodiment, the ignition event 908 or segment of interest 910 that is selected need not correspond to the firing of a first cylinder (or any particular cylinder) of the engine. Based on which ignition event 908 or segment of interest 910 is selected, the control module 35 may associate different segments of interests 910 with different cylinders 14 of the engine. For example, if the engine has four cylinders 14, then the control module 35 may associate every fourth segment of interest 910 with a different cylinder. One cylinder may be associated with the first, fifth, ninth, and so on, segment of interest 910, another cylinder may be associated with the second, sixth, tenth, and so on, segment of interest 910, another cylinder may be associated with the third, seventh, eleventh, and so on, segment of interest 910, and the other cylinder may be associated with the fourth, eighth, twelfth, and so on, segment of interest 910. As another example, if the engine has six cylinders 14, then the control module 35 may associate every sixth segment of interest 910 with a different cylinder. The segments of interest 910 are compared to pressure waveforms detected by the pressure sensor 31 to associate different waveform segments with different cylinders 14 of the engine.

Figure 40:
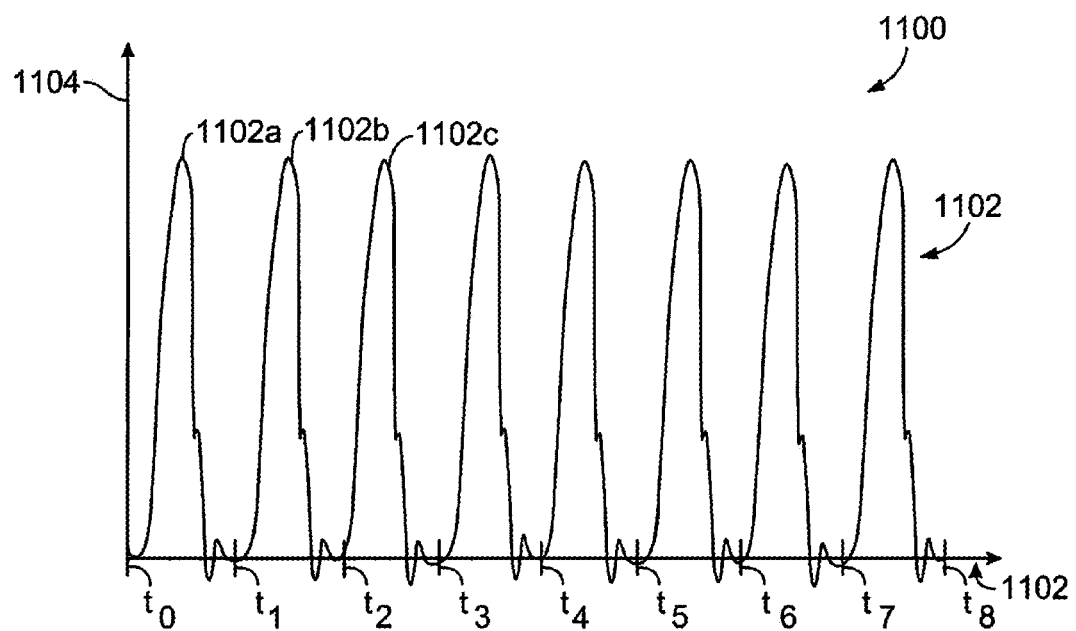
FIG. 40 is a schematic example of pressure waveforms for an engine.

FIG. 40 is a schematic example of pressure waveforms 1100 for an engine. The pressure waveforms 1100 represent exhaust or intake pressures that are measured for an engine during operation of the engine and over several ignition events and/or multiple four stroke combustion cycles of multiple cylinders 14 in the same engine. The pressure waveforms 1100 are shown alongside a horizontal axis 1102 representative of time and a vertical axis 1106 representative of pressure magnitudes. Because the intake or exhaust pressure is measured upstream or downstream of several or all of the cylinders 14 (as described and shown above), it may not be known which pressure waveform corresponds to the ignition event of which cylinder 14. For example, because each cylinder 14 separately draws air into the cylinder 14 (e.g., intake air) from the same intake airflow passageway used by the other cylinders 14 and each cylinder 14 separately exhausts combusted air/fuel charges from the cylinder 14 into the same exhaust airflow passageway (e.g., an exhaust manifold or tailpipe), the pressure waveform 1100 alone may be insufficient to identify which segments or portions of the pressure waveforms 1100 represent the intake or exhaust pressures generated by individual ones of the cylinders 14.

In order to determine which portions of the pressure waveforms 1100 correspond to the intake or exhaust pressure generated by the different cylinders, the control module 35 may compare the segments of interest 910 and/or ignition events 908 of the cylinders 14 with the pressure waveforms 1100. For example, the time periods over which the various segments of interest 910 occur may be compared to (e.g., overlaid with) the pressure waveforms 1100 to determine which pressure waveforms 1100 occur or are measured during the corresponding segments of interest 910.

Different waveform segments 1100 may occur during (e.g., are located within) the same time periods as different segments of interest 910. For example, a first segment of interest 910 may extend from a time $t_0$ to a later time $t_2$. The portion of the pressure waveform 1100 that occurs during this same time period as the first segment of interest 910 (e.g., from the time $t_0$ to the time $t_1$) may be a first waveform segment 1100A. A subsequent, second segment of interest 910 may extend from the time $t_1$ to a later time $t_2$. The portion of the pressure waveform 1100 that occurs during this same time period as the second segment of interest 910 may be a second waveform segment 1100B. A subsequent, third segment of interest 910 may extend from the time $t_2$ to a later time $t_3$. The portion of the pressure waveform 1100 that occurs during this same time period as the third segment of interest 910 may be a third waveform segment 1100C. Additional waveform segments 1106 may be identified for additional segments of interest 910.

Additionally or alternatively, the waveform segments 1106 may be identified for the different ignition events 908. When an ignition event 908 occurs or is identified, the control module 305 may include the portion of the pressure waveform 1100 that occur over a time period that begins at the same time as the ignition event 908 (or a designated time period that is offset from the ignition event 908) and ends a designated time period later. For example, if a first ignition event 908 occurs at a time $t_0$, the control module 35 may begin including the portions of the pressure waveforms 1100 that follow the time $t_0$ for a designated time period, such as several milliseconds or seconds.

The portions of the pressure waveform 1100 that follow the time at which the ignition event 908 occurs during this designated time period are included in the first waveform segment 1106A. If a subsequent, second ignition event 908 occurs at a later time $t_1$, the control module 35 may begin including the portions of the pressure waveforms 1100 that follow the time $t_1$ for the same designated time period. The portions of the pressure waveform 1100 that follow the time at which the second ignition event 908 occurs during this designated time period are included in the second waveform segment 1106B. If a subsequent, third ignition event 908 occurs at a later time $t_2$, the control module 35 may begin including the portions of the pressure waveforms 1100 that follow the time $t_2$ for the same designated time period. The portions of the pressure waveform 1100 that follow the time at which the third ignition event 908 occurs during this designated time period are included in the third waveform segment 1106C. Additional waveform segments 1106 may be identified in a similar manner.

The designated time period used to identify which portions of the pressure waveforms 1100 that are included in the different waveform segments 1106 may be based on operating parameters of the engine. For example, the designated time period may be sufficiently short so that the waveform segment 1106 associated with one ignition event 908 does not extend into another, immediately following ignition event 908.

Each of the waveform segments 1106 may represent a combustion cycle (e.g., a four stroke combustion cycle) of a cylinder 14. Several waveform segments 1106 may be identified for the same cylinder 14. For an n cylinder engine (where N represents the number of cylinders 14 in the engine), every $n^{th}$ waveform segment 1106 may correspond to the same cylinder 14. The control module 35 may determine the value of n from the user input, as described above. As one example, in an engine having four cylinders 14, the first, fifth, ninth, and so on, waveform segments 1106 may represent the pressure of the intake or exhaust from one cylinder 14, the second, sixth, tenth, and so on, waveform segments 1106 may represent the pressure of the intake or exhaust from another cylinder 14 in the same engine, the third, seventh, eleventh, and so on, waveform segments 1106 may represent the pressure of the intake or exhaust from another cylinder 14 in the same engine, and the fourth, eighth, twelfth, and so on, waveform segments 1106 may represent the pressure of the intake or exhaust from another cylinder 14 in the same engine.

The control module 35 may determine subsets of the waveform segments 1106 in the pressure waveforms 1100 as being associated with different ones of the cylinders 14. For example, in a six cylinder engine, the first, seventh, thirteenth, and so on, waveform segments 1106 may be included in a first subset of waveform segments 1106 that is associated with one cylinder 14, the second, eighth, fourteenth, and so on, waveform segments 1106 may be included in a different, second subset of waveform segments 1106 that is associated with another cylinder 14, and so on. The different subsets of waveform segments 1106 may be different, non-overlapping subsets such that no waveform segment 1106 in two different subsets is associated with different cylinder 14.

The order in which the waveform segments 1106 are identified may not directly correspond to the number of the cylinder in the engine. For example, the four cylinders 14 in the engine referred to above may be associated with (e.g., identified by) designated numbers, such as cylinder #1, cylinder #2, cylinder #3, and cylinder #4. The first, fifth, ninth, and so on, waveform segments 1106 that are identified from the pressure waveforms 1100 may not necessarily correspond to the intake or exhaust pressures generated by cylinder #1. Instead, these waveform segments 1106 may correspond to the pressures generated by another cylinder.

In an embodiment, once one or more waveform segments 1106 are identified for the different cylinders 14 in the engine, the control module 35 may separately examine the waveform segments 1106 associated with each of the cylinders 14 in order to identify cyclic variations. By "separately examine," it is meant that, for a particular cylinder 14, the control module 35 may analyze the waveform segments 1106 that correspond to that cylinder 14 without examining or analyzing the waveform segments 1106 associated with one or more other cylinders 14. The control module 35 may separately examine the cylinders 14 in the engine by only analyzing the waveform segments 1102 associated with each of those cylinders 14.

Figure 41:
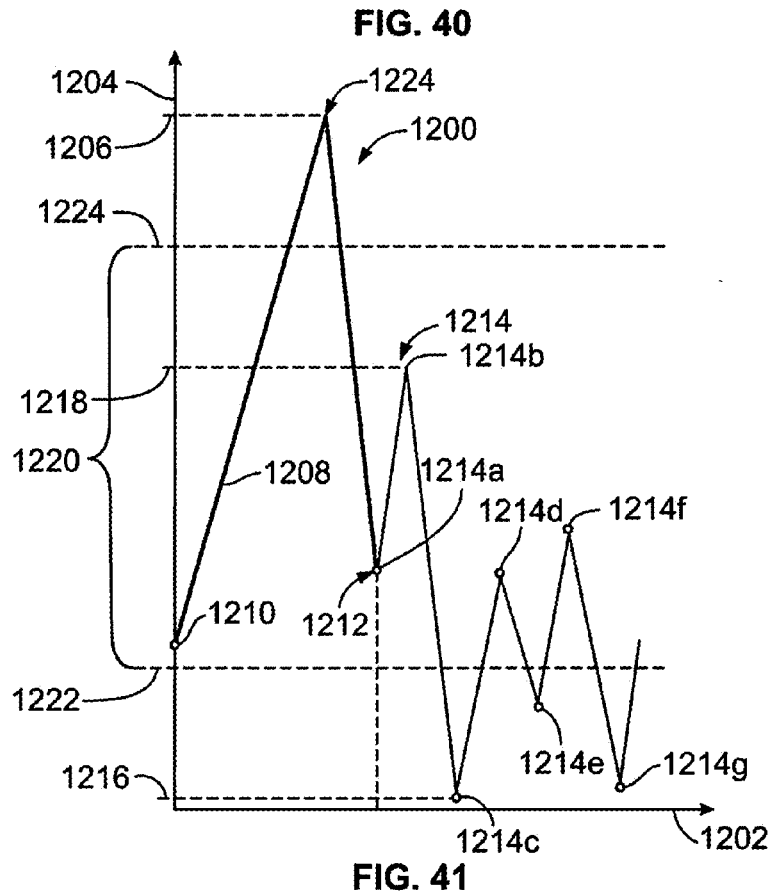
FIG. 41 is an example of a waveform segment that may be identified for a cylinder.

FIG. 41 is an example of a waveform segment 1200 that may be identified for a cylinder 14. The waveform segment 1200 may represent a single one of the waveform segments 1106. Alternatively, the waveform segment 1200 may represent multiple waveform segments 1106 for a single cylinder 14 (e.g., an average, median, or other measure of multiple waveform segments 1106). The waveform segment 1200 is shown alongside a horizontal axis 1202 representative of time and a vertical axis 1204 representative of measured intake or exhaust pressure.

The control module 35 can examine the waveform segment 1200 to determine one or more pressure indices representative of the waveform segment 1200. These pressure indices can be compared to other waveform segments 1200 for the same cylinder 14 in order to identify variations in the intake or exhaust pressures of the same cylinder 14 over multiple cycles of operation of the cylinder 14 (e.g., multiple combustion cycles). The pressure indices described herein are provided merely as some examples and are not intended to be limiting on all embodiments of the inventive subject matter. Other measurements or quantifications of differences between the intake and/or exhaust pressures among multiple combustion cycles of one or more of the cylinders 14 may be used.

One pressure index that may be determined by the control module 35 is an upper pressure index 1206. The upper pressure index 1206 can represent a pressure of the waveform segment 1200 that is greater than one or more other pressures of the waveform segment 1200. As one example, the upper pressure index 1206 can be the maximum measured pressure of the waveform segment 1200. As another example, the upper pressure index 1206 may be a measured pressure other than the maximum pressure in the waveform segment 1200. The upper pressure index 1206 may be referred to herein as "max."

Another pressure index that may be determined by the control module 35 is a waveform or locus length index 1208. This index may be referred to herein as waveform length, LC, and/or an overall length. The locus length 1208 can represent the actual length of a waveform, such as the length along the path of the waveform. As an example, the locus length of a waveform can be the distance that extends from the location 1210 to a peak 1224 of the waveform and from the peak 1224 to the location 1212. The locus length may be determined by counting the points (e.g., data points representative of pressures at different times) that form the waveform. These points are extrapolated with a linear line to make up the waveform. If the points are counted in a set period of time, the waveform length (e.g., the locus length (shown as 1208 in FIG. 41) can be known.

Another pressure index that may be determined by the control module 35 is a direction change index. This index also may be referred to as direction changes, overall direction changes, and/or DC. The direction changes are the number of up and down changes 1214 that occur in the waveform within a given period of time. Each time the waveform changes from an up to down movement this is a count, and each time the waveform changes from a down to up movement this is a count. Each direction change is a count, and these counts are totaled for a period of time from one ignition event to the next ignition event. In an embodiment, the changes 1214 that are counted are the changes that occur after the peak 1224 of the waveform 1200. In the illustrated example, seven changes 1214 are identified (e.g., changes 1214A-G). Accordingly, the direction change index of the waveform segment 1200 may be seven or another number that is based on eight.

Another pressure index that may be determined by the control module 35 is a lower pressure index 1216. This index also may be referred to herein as "min." The lower pressure index 1216 can represent a pressure of the waveform segment 1200 that is less than one or more other pressures of the waveform segment 1200. As one example, the lower pressure index 1216 can be the lowest measured pressure (e.g., minimum pressure) of the waveform segment 1200. As another example, the lower pressure index 1216 may be a measured pressure other than the lowest pressure in the waveform segment 1200.

Another pressure index that may be determined by the control module 35 is a hump pressure index 1218. This index also may be referred to as an 80/20 hump, an 80/20 hump percent, and/or "hump %." The hump pressure index 1218 represents an upper or maximum pressure of the waveform segment 1200 that is measured following the upper pressure index 1206 and that occurs within a designated range 1220 of the upper pressure index 1206. The designated range 1220 may be based on the upper pressure index 1206. For example, the designated range 1220 may extend from a lower pressure 1222 (e.g., 20% or another percentage or amount of the upper pressure index 1206) to an upper pressure 1224 (e.g., 80% or another percentage or amount of the upper pressure index 1206). In another example, the lower pressure 1222 may occur at a designated percentage of the difference between the upper and lower pressure indices 1206, 1216 (e.g., 20% or another percentage of this difference) and the upper pressure 1224 may occur at another designated percentage of the difference between the upper and lower pressure indices 1206, 1216 (e.g., 80% or another percentage of this difference).

The control module 35 may examine one or more of the above pressure indices for the waveform segments 1200 associated with the same cylinder 14 in order to identify cyclic variations in the intake or exhaust pressures of the cylinder 14 over time. These variations may be indicative of carbon build up in the engine 13. In one aspect, the control module 35 may compare pressure indices of individual waveform segments 1200 with each other to identify cyclic pressure variations. In another aspect, the control module 35 may determine averages, medians, or other measurements representative of several pressure indices and compare pressure indices of individual waveform segments 1200 with the averages, medians, or other measurements to identify cyclic pressure variations.

As one example, the control module 35 may compare the upper pressure indices 1206 for two or more waveform segments 1200 associated with the same cylinder 14 to identify differences between the upper pressure indices 1206. If the difference between the upper pressure indices 1206 of the waveform segments 1200 exceeds a designated threshold (e.g., a threshold that is operator-selected, hardware fixed, or based on a make, model, and/or type of the engine), then the control module 35 may determine that the cyclic pressure variations for that cylinder 14 indicate an unacceptable amount of carbon build up.

As one example, the control module 35 may compare the lower pressure indices 1216 for two or more waveform segments 1200 associated with the same cylinder 14 to identify differences between the lower pressure indices 1216. If the difference between the lower pressure indices 1216 of the waveform segments 1200 exceeds a designated threshold (e.g., a threshold that is operator-selected, hardware fixed, or based on a make, model, and/or type of the engine), then the control module 35 may determine that the cyclic pressure variations for that cylinder 14 indicate an unacceptable amount of carbon build up. The differences between lower pressure indices may be referred to as a difference in minimum bottoms or difference in minimum bottom percentages.

As another example, the control module 35 may compare the length indices 1208 for waveform segments 1200 associated with the same cylinder 14. The length indices 1208 may vary among the waveform segments 1200 when induction turbulence is present, which may indicate that carbon build up has reached unacceptable levels. Therefore, if the control module 35 determines that the length indices 1208 change by more than a threshold amount, then the control module 35 may determine that the cyclic pressure variations for that cylinder 14 indicate an unacceptable amount of carbon build up.

As another example, the control module 35 may compare the direction change indices for waveform segments 1200 associated with the same cylinder 14. The number of direction changes may vary among the waveform segments 1200 when induction turbulence is present, which may indicate that carbon build up has reached unacceptable levels. Therefore, if the control module 35 determines that the number of direction changes varies by more than a threshold amount among two or more of the waveform segments 1200, then the control module 35 may determine that the cyclic pressure variations for that cylinder 14 indicate an unacceptable amount of carbon build up.

As another example, the control module 35 may examine the hump pressure indices 1216 for one or more of the waveform segments 1200. In one aspect, if the hump pressure index 1216 for a waveform segment 1200 exceeds a non-zero threshold, the control module 35 may determine that the cylinder 14 is associated with an unacceptable level or amount of carbon build up in the engine 13. Additionally or alternatively, if differences between the hump pressure indices 1216 for two or more of the waveform segments 1200 associated with the same cylinder 14 exceed a non-zero threshold, the control module 35 may determine that the cylinder 14 is associated with an unacceptable level or amount of carbon build up in the engine 13.

As another example, the control module 35 may compare the length indices 1208 (which may be referred to by LC) and direction change indices (which may be referred to as DC) for waveform segments 1200 associated with the same cylinder 14. In one aspect, the control module 35 divides the length index 1208 by the number of directional changes for each of two or more waveform segments 1200 associated with the same cylinder 14 to obtain a derived index (e.g., LC/DC) for these waveform segments 1200.

This derived index may be calculated for several waveform segments 1200 and the average, median, or other measurement of the several derived indices may be determined. Additionally or alternatively, a variance (e.g., standard deviation) of the several derived indices may be calculated. The average, median, or other measurement of several of these variances may be determined. Relatively short length indices 1208 and/or relatively large numbers of direction changes in the waveform segments 1200 may indicate turbulence associated with the intake air or exhaust of the cylinder 14. Consequently, smaller derived indices may be representative of increased carbon build up associated with the cylinder 14.

In one aspect, the derived index is calculated several times for the same cylinder and then averaged. A variance that is based off of the derived index also is calculated for the cylinder. This variance of the LC/DC is then averaged and then the average LC/DC is multiplied by the average variance of the LC/DC.

The control module 35 can use one or more of the indices described above, the calculations performed using the indices described above, or other analysis of the indices of the waveform segments 1200 to derive a scale index of the cylinder 14 (from which the indices are obtained) and/or a scale index of the engine 13. For example, one or more of the indices described above, the differences between the indices, the variances among the indices, or the like, may be converted into a scale index between a lower value and an upper value, such as between a value of 0 (or 1) and 10. Lower values may represent an engine 13 that likely has a significant amount of turbulence and, as a result, should be cleaned. Higher values may represent an engine 14 that is less likely to have a significant amount of turbulence and, as a result, may not need to be cleaned. Alternatively, lower values may represent an engine 13 that is less likely to have carbon build up and higher values may represent an engine 13 that is more likely to have carbon build up.

Figure 42:
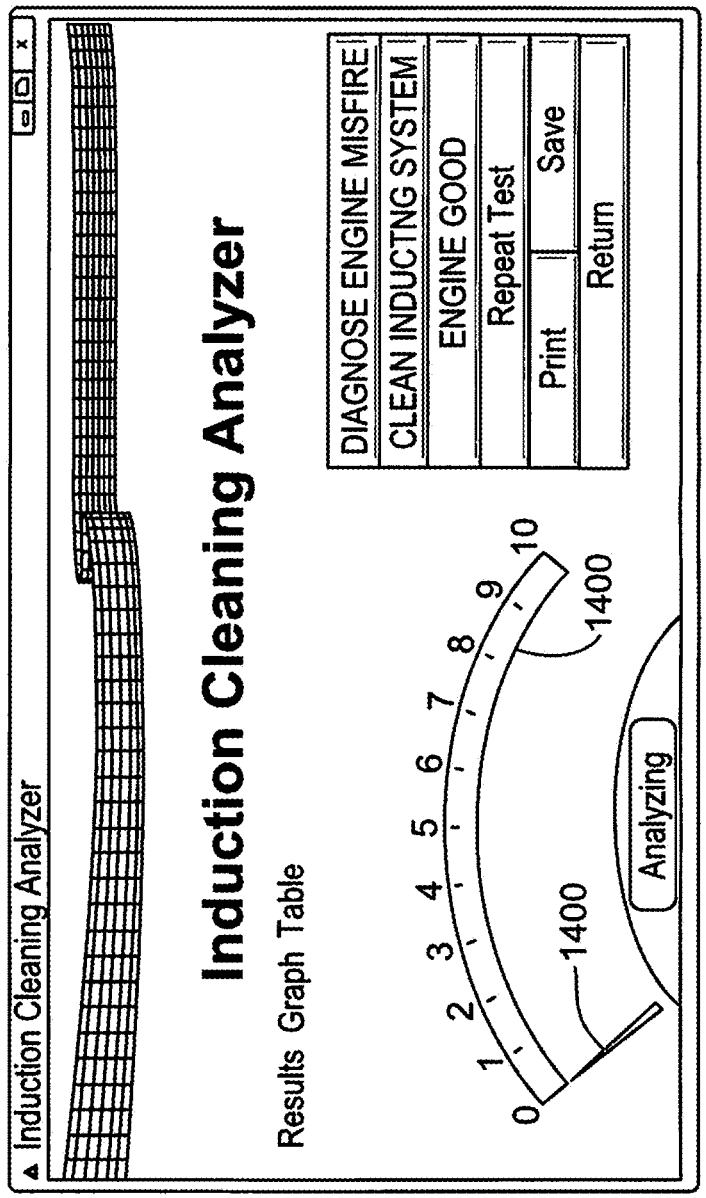
FIG. 42 illustrates an example of a testing results scale that can be presented to an operator of the system shown in FIG. 37.

FIG. 42 illustrates an example of a testing results scale 1400 that can be presented to an operator of the system 11. The scale may be similar to or the same as the scale shown in FIG. 15. The scale 1400 also may be referred to as a carbon build up scale. The scale 1400 may be used to provide a relatively easy to interpret summary of the results of the system 11 testing the potential carbon build up in the engine 13. For example, the scale 1400 may be presented to an operator on a display device of the system 11. The illustrated scale 1400 extends from a value of 0 to a value of 10. A range of colors may be displayed along the scale 1400 to represent the different values. For example, larger values (e.g., ten to eight) may be associated with green or different shades of green, larger intermediate values (e.g., eight to six) may be associated with yellow or different shades of yellow, smaller intermediate values (e.g., six to four) may be associated with orange or different shades of orange, and smaller values (e.g., four to zero) may be associated with red or different shades of red. The values associated with green colors may represent engines 13 having relatively low amounts of carbon build up, as determined from the pressure indices described above. The values associated with yellow colors may represent engines 13 having greater amounts of carbon build up, as determined from the pressure indices described above. The values associated with orange colors may represent engines 13 having even greater amounts of carbon build up, as determined from the pressure indices described above. The values associated with red colors may represent engines 13 having significant amounts of carbon build up, as determined from the pressure indices described above. While values of zero to ten and various colors are described in connection with the scale 1400, optionally other values and/or colors may be used, and/or another visual representation of the amount of carbon build up in the engine 13.

A visual indicator 1402 may point to a location along the scale 1400 to represent the amount of carbon build up identified by the system 11 using the pressure indices described above. The location of the indicator 1402 along the scale 1400 (and/or the corresponding numerical value) may clearly indicate to the operator how much carbon build up is detected in the engine 11.

The operator may refer to the location of the indicator 1402 on the scale 1400 to determine if the engine 13 needs to be cleaned to reduce or remove the carbon build up that is identified. For example, the operator may manually determine whether to recommend cleaning the engine 13 based on the location of the indicator 1402. The indicator 1402 and scale 1400 also may be presented to the owner of the vehicle that includes the engine 13 to assist the owner to determine whether to clean the engine 13. Optionally, the system 11 may provide a recommendation to clean or not clean the engine 13 based on the pressure indices. For example, if the indicator 1402 would otherwise be located below a threshold value on the scale 1400, the system 11 may automatically recommend cleaning the engine 13. It the indicator 1402 would otherwise be located at or above the threshold value on the scale 1400, the system 11 may not recommend cleaning the engine 13, but may recommend returning to have the engine 13 tested again within a designated time period that is tied to the value along the scale 1400. For example, for smaller values, the system 11 may recommend returning sooner to have the engine 13 tested again relative to larger values along the scale 1400.

The operator may select one or more cleaning processes for the engine 13 based on the location of the indicator 1402 along the scale 1400. For example, for engines 13 that are determined by the system 11 to have significantly large amounts of carbon build up, the operator may recommend a more intensive and/or more expensive cleaning process (and/or multiple cleaning processes) for the engine 13 in order to remove the large amounts of carbon build up. For engines 13 that are determined by the system 11 to have lesser amounts of carbon build up, the operator may recommend a less intensive and/or less expensive cleaning process (and/or fewer cleaning processes) for the engine 13 in order to remove the smaller amounts of carbon build up. The system 11 may optionally automatically recommend one or more of these cleaning processes based on the value of the indicator 1402 along the scale 1400, similar to as described above.

In an embodiment, the control module 35 examines the pressure indices for a cylinder 14 as follows. The control module 35 determines upper and lower pressure indices for several waveform segments 1102, 1200 associated with the cylinder 14. These upper pressure indices are averaged (or a median may be determined) and these lower pressure indices are averaged (or a median may be determined). Several averages (or medians) may be determined over time. For example, another average (or median) may be calculated for each of several designated time periods.

The lower pressure indices are compared such that, if the average (or median) of the lower pressure indices, change by more than a designated threshold, the system 11 determines that the induction system of the engine 11 has carbon build up. The average (or median) of the lower pressure indices may be scaled onto the carbon build up scale. For example, large differences in averages (or medians) of the lower pressure indices may be associated with smaller values along the scale 1400. Smaller differences in averages (or medians) of the lower pressure indices may be associated with larger values along the scale 1400.

In an aspect, the system 11 may record a log or history of the pressure indices and/or waveform segments of the cylinders 14 for an engine 13. This log or history may be recorded, such as in a remotely located centralized database. Upon future tests of the engine 13 using the system 11 (at the same or different location), the log or history of pressure indices and/or waveform segments may be compared to additional (e.g., new) pressure indices and/or waveform segments in order to identify trends or changes in performance of the engine 13 over time. These trends or changes may be referred to as long term changes or trends, as the changes or trends are identified over multiple, separate tests of the engine 13 that are performed at different times (e.g., different days, weeks, months, or years). The trends or changes may indicate decreased performance of the engine 13 due to carbon build up that may not be detected by the system 11 just examining the waveform segments 1102, 1200 or pressure indices during a current test. For example, the upper and/or lower pressure indices, the hump pressure indices, or the like, may not exhibit significant changes during a single test of the engine 13 by the system 11, but may show significant changes (e.g., decreases or increases) across multiple tests conducted over time (e.g., on different days, weeks, months, or years). The system 11 may scale these long term changes to the scale 1400 to indicate to the operator of carbon build up and/or to recommend a cleaning of the engine 13.

In an aspect, the system 11 may have access to designated waveform segments and/or designated pressure indices that can be compared to the actual waveform segments and/or actual pressure indices of an engine 13. These waveform segments and/or pressure indices can be established for different makes, models, and/or types of engines 13, and/or may be modified to account for increasing age of the engine 13, the geographic location of where the engine 13 is operated, and the like. The designated waveform segments and/or pressure indices may be stored on a memory (e.g., a database) that is included in or otherwise accessible to the system 11. The system 11 can compare actual waveform segments and/or pressure indices of the engine 13 to the designated waveform segments and/or pressure indices to determine if performance of the engine 13 deviates from the performance represented by the designated waveform segments and/or pressure indices. If such a deviation is identified (e.g., by the waveform segments and/or pressure indices varying by more than a designated, non-zero threshold), then the system 11 may identify potential carbon build up and/or recommend one or more cleaning processes for the engine 13.

The system 11 may detect misfires of the engine 13 using the pressure indices. A misfire can represent an ignition event that fails to occur when directed or expected. For example, a misfire can occur when the fuel/air charge in a cylinder 14 does not ignite when the spark plug associated with the cylinder 14 fires (or within a non-zero designated time period). The system 11 may determine that a misfire occurs when a number of locus length indices (LC) 1208 that are larger (e.g., longer) than a median (or average) of the locus length indices 1208 for the engine 13 exceeds a designated threshold. The median (or average) of the locus length indices 1208 may be modified by a correction factor (e.g., may be referred to as MisFireMultiplier).

Figure 43A:
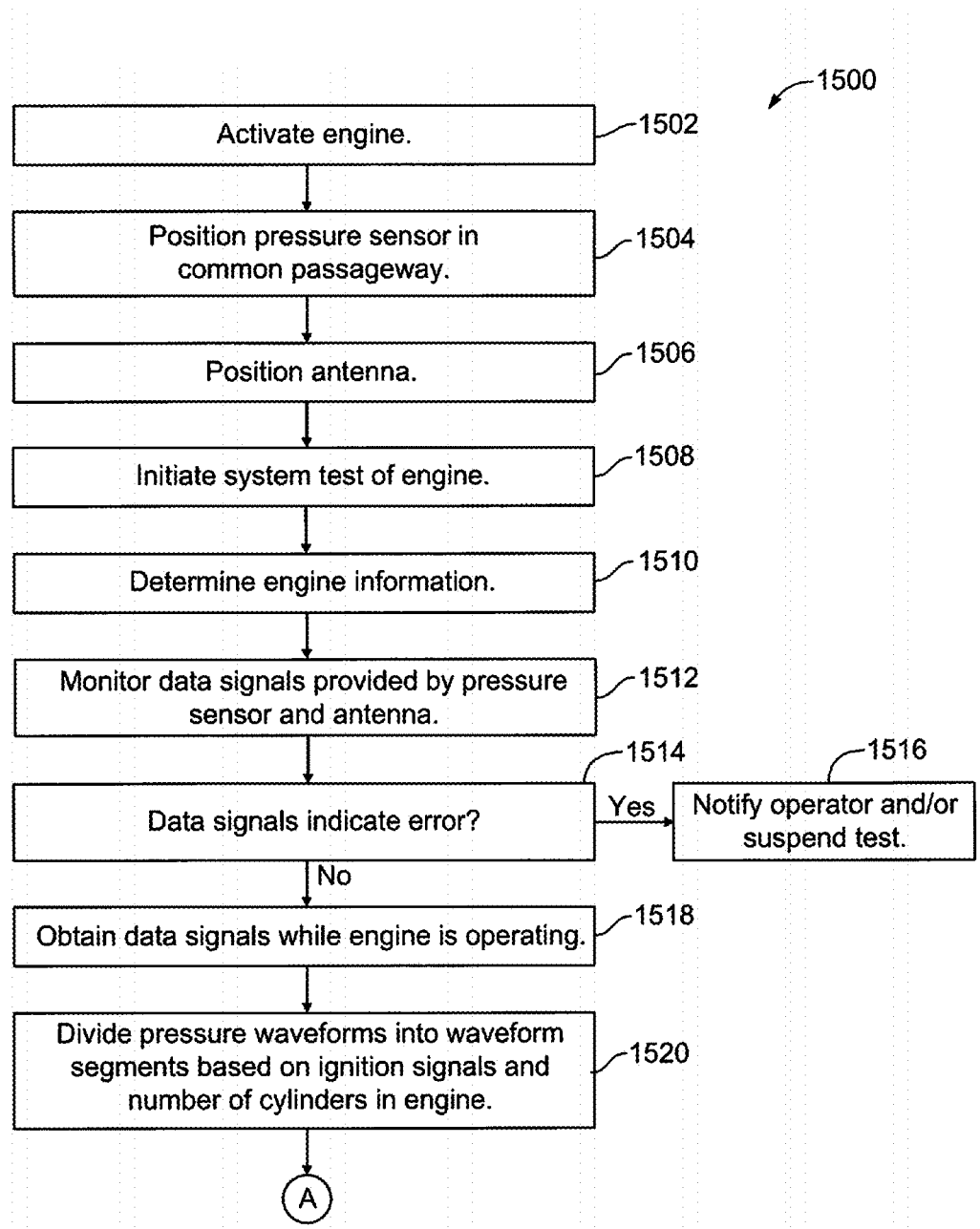
FIGS. 43A and 43B illustrate a flowchart of an example of a method for analyzing carbon buildup in an engine.
Figure 43B:
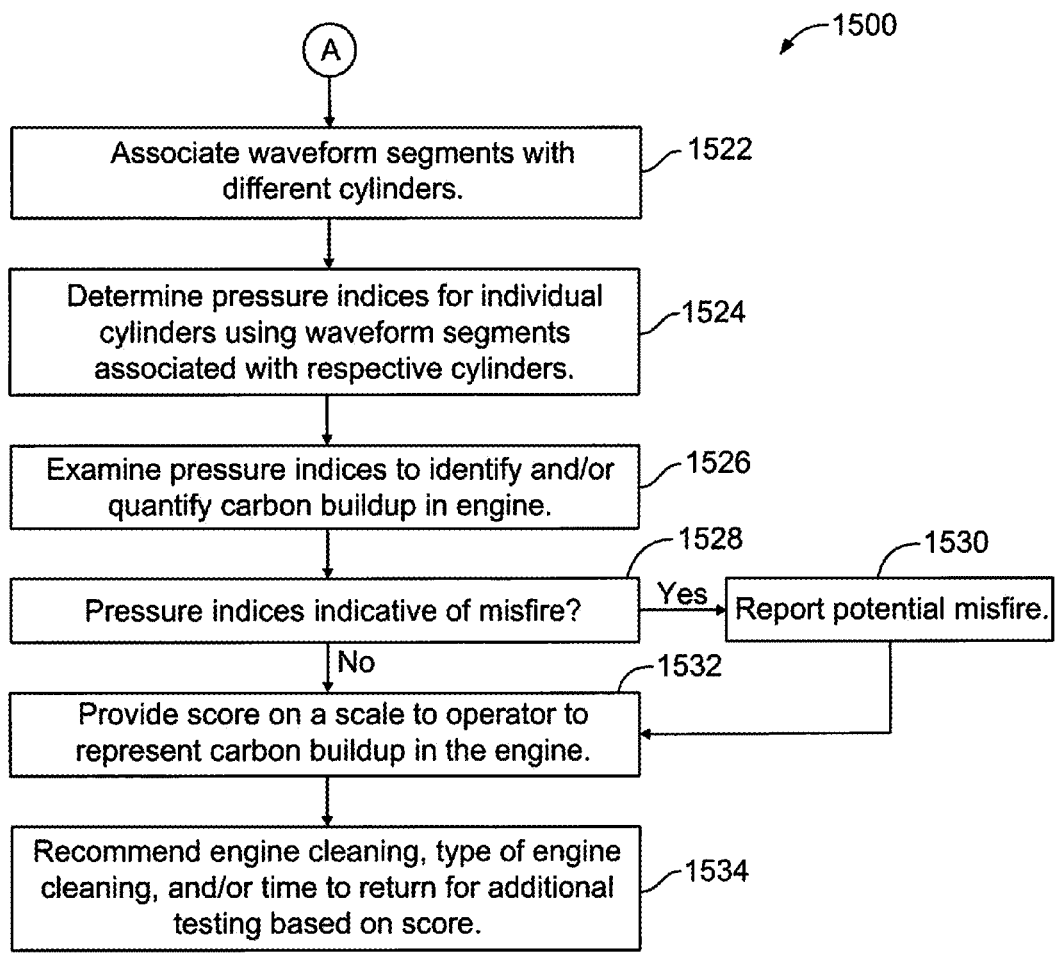

FIGS. 43A and 43B illustrate a flowchart of an example of a method 1500 for analyzing carbon buildup in an engine. The method 1500 may be used in connection with the system 11 shown and described herein in order to determine carbon buildup in the engine 13. Alternatively, the method 1500 may be used with another, different system 11. The operations described in connection with the method 1500 may be performed in an order other than the order set forth herein. Optionally, one or more of the operations described herein may be omitted from the method 1500.

At 1502, the engine is activated. For example, the vehicle may be turned on such that the engine is operating at a speed, such as an idle speed. Alternatively, the engine may be activated at a later time in the method 1500.

At 1504, a pressure sensor is positioned in a common passageway of the engine. For example, a pressure sensor may be placed into a tailpipe of the vehicle and downstream of the cylinders of the engine to measure exhaust pressures. Alternatively, the pressure sensor may be placed into an intake manifold of the engine that is upstream of the cylinders to measure intake pressures.

At 1506, a detector is positioned near the engine. The detector is positioned to allow the detector to wirelessly detect ignition signals or firings of the spark plugs of the engine, in an embodiment. The detector may be placed on top of or in other proximity to the engine without conductively coupling the detector to the engine or spark plugs of the engine. Alternatively, the method 1500 may directly measure the ignition signals sent to the engine, such as by the system 11 being conductively coupled with wires or other conductors that convey the ignition signals to the spark plugs.

At 1508, the test of the intake and/or exhaust pressures of the engine is initiated. The test may be initiated by an operator providing input (e.g., pressing a button, selecting an icon, or other action) to the system 11 to direct the system 11 to begin the test.

At 1510, information about the engine is obtained. This information can include, for example, the VIN of the vehicle that includes the engine; the make, model, and/or type of the vehicle and/or engine; the mileage of the engine; whether the test is being performed before cleaning the engine, after cleaning the engine, after cleaning the engine and after operating the vehicle for at least a designated time and/or distance; or if it is unknown whether the engine has been cleaned. The VIN, make of the vehicle, model of the vehicle, and/or type of the vehicle may be used to determine how many cylinders are in the engine. The information about whether the engine has or has not been cleaned may be used in order to determine if a previous cleaning of the engine was effective to reduce the carbon build up in the engine.

At 1512, data signals provided by the pressure sensor and detector are monitored. The data signals from the pressure sensor may be pressure waveforms representative of intake or exhaust pressures measured by the pressure sensor. The data signals from the detector may be ignition signals representative of ignition events of the cylinders in the engine.

At 1514, a determination is made as to whether the data signals indicate an erroneous setup for the test. For example, the ignition signals may be examined to determine if the ignition signals are occurring too frequently or not frequently enough based on operating parameters of the engine. In such a scenario, the detector may not be detecting all of the ignition events or may be detecting signals other than ignition events (and interpreting these other signals as ignition events). Additionally or alternatively, the pressure waveforms may be too small to detect, not vary with respect to time, or have other parameters that may indicate that the pressures being sensed by the pressure sensor are not indicative of exhaust or intake pressures. If the data signals indicate a potential error, then the test may need to be restarted and flow of the method 1500 proceeds to 1516. If the data signals do not indicate such an error, then the test may proceed and the method 1500 may continue to 1518.

At 1516, the operator may be notified of the potential error in the setup of the test and/or the test may be suspended. The operator may reposition the detector and/or pressure sensor and attempt to conduct the test again.

At 1518, data signals provided by the pressure sensor and detector are monitored. The data signals from the pressure sensor may be pressure waveforms representative of intake or exhaust pressures measured by the pressure sensor. The data signals from the detector may be ignition signals representative of ignition events of the cylinders in the engine.

At 1520, the pressure waveforms are divided into waveform segments. As described above, the pressure waveforms may be divided by the timing at which the ignition signals indicate ignition events so that several waveform segments are obtained. The waveform segments represent intake or exhaust pressures associated with the various cylinders, also as described above.

At 1522, the waveform segments are associated with the different cylinders. For example, depending on the number of cylinders in the engine, the method 1500 may associate different waveform segments with different cylinders, as described above.

At 1524, pressure indices are determined for the various cylinders from the waveform segments associated with the different cylinders. These pressure indices can include, but are not limited to, locus length indices (LC) 1208, direction change indices (DC), upper or maximum values of DC/LC, lower or minimum values of DC/LC, differences between the upper or maximum values of DC/LC and the lower or minimum values of DC/LC, a standard deviation or other variance of DC/LC, hump pressure indices 1218, average or median hump pressure indices 1218, a product of the average or median of DC/LC and the standard deviation or variance of DC/LC, an average or median of LC, an average or median of DC/LC, or the like.

At 1526, one or more of the pressure indices are compared across multiple combustion cycles for individual cylinders to identify variations in the pressure indices for the individual cylinders. For example, the pressure indices for each cylinder may be compared to each other over time, and variations among or between the pressure indices for each cylinder may be examined. The variations in the pressure indices may indicate carbon build up in the engine (or other combustion problems with the engine). For example, relatively large variations in the pressure indices for a cylinder may indicate that there is carbon build up in the cylinder. The magnitude of variations may be associated with a score or other quantifiable measure that can be used to notify the operator, as described above.

At 1528, a determination is made as to whether the pressure indices indicate that a misfire has occurred in the engine. As described above, misfires of the engine may be detected when a number of locus length indices (LC) 1208 that are larger (e.g., longer) than a median (or average) of the locus length indices 1208 for the engine 13 exceeds a designated threshold. The median (or average) of the locus length indices 1208 may be modified by a correction factor (e.g., may be referred to as MisFireMultiplier). If a potential misfire of a cylinder is identified, flow of the method 1500 may proceed to 1530, where the identified potential misfire is reported to an operator of the system. The method 1500 may then continue to 1532. If no misfire is detected, flow of the method 1500 may proceed to 1532.

At 1532, a score or other indicator is provided to an operator to represent the amount of carbon build up in the engine based on the examined pressure indicators. As described above, this score may be presented on a scale that provides a relative indication of how much carbon has built up in the engine.

At 1534, one or more recommendations are provided for the engine based on the score or other indicator. The recommendations may include cleaning the engine, cleaning the engine with a particular cleaning process, returning the vehicle for a later test, and the like. Different cleaning processes can be recommended for different amounts of carbon build up in the engine.

In an embodiment, a method of identifying cyclic variations in combustion efficiency in cylinders of an internal combustion engine with aid of instrumentation is provided. The engine includes an air induction system, the cylinders, means for generating an ignition event for each of the cylinders, and an exhaust system. The instrumentation includes one or more microprocessors programmed with one or more software routines, memory, and means for measuring cylinder pressure pulses. The method includes running the engine through a number of combustion cycles, measuring the pressure pulses with the means for measuring cylinder pressure pulses, generating a waveform from the measured cylinder pressure pulses, and dividing the waveform of the measured cylinder pressure pulses into waveform cycles and cycle segments. Each waveform cycle represents a complete combustion cycle of the engine. Each cycle segment represents a combustion cycle of a separate cylinder of the engine. A total number of the cycle segments equals a total number of the cylinders. The method also includes marking each of the waveform segments from a cycle of the engine with a separate and distinct identifier, and repeating this identifier sequence for a number of successive cycles and comparing each individual waveform segment during a particular cycle with the waveform segment having the same identifier for a number of successive cycles to identify cycle to cycle variations for each waveform segment.

In one aspect, the instrumentation further includes means for detecting at least some of the ignition events. Dividing the waveform into waveform cycles and waveform segments includes utilizing the at least some of the ignition events that are detected.

In one aspect, the means for detecting at least some of the ignition signals includes an antenna, and the method also includes placing the antenna relative to the engine so that the antenna can detect at least some of the ignition events. The one or more software routines includes a routine to determine if the antenna is properly positioned relative to the engine such that the antenna is detecting at least some of the ignition signals. The method also can include determining if the antenna is properly positioned before proceeding to identify cyclic pressure variations in the combustion efficiency.

In one aspect, the one or more software routines includes a routine that suspends testing if the antenna is not properly positioned.

In one aspect, the instrumentation includes means for generating an alert signal and, in addition to suspending testing, the one or more routines includes a routine activates the means for generating an alert signal.

In one aspect, when the antenna does not pick up all of the ignition events from the engine, the one or more software routines includes a routine to identify and install waveform divisions on the pressure waveform that are not based on an ignition event picked up by the antenna. Dividing the waveform into divisions includes utilizing the ignition events that are picked up by the antenna to install division marks on the waveform and the routine to identify and install divisions in those locations along the waveform where a division is missing because an ignition event was not detected by the antenna.

In one aspect, the instrumentation for detecting at least some of the ignition events includes a direct connection to the means for generating an ignition event for one of the cylinders.

In one aspect, the ignition events from the engine are not all picked up by any instrumentation. The one or more software routines includes a routine to identify and install all the waveform divisions on the pressure waveform. The step of dividing the waveform into divisions includes the step of utilizing the routine to identify and install all the waveform divisions along the waveform.

In one aspect, the one or more software routines includes a routine to determine if the means for measuring the cylinder pressure pulses is properly positioned and properly functioning so that the means for measuring detects all the pressure pulses from each of the plurality of cylinders. The method also can include utilizing the routine to determine if the means for measuring the cylinder pressure pulses is detecting all the pressure pulses.

In one aspect, the one or more software routines includes a routine that suspends testing if the means for measuring the cylinder pressure pulses is not picking up the pressure pulses.

In one aspect, the instrumentation includes means for generating an alert signal and, in addition to suspending testing, the one or more software routines includes a routine that activates the means for generating an alert signal.

In one aspect, the instrumentation includes means for acquiring vehicle identification number (VIN) data associated with the engine being tested. The one or more software routines includes a routine for analyzing the VIN data to determine a year, make, and model of the engine being tested. The method also can include acquiring the VIN data for the engine being tested and determining the year, make, and model of the engine.

In one aspect, the VIN data is in the form of a barcode, the means for acquiring VIN data is a bar code scanner, and the method also can include scanning the VIN barcode associated with the engine.

In one aspect, the instrumentation includes a key pad, and the method of acquiring VIN data includes manually entering the VIN data in memory.

In one aspect, the instrumentation also includes a screen. The one or more software routines includes a routine for displaying a drop down menu on the screen which screen permits the selection of year, make, model and engine type.

In one aspect, the memory includes a data base of engines for which a correction factor is to be used with at least some of the one or more software routines. The method also can include checking the data base to determine if a correction needs to be applied and, if so, applying the correction factor to the at least some of the one or more software routines.

In one aspect, the correction factor is applied before testing.

In one aspect, the one or more software routines includes one or more routines for converting cycle-to-cycle variations associated with each waveform segment into a number representing an average turbulence in the air induction system of the engine which number also represents associated carbon buildup. The method also can include converting the cycle-to-cycle variations into a number representing the average waveform turbulence in the air induction system of the engine.

In one aspect, the instrumentation includes a carbon buildup scale. The one or more software routines includes a routine for converting the average waveform turbulence to a scale. The method also can include using a number representative of the average waveform turbulence and the routine for converting to scale the carbon buildup in the air induction system of the engine on the carbon build-up scale.

In one aspect, the instrumentation includes a screen on which the carbon build-up scale is displayed. The method also can include displaying a scaled carbon buildup on the carbon build-up scale.

In one aspect, displaying the scaled carbon buildup on the carbon buildup scale also includes displaying alert indicators selected from a group including one that advises that the air induction system should be cleaned and another that advises that the air induction system does not have to be cleaned.

In one aspect, the one or more software routines includes a plurality of routines for converting cycle-to-cycle pressure variations associated with each waveform division into a like plurality of numbers each representing an average waveform turbulence in the air induction system of the engine. The method also can include converting the cycle-to-cycle variations into a plurality of numbers each representing an average waveform turbulence in the air induction system of such engine, and selecting a greatest one of the plurality of numbers as most accurately representing the average waveform turbulence in the air induction system of such engine and the carbon build up in the air induction system.

In one aspect, the method also can include analyzing the individual waveform divisions for pressure variations that indicate an engine misfire.

In one aspect, the method also can include displaying a visual indicator that the engine being tested has the engine misfire.

In one aspect, the instrumentation includes means for generating an alert signal. The one or more software routines can include a routine for activating the alert signal when a misfire is detected. The method also can include activating the means for generating the alert signal when a misfire is detected.

In one aspect, the method also can include inserting the means for measuring the cylinder pressure pulses into the exhaust system, where the waveform is an exhaust pressure waveform.

In one aspect, the means for measuring the pressure pulses is a venturi, and the method also includes inserting the venturi into the exhaust system and measuring the cylinder pressure pulses from the venturi.

In one aspect, the method also includes inserting the means for measuring the cylinder pressure pulses into the air induction system, where the waveform is an intake pressure waveform.

In one aspect, the method also includes determining the carbon buildup in the air induction system of the engine from the cycle to cycle pressure variations, chemically cleaning the air induction system, and repeating the steps of measuring the pressure pulses, generating a waveform from the measured pressure pulses, dividing the waveform of the re-measured pressure pulses in to waveform cycles and cycle segments, marking each of the waveform segments, comparing each individual waveform segment, and determining from the cycle to cycle pressure variations the carbon buildup in the air induction system after cleaning.

In an embodiment, an induction cleaning analyzing system includes a pressure sensor, an ignition event detector, and a control module. The pressure sensor is configured to measure airflow pressures flowing in a common airflow pathway of a vehicle into which at least one of exhausts from plural cylinders in an engine flow or intake air is drawn by the cylinders. The ignition event detector is configured to determine ignition events of the respective cylinders. The control module is configured to obtain pressure waveforms representative of the airflow pressures in the common airflow pathway as measured by the pressure sensor and to divide the pressure waveforms into waveform segments. The control module also is configured to associate different subsets of the waveform segments with different ones of the cylinders using the ignition events determined by the ignition event detector. The control module also is configured to identify cyclic variations in the airflow pressures flowing in the common airflow pathway and caused by at least one of the cylinders by examining the waveform segments associated with the at least one of the cylinders.

In one aspect, the control module is configured to determine a magnitude of carbon build up in one or more of the cylinders by examining the cyclic variations in the airflow pressures caused by the one or more of the cylinders.

In one aspect, the control module is configured to quantify the magnitude of the carbon build up based on one or more comparisons between the waveform segments in the subset of waveform segments that are associated with the one or more of the cylinders.

In one aspect, the pressure sensor is configured to be at least partially inserted into a tail pipe of a vehicle that includes the engine in order to measure the airflow pressures.

In one aspect, the pressure sensor is configured to be at least partially inserted into an intake manifold of the engine in order to measure the airflow pressures.

In one aspect, the ignition event detector includes an antenna configured to wirelessly detect at least one of ignition signals transmitted to one or more spark plugs or ignition coils of the engine or electromagnetic interference caused by one or more spark plugs in the engine firing.

In one aspect, the ignition events represent combustion cycles of different ones of the cylinders. The control module can be configured to associate the waveform segments that occur between the ignition events with the different ones of the cylinders.

In one aspect, the pressure sensor is configured to be disposed outside of the cylinders.

In an embodiment, a method (e.g., for analyzing carbon build up in an engine) includes measuring airflow pressures flowing in a common airflow pathway of a vehicle into which at least one of exhausts from plural cylinders in an engine flow or intake air is drawn by the cylinders using a pressure sensor that is at least partially disposed in the common airflow pathway, determining when ignition events of the respective cylinders occur, dividing pressure waveforms representative of the airflow pressures into waveform segments, associating different subsets of the waveform segments with different ones of the cylinders using the ignition events determined by the ignition event detector, and identifying cyclic variations in the airflow pressures flowing in the common airflow pathway and caused by at least one of the cylinders by examining the waveform segments associated with the at least one of the cylinders.

In one aspect, the method also includes determining a magnitude of carbon build up in one or more of the cylinders by examining the cyclic variations in the airflow pressures caused by the one or more of the cylinders.

In one aspect, the method also includes quantifying the magnitude of the carbon build up based on one or more comparisons between the waveform segments in the subset of waveform segments that are associated with the one or more of the cylinders.

In one aspect, the method also includes at least partially inserting the pressure sensor into at least one of a tail pipe of a vehicle that includes the engine or an intake manifold of the engine in order to measure the airflow pressures.

In one aspect, determining when ignition events of the respective cylinders occur includes wirelessly detecting at least one of ignition signals transmitted to one or more spark plugs or ignition coils of the engine or electromagnetic interference caused by one or more spark plugs in the engine firing.

In one aspect, the ignition events represent combustion cycles of different ones of the cylinders, and associating different subsets of the waveform segments with different ones of the cylinders includes associating the waveform segments that occur between the ignition events with the different ones of the cylinders.

In an embodiment, a system (e.g., for analyzing airflow through cylinders of an engine) includes a pressure sensor, an ignition event detector, and a control module. The pressure sensor is configured to measure at least one of intake air pressures or exhaust pressures of plural cylinders flowing through a common air passageway associated with an engine. The ignition event detector is configured to sense ignition signals representative of combustion cycles of the cylinders. The control module is configured to separate the at least one of intake air pressures or exhaust pressures into waveform segments and to associate different subsets of the waveform segments with different ones of the cylinders. The control module is configured to identify variations in the at least one of intake air pressures or exhaust pressures caused by at least one of the cylinders by identifying cyclic variations in the waveform segments in the subset of the waveform segments that are associated with the at least one of the cylinders.

In one aspect, the control module is configured to quantify an amount of carbon build up in the engine using the cyclic variations in the waveform segments in the subset of the waveform segments associated with the at least one of the cylinders.

In one aspect, the ignition event detector includes an antenna configured to wirelessly detect the ignition signals transmitted to one or more spark plugs or ignition coils of the engine or electromagnetic interference caused by one or more spark plugs in the engine firing.

In one aspect, the control module is configured to associate the waveform segments that occur during different ones of the combustion cycles with different ones of the cylinders.

In one aspect, the pressure sensor is configured to be at least one of inserted into a tailpipe of a vehicle that includes the engine or an intake manifold of the engine to sense the at least one of intake air pressures or exhaust pressures.

In one aspect, the control module is configured to recommend cleaning the engine based on the cyclic variations in the waveform segments associated with the at least one of the cylinders.

Through the examples, it is clear that at least one aspect of the inventive subject matter described herein can determine or quantify the carbon compound build up contained within the internal combustion engine, and determine a representative scale for the carbon build up. It is also clear that the system can determine if the internal combustion engine is misfiring. This data can be conveyed to the service personal through visual or audible alerts. In one aspect, the system can save data acquired before cleaning the engine so that this data can be compared to similar types of data acquired after cleaning the engine.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A method of identifying cyclic variations in combustion efficiency in cylinders of an internal combustion engine with aid of instrumentation, the engine including an air induction system, the cylinders, means for generating ignition events for the cylinders, and an exhaust system, the instrumentation including one or more microprocessors programmed with one or more software routines, memory, and means for measuring cylinder pressure pulses; the method including:

running the engine through a number of combustion cycles;
 measuring the pressure pulses with the means for measuring cylinder pressure pulses;
 generating a waveform from the cylinder pressure pulses that are measured;
 dividing the waveform of the cylinder pressure pulses that are measured into waveform cycles and cycle segments, wherein each of the waveform cycles represents a complete combustion cycle of the engine, wherein each of the cycle segments represents a combustion cycle of a separate cylinder of the cylinders in the engine, and wherein a total number of the cycle segments during the complete combustion cycle of the engine equals a total number of the cylinders;
 performing an identifier sequence by marking the cycle segments from the complete combustion cycle of the engine with separate and distinct identifiers associated with different cycles of the cylinders, and repeating the identifier sequence for a number of successive complete combustion cycles of the engine;
 and comparing each individual cycle segment of the cycle segments during a particular complete combustion cycle of the engine with the cycle segment having a same identifier for the number of the successive complete combustion cycles of the engine to identify cycle-to-cycle variations of the pressure pulses in the cycle segments for each of the cylinders:
 determining a carbon buildup in the air induction system of the engine from the cycle-to-cycle pressure variations;
 chemically cleaning the air induction system based on carbon buildup from the air induction system;
 repeating measuring the pressure pulses, generating the waveform, dividing the waveform into the waveform cycles and the cycle segments, performing the identifier sequence by marking the cycle segments, comparing each individual cycle segment, and determining the carbon buildup in the air induction system from the cycle to cycle variations after cleaning the air induction system.

2. The method as set forth in claim 1, wherein the instrumentation further includes means for detecting at least some of the ignition events, and wherein dividing the waveform into the waveform cycles and the cycle segments includes utilizing the at least some of the ignition events that are detected.

3. The method as set forth in claim 2, wherein the means for detecting at least some of the ignition signals includes an antenna, and further including placing the antenna relative to the engine so that the antenna can detect at least some of the ignition events, and wherein the one or more software routines includes a first routine to determine if whether the antenna is properly positioned relative to the engine such that the antenna is detecting at least some of the ignition events, and further comprising determining if whether the antenna is properly positioned before proceeding to identify the cycle-to-cycle variations.

4. The method as set forth in claim 3, wherein, responsive to the antenna not detecting all of the ignition events of the engine, the one or more software routines includes a second routine to identify and install waveform divisions on the waveform that are not based on the ignition events that are detected by the antenna, and wherein dividing the waveform into the waveform cycles and the cycle segments includes utilizing the ignition events that are detected by the antenna to install first division marks on the waveform and identify and installing second division marks in locations along the waveform where at least one of the first division marks is missing because at least one of the ignition events was not detected by the antenna.

5. The method as set forth in claim 1, wherein the one or more software routines includes a first routine to determine whether the means for measuring the cylinder pressure pulses is properly positioned and properly functioning so that the means for measuring detects all of the pressure pulses from each of the cylinders, and further comprising utilizing the first routine to determine if the means for measuring the cylinder pressure pulses is detecting all of the pressure pulses.

6. The method as set forth in claim 1, wherein the instrumentation includes means for acquiring vehicle identification number (VIN) data associated with the engine being tested, wherein the one or more software routines includes a third routine for analyzing the VIN data to determine a year, make, and model of the engine being tested, and further comprising acquiring the VIN data for the engine being tested and determining the year, make, and model of the engine.

7. The method as set forth in claim 6, wherein the VIN data is in the form of a barcode, the means for acquiring VIN data is a barcode scanner, and further comprising scanning the VIN barcode associated with the engine.

8. The method as set forth in claim 6, wherein the memory includes a data base of engines for which a correction factor is to be used with at least some of the one or more software routines, and further comprising checking the data base to determine whether a correction needs to be applied to one or more of the cycle-to-cycle variations and, responsive to determining that the correction needs to be applied, applying the correction factor to the one or more cycle-to-cycle variations.

9. The method as set forth in claim 1, wherein the one or more software routines includes one or more routines for converting the cycle-to-cycle variations associated with each of the cycle segments into a first number representing an average turbulence in the air induction system of the engine, wherein the number also represents associated carbon buildup, and further comprising converting the cycle-to-cycle variations into a second number representing an average waveform turbulence in the air induction system of the engine.

10. The method as set forth in claim 9, wherein the instrumentation includes a carbon buildup scale, wherein the one or more software routines includes a fourth routine for converting the average waveform turbulence to a scale, and further comprising using the number representative of the average waveform turbulence and the fourth routine for converting the average waveform turbulence in the air induction system of the engine to the scale on the carbon build-up scale.

11. The method as set forth in claim 10, wherein the instrumentation includes a screen on which the carbon buildup scale is displayed, and further comprising displaying a scaled carbon buildup on the carbon buildup scale.

12. The method as set forth in claim 11, wherein displaying the scaled carbon buildup on the carbon buildup scale also includes displaying alert indicators selected from a group including one alert that advises that the air induction system should be cleaned and another alert that advises that the air induction system does not have to be cleaned.

13. The method as set forth in claim 9, wherein the one or more software routines includes a plurality of routines for converting the cycle-to-cycle variations associated with each of the cycle segments into average waveform turbulences in the air induction system of the engine, and further including selecting a greatest one of the average waveform turbulences as representative of the average waveform turbulence in the air induction system of such engine and the carbon buildup in the air induction system.

14. The method as set forth in claim 1, further including analyzing the cycle segments for the cycle-to-cycle variations that indicate an engine misfire.

15. The method as set forth in claim 14, further including displaying a visual indicator that the engine being tested has the engine misfire.

16. The method as set forth in claim 1, further comprising inserting the means for measuring the cylinder pressure pulses into the exhaust system, wherein the waveform is an exhaust pressure waveform.

17. The method as set forth in claim 16, wherein the means for measuring the pressure pulses is a venturi, and further comprising inserting the venturi into the exhaust system and measuring the cylinder pressure pulses from the venturi.

* * * * *